US012606740B2

(12) United States Patent
Pan et al.

(10) Patent No.: US 12,606,740 B2
(45) Date of Patent: Apr. 21, 2026

(54) FORMULATIONS AND APPLICATIONS THEREOF IN OPTOELECTRONIC FIELD

(71) Applicant: Zhejiang Brilliant Optoelectronic Technology Co., Ltd., Taizhou (CN)

(72) Inventors: Junyou Pan, Taizhou (CN); Juye Zhu, Taizhou (CN); Jiahui Tan, Taizhou (CN)

(73) Assignee: Zhejiang Brilliant Optoelectronic Technology Co., Ltd., Taizhou (CN)

( * ) Notice: Subject to any disclaimer, the term of this patent is extended or adjusted under 35 U.S.C. 154(b) by 641 days.

(21) Appl. No.: 18/300,799

(22) Filed: Apr. 14, 2023

(65) Prior Publication Data

US 2023/0272274 A1 Aug. 31, 2023

Related U.S. Application Data

(63) Continuation of application No. PCT/CN2021/123761, filed on Oct. 14, 2021.

(30) Foreign Application Priority Data

Oct. 14, 2020 (CN) ......................... 202011099557.7
Apr. 7, 2021 (CN) ......................... 202110370866.1

(51) Int. Cl.
*C09K 11/06* (2006.01)
*C09K 11/02* (2006.01)

(52) U.S. Cl.
CPC .............. *C09K 11/06* (2013.01); *C09K 11/02* (2013.01); *C09K 2211/1007* (2013.01); *C09K 2211/1014* (2013.01)

(58) Field of Classification Search
CPC . C09K 11/06; C09K 11/02; C09K 2211/1007; C09K 2211/1014
USPC .................................................... 252/301.35
See application file for complete search history.

(56) References Cited

U.S. PATENT DOCUMENTS

| | | | |
|---|---|---|---|
| 4,769,292 A | 9/1988 | Tang et al. | |
| 5,121,029 A | 6/1992 | Hosokawa et al. | |
| 5,130,603 A | 7/1992 | Tokailin et al. | |
| 6,020,078 A | 2/2000 | Chen et al. | |
| 6,251,531 B1 | 6/2001 | Enokida et al. | |
| 7,250,532 B2 | 7/2007 | Iwakuma et al. | |
| 2006/0210830 A1 | 9/2006 | Funahashi et al. | |
| 2006/0222886 A1 | 10/2006 | Kwong et al. | |
| 2007/0092753 A1 | 4/2007 | Begley et al. | |
| 2007/0252517 A1 | 11/2007 | Owczarczyk et al. | |
| 2008/0113101 A1 | 5/2008 | Inoue et al. | |
| 2009/0134784 A1 | 5/2009 | Lin et al. | |
| 2018/0274753 A1* | 9/2018 | Sakaino | B32B 27/306 |

FOREIGN PATENT DOCUMENTS

| | | |
|---|---|---|
| CN | 1583691 A | 2/2005 |
| CN | 108141939 A | 6/2018 |
| CN | 110799621 A | 2/2020 |
| CN | 110832361 A | 2/2020 |
| CN | 111029477 A | 4/2020 |
| CN | 111615653 A | 9/2020 |
| CN | 111630056 A | 9/2020 |
| CN | 111868627 A | 10/2020 |
| DE | 102005058557 A1 | 6/2007 |
| EP | 1957606 A1 | 8/2008 |
| JP | H0853397 A | 2/1996 |
| JP | 2913116 B2 | 6/1999 |
| WO | 0121729 A1 | 3/2001 |
| WO | 2006000388 A1 | 1/2006 |
| WO | 2006000389 A1 | 1/2006 |
| WO | 2006058737 A1 | 6/2006 |
| WO | 2006122630 A1 | 11/2006 |
| WO | 2007065549 A1 | 6/2007 |
| WO | 2007115610 A1 | 10/2007 |
| WO | 2007140847 A1 | 12/2007 |
| WO | 2008006449 A1 | 1/2008 |
| WO | 2010135519 A1 | 11/2010 |
| WO | 2011110277 A1 | 9/2011 |
| WO | 2018216990 A1 | 11/2018 |
| WO | 2021192795 A1 | 9/2021 |
| WO | 2022078431 A1 | 4/2022 |
| WO | 2022078434 A1 | 4/2022 |
| WO | 2022078456 A1 | 4/2022 |

OTHER PUBLICATIONS

Boyle et al., Composites, ASM Handbook, 2001, 21, Chapter Epoxy Resins, pp. 78-89, dated Dec. 31, 2001.

* cited by examiner

*Primary Examiner* — Anita Nassiri-Motlagh
(74) *Attorney, Agent, or Firm* — Westbridge IP LLC

(57) ABSTRACT

Disclosed are formulations including at least one compound having a structural unit of formula (1) or (2), and an organic resin are disclosed. Organic functional material films, containing films prepared from the formulations are also disclosed. Optoelectronic devices, containing the organic functional material films are further disclosed.

10 Claims, No Drawings

FORMULATIONS AND APPLICATIONS THEREOF IN OPTOELECTRONIC FIELD

CROSS-REFERENCE TO RELATED APPLICATIONS

This application is a continuation of International Application No. PCT/CN2021/123761, filed on Oct. 14, 2021, which claims priority to Chinese Patent Application No. CN202110370866.1, filed on Apr. 7, 2021 and Chinese Patent Application No. CN202011099557.7, filed on Oct. 14, 2020. All of the aforementioned applications are incorporated herein by reference in their entireties.

TECHNICAL FIELD

The present disclosure relates to the field of organic optoelectronic materials and technologies, and in particularly to formulations, organic films comprising or prepared from the formulations, and applications thereof in the optoelectronic field.

BACKGROUND

According to the principles of colorimetry, the narrower the full width at half maximum (FWHM) of the lights perceived by the human eyes is, the higher the color purity, and thus the more vivid the color display would be. Display devices with narrow-FWHM red, green and blue primary light are able to show vivid views with high color gamut and high visual quality.

The current mainstream full-color displays are achieved mainly in two ways. The first method is to actively emit red, green and blue lights, typically such as RGB-OLED display. The current mature technology is to manufacture light emitting devices of all three colors by vacuum evaporation using a fine metal mask, the complexity of processing leads to low yields, and the high-resolution display over 600 ppi is difficult to realize. The second method is to use color converters to convert the single-color light from the light emitting devices into different colors, thereby achieving a full-color display. For example, Samsung combines blue OLEDs with red and green quantum dots (QD) films as the color converters. In this case, the fabrication of the light emitting devices is much simpler, and thus higher yield. Furthermore, the manufacture of the color converters can be achieved by different technologies, such as inkjet printing, transfer printing and photolithography, etc., appliable to a variety of display products with very different resolution requirements from low resolution large-size TV (around only 50 ppi) to high resolution silicon-based micro-display (over 3000 ppi).

Currently, there are mainly two types of color conversion materials used in mainstream color converters. The first one is inorganic nanocrystals, commonly known as quantum dot, which are nanoparticles (particularly quantum dot) of inorganic semiconductor material (InP, CdSe, CdS, ZnSe, etc.) with a diameter of 2-8 nm. Limited by the current synthesis and separation technology of quantum dots, FWHMs of CD-containing quantum dots typically range from 25 to 40 nm, which meets the display requirements of NTSC for color purity. Meanwhile, Cd-free quantum dots generally come with larger FWHMs of 35-75 nm. Since Cd is considered highly hazardous to environment and human health, most countries have prohibited the use of Cd-containing quantum dots to produce electronic products. In addition, the dispersion system of the inorganic quantum dot is actually a suspension; and in order to ensure its stability and uniform distribution after film formation, stabilizers and dispersants need to be added, such as those disclosed in CN110799621A. Therefore, the development of formulations suitable for printing or coating process is crucial for the quantum dot, and the difficulty thereof is relatively high. In addition, the extinction coefficient is generally low, requiring thicker films, the typical 10 um or more is needed to achieve complete absorption of blue light, which is a great challenge for mass production processes, especially for Samsung's technology of combining blue OLED with red-green quantum dots. The second one is organic dyes, comprising various organic conjugated small molecules or polymers with chromophores. These organic dyes generally have high extinction coefficients, but the intra-molecular thermal relaxation and the large vibration energy are always non-negligible, leading to the large FWHMs (typically over 60 nm) of their emission spectra. In addition, the color converters or the films are generally prepared by solution processing method. Currently, the common organic conjugate systems are relatively rigid, due to the solubility in organic solvent is limited, the processability is poor, and the common organic conjugate systems are difficult to use in the preparation of a display of blue-light-plus-color converter.

In three patent applications contemporaneous with the present invention, the present inventors have disclosed small molecules and polymer materials with narrow FWHM, but the formulations (i.e., printing inks) are suitable for printing or coating processes have yet to be developed.

SUMMARY

In one aspect, the present disclosure provides a formulation, comprising:

1) at least one organic resin;
2) at least one compound having a structural unit of formula (1) or (2), (1)

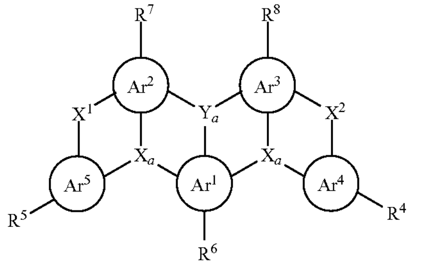

(2)

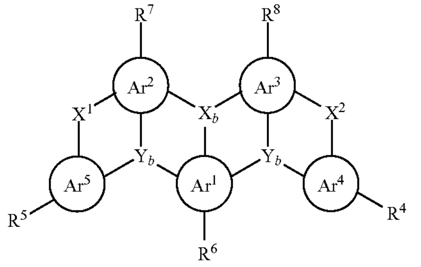

wherein:

each of $Ar^1$, $Ar^2$, and $Ar^3$ is independently an aromatic group containing 5 to 24 ring atoms, or a heteroaromatic group containing 5 to 24 ring atoms;

each of $Ar^4$ and $Ar^5$ is independently null, an aromatic group containing 5 to 24 ring atoms, or a heteroaromatic group containing 5 to 24 ring atoms;

each of $Y_a$ and $Y_b$ is independently B, P═O, C($R^9$), or Si($R^9$);

when neither $Ar^4$ nor $Ar^5$ is null, each of $X_a$ and $X_b$ is independently N, C($R^9$), or Si($R^9$);

when $Ar^4$ and/or $Ar^5$ is null, each of the corresponding $X_a$ and $Y_b$ is independently N($R^9$), C($R^9R^{10}$), Si($R^9R^{10}$), C═O, O, C═N($R^9$), C═C($R^9R^{10}$), P($R^9$), P(═O)$R^9$, S, S═O, or $SO_2$;

each of $X^1$ and $X^2$ is independently null or a bridging group;

$R^4$ to $R^{10}$ are independently selected from the group consisting of —H, -D, —F, —Cl, —Br, —I, —CN, —$NO_2$, —$CF_3$, a $C_1$-$C_{20}$ linear alkyl group, a $C_1$-$C_{20}$ linear haloalkyl group, a $C_1$-$C_{20}$ linear alkoxy group, a $C_1$-$C_{20}$ linear thioalkoxy group, a $C_3$-$C_{20}$ branched/cyclic alkyl group, a $C_3$-$C_{20}$ branched/cyclic haloalkyl group, a $C_3$-$C_{20}$ branched/cyclic alkoxy group, a $C_3$-$C_{20}$ branched/cyclic thioalkoxy group, a $C_3$-$C_{20}$ branched/cyclic a silyl group, a $C_1$-$C_{20}$ ketone group, a $C_3$-$C_{20}$ alkoxycarbonyl group, a $C_7$-$C_{20}$ aryloxycarbonyl group, a cyano group (—CN), a carbamoyl group (—C(═O)$NH_2$), a haloformyl group (—C(═O)—X where X represents a halogen atom), a formyl group (—C(═O)—H), an isocyano group, an isocyanate group, a thiocyanate group, an isothiocyanate group, a hydroxyl group, a nitro group, a $CF_3$ group, Cl, Br, F, a crosslinkable group, a substituted/unsubstituted aromatic/heteroaromatic group containing 5 to 40 ring atoms, an aryloxy/heteroaryloxy group containing 5 to 40 ring atoms, an arylamine/heteroarylamine group containing 5 to 40 ring atoms, a disubstituted unit in any position of the above substituents and any combination thereof, wherein one or more of the substituent groups can form a monocyclic or polycyclic aliphatic or aromatic ring system with each other and/or with the ring bonded to the groups.

Preferably, the formulation further comprises at least one solvent.

In another aspect, the present disclosure also provides an organic functional material film, which is prepared from a formulation as described herein.

In yet another aspect, the present disclosure further provides an optoelectronic device, comprising an organic functional material film as described herein.

Beneficial effects: a formulation as described herein is ideally suited to inks for printing or coating processes. Furthermore, the compound contained in the formulation with a relatively narrow light-emitting FWHM and a relatively high extinction coefficient, facilitating the preparation of various color converters, and being used for the realisation of displays with a high color gamut.

DETAILED DESCRIPTION

The present disclosure can be embodied in many different forms and is not limited to the embodiments described herein. Rather, these embodiments are provided for the purpose of providing a more thorough and comprehensive understanding of the present disclosure.

Unless defined otherwise, all technical and scientific terms used herein have the same meaning as commonly understood by those skilled in the art belong to the present disclosure. The terminology used herein in the specification of the present disclosure is for the purpose of describing specific embodiments only and is not intended to limit the disclosure. As used herein, the term "and/or" includes any and all combinations of one or more of the relevant listed items.

As used herein, the terms "host material", "matrix material" have the same meaning, and they are interchangeable with each other.

As used herein, the terms "formulation", "printing ink", and "inks" have the same meaning, and they are interchangeable with each other.

In one aspect, the present disclosure provides a formulation comprising:

1) at least one organic resin;

2) at least one compound comprising a structural unit of formula (1) or (2), (1)

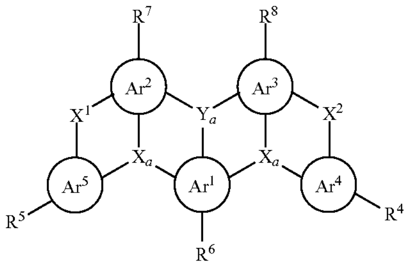

(2)

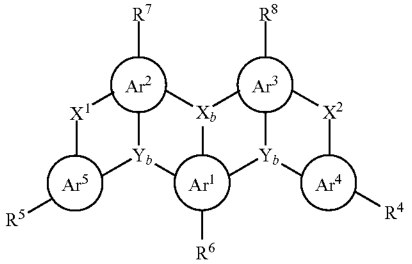

wherein:

each of $Ar^1$, $Ar^2$, and $Ar^3$ is independently an aromatic group containing 5 to 24 ring atoms, or a heteroaromatic group containing 5 to 24 ring atoms;

each of $Ar^4$ and $Ar^5$ is independently null, an aromatic group containing 5 to 24 ring atoms, and heteroaromatic groups containing 5 to 24 ring atoms;

each of $Y_a$ and $Y_b$ is independently B, P═O, C($R^9$), or Si($R^9$);

when neither $Ar^4$ nor $Ar^5$ is null, each of $X_a$ and $X_b$ is independently selected from the group consisting of N, C($R^9$), and Si($R^9$);

when $Ar^4$ and/or $Ar^5$ is null, the corresponding $X_a$ and $Y_b$ are each independently selected from the group consisting of N($R^9$), C($R^9R^{10}$), Si($R^9R^{10}$), C═O, O, C═N($R^9$), C═C($R^9R^{10}$), P($R^9$), P(═O)$R^9$, S, S═O, and $SO_2$;

each of $X^1$, $X^2$ is independently null or a bridging group;

$R^4$ to $R^{10}$ are independently selected from the group consisting of —H, -D, —F, —Cl, —Br, —I, —CN, —$NO_2$, —$CF_3$, a $C_1$-$C_{20}$ linear alkyl group, a $C_1$-$C_{20}$ linear haloalkyl group, a $C_1$-$C_{20}$ linear alkoxy group, a $C_1$-$C_{20}$ linear thioalkoxy group, a $C_3$-$C_{20}$ branched/cyclic alkyl group, a $C_3$-$C_{20}$ branched/cyclic haloalkyl group, a $C_3$-$C_{20}$ branched/cyclic alkoxy group, a $C_3$-$C_{20}$ branched/cyclic thioalkoxy group, a $C_3$-$C_{20}$ branched/cyclic a silyl group, a $C_1$-$C_{20}$ ketone group, a $C_3$-$C_{20}$ alkoxycarbonyl group, a $C_7$-$C_{20}$ aryloxycarbonyl group, a cyano group (—CN), a carbamoyl group (—C(═O)$NH_2$), a haloformyl group (—C(═O)—X where X represents a halogen atom), a formyl group (—C(═O)—H), an isocyano group, an isocyanate group, a thiocyanate group, an isothiocyanate group, a hydroxyl group, a nitro group, a $CF_3$ group, Cl, Br, F, a crosslinkable group, a substituted/unsubstituted aromatic/heteroaromatic group containing 5 to 40 ring atoms, an aryloxy/heteroaryloxy group containing 5 to 40 ring atoms, an arylamine/heteroarylamine group containing 5 to 40 ring atoms, and a disubstituted unit in any position of the above substituents or a combination thereof, wherein one or more of the substituent groups can form a monocyclic or polycyclic aliphatic or aromatic ring system with each other and/or with the ring bonded to the groups.

In some embodiments, the formulation comprises two or more organic resins. In some embodiments, the formulation comprises three or more organic resins. For the purposes of the present disclosure, the organic resin refers to a resin prepolymer or a resin formed after the prepolymer is crosslinked or cured.

The organic resins suitable for the present disclosure include, but not limited to: polystyrene, polyacrylate, polymethacrylate, polycarbonate, polyurethane, polyvinylpyrrolidone, polyvinyl acetate, polybutylene, polyethylene glycol, polysiloxane, epoxy resin, polyvinyl alcohol, polyacrylonitrile, polyvinylidene chloride (PVDC), polystyrene-acrylonitrile (SAN), polybutylene terephthalate (PBT), polyethylene terephthalate (PET), polyvinyl butyrate (PVB), polyvinyl chloride (PVC), polyamide, polyoxymethylene, polyimide, polyetherimide, and mixtures thereof.

Further, the organic resins suitable for the present invention include, but not limited to, those formed by homopolymerization or copolymerization from the following monomers (resin prepolymers): styrene derivatives, acrylate derivatives, acrylonitrile derivatives, acrylamide derivatives, vinyl ether derivatives, vinyl ether derivatives, maleimide derivatives, conjugated diene derivatives.

Examples of styrene derivatives include, but not limited to alkylstyrenes, such as α-methylstyrene, o-, m-, p-methylstyrene, p-butylstyrene; especially p-tert-butylstyrene, alkoxystyrene, such as p-methoxystyrene, p-butoxystyrene, p-tert-butoxystyrene.

Examples of acrylate derivatives include, but not limited to methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, sec-butyl acrylate, sec-butyl methacrylate, tert-butyl acrylate, tert-butyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 2-hydroxybutyl acrylate, 2-hydroxybutyl methacrylate, 3-hydroxybutyl acrylate, 3-hydroxybutyl methacrylate, 4-hydroxybutyl acrylate, 4-hydroxybutyl methacrylate, allyl acrylate, allyl methacrylate, benzyl acrylate, benzyl methacrylate, cyclohexyl acrylate, cyclohexyl methacrylate, phenyl acrylate, phenyl methacrylate, 2-methoxyethyl acrylate, 2-methoxyethyl methacrylate, 2-phenoxyethyl acrylate, 2-phenoxyethyl methacrylate, methoxydiethylene glycol acrylate, methoxydiethylene glycol methacrylate, methoxytriethylene glycol acrylate, methoxytriethylene glycol methacrylate, methoxypropylene glycol acrylate, methoxypropylene glycol methacrylate, methoxy dipropylene glycol acrylate, methoxydipropylene glycol methacrylate, isobornyl acrylate, isobornyl methacrylate, dicyclopentadiene acrylate, dicyclopentadiene methacrylate, adamantane (meth) acrylate, norbornene (meth) acrylate, 2-hydroxy-3-phenoxypropyl acrylate, 2-hydroxy-3-phenoxypropyl methacrylate, glyceryl monoacrylate, and glyceryl monostearate; 2-aminoethyl acrylate, 2-aminoethyl methacrylate, 2-dimethylaminoethyl acrylate, 2-dimethylaminoethyl methacrylate, N,N-dimethylaminoethyl (meth) acrylic acid, N,N-diethylaminoethyl (meth) acrylate, 2-dimethylaminopropyl methacrylate, 3-aminopropyl acrylate, 3-aminopropyl methacrylate, N,N-dimethyl-1,3-propane diamine (meth) acrylate, 3-dimethylaminopropyl acrylate, 3-dimethylaminopropyl methacrylate, glycidyl acrylate, and glycidyl methacrylate.

Examples of the acrylonitrile derivatives include, but not limited to acrylonitrile, methacrylonitrile, α-chloroacrylonitrile, and vinylidene cyanide.

Examples of acrylamide derivatives include, but not limited to acrylamide, methacrylamide, α-chloroacrylamide, N-2-hydroxyethyl acrylamide, and N-2-hydroxyethyl methacrylamide.

Examples of vinyl ester derivatives include, but not limited to vinyl acetate, vinyl propionate, vinyl butyrate, and vinyl benzoate.

Examples of vinyl ether derivatives include, but not limited to vinyl methyl ether, vinyl ethyl ether, and allyl glycidyl ether.

Examples of maleimide derivatives include, but not limited to maleimide, benzylmaleimide, N-phenylmaleimide, and N-cyclohexylmaleimide.

Examples of conjugated diene derivatives include, but not limited to 1,3-butadiene, isoprene, and chloroprene.

The homopolymers or copolymers can be prepared by free-radical polymerization, cationic polymerization, anionic polymerization, or organometallic catalysis polymerization (for example Ziegler-Natta catalysis). The polymerization process may be suspension polymerization, emulsion polymerization, solution polymerization, or bulk polymerization.

The average molar mass Mn (as determined by GPC) of the organic resins is generally in the range from 10 000 to 1 000 000 g/mol, preferably in the range from 20 000 to 750 000 g/mol, more preferably in the range from 30 000 to 500 000 g/mol.

In some embodiments, the organic resin is a thermosetting resin or an UV curable resin. In some embodiments, the organic resin is cured by a method that will enable roll-to-roll processing.

Thermosetting resins require curing in which they undergo an irreversible molecular crosslinking process which make the resin non-fusible. In some embodiments, the thermosetting resin is selected from epoxy resin, phenolic resin, vinyl resin, melamine resin, urea-formaldehyde resin, unsaturated polyester resin, urethane resin, allyl resin, acrylic resin, polyamide resin, polyamide-imide resin, phenolamine polycondensation resin, urea-melamine polycondensation resin, or combinations thereof.

In some embodiments, the thermosetting resin is an epoxy resin. The epoxy resin is easy to cure and do not give off volatiles, or generate by-products from a wide range of chemicals. The epoxy resin can also be compatible with most substrates and tend to readily wet surfaces. See also Boyle, M. A. et al., "Epoxy Resins", Composites, Vol. 21, ASM Handbook, pages 78-89 (2001).

In some embodiments, the organic resin is a silicone thermosetting resin. In some embodiments, the silicone thermosetting resin is OE6630A or OE6630B (Dow Corning Corporation (Auburn, Michigan)).

In some embodiments, a thermal initiator is used. In some embodiments, the thermal initiator is AIBN[2,2'-azobis(2-methylpropionitrile)] or benzoyl peroxide.

The UV curable resin is a polymer that will cure and rapidly harden upon exposure to light of a specific wavelength. In some embodiments, the UV curable resin is a resin having a free radical polymerization group, and a cationic polymerizable group as functional groups; the radical polymerizable group is such as (meth)acryloyloxy group, vinyloxy group, styryl group, or vinyl group. The cationically polymerizable group is, for example, epoxy group, thioepoxy group, vinyloxy group, or oxetanyl group. In some embodiments, the UV curable resin is a polyester resin, a polyether resin, a (meth)acrylic resin, an epoxy resin, a polyurethane resin, an alkyd resin, a spiroacetal resin, a polybutadiene resin, or a thiolene resin.

In some embodiments, the UV curable resin is selected from the group consisting of: polyurethane acrylate, allyloxy diacrylate, bis (acryloyloxyethyl) hydroxyisocyanurate, bis (acryloyloxyneopentyl glycol) adipate, bisphenol A diacrylate, bisphenol A dimethacrylate, 1,4-butanediol diacrylate, 1,4-butanediol dimethacrylate, 1,3-butanediol diacrylate, 1,3-butanediol dimethacrylate, diethylene glycol diacrylate, diethylene glycol dimethacrylate, dipentaerythritol hexaacrylate, dipentaerythritol monohydroxy pentacrylate, bis (trimethylolpropane) tetraacrylate, triethylene glycol dimethacrylate, glyceryl methacrylate, 1,6-hexanediol diacrylate, neopentyl glycol dimethacrylate, neopentyl glycol hydroxypivalonate, pentaerythritol triacrylate, pentaerythritol tetraacrylate, polyethylene glycol diacrylate, polypropylene glycol diacrylate, tetraethylene glycol diacrylate, tetrabromobisphenol A diacrylate, triethylene glycol divinyl ether, glycerol diacrylate, trimethylolpropane triacrylate, tripropylene glycol diacrylate, tris (acryloyloxyethyl) isocyanurate, triacrylate, diacrylate, propyl acrylate, and vinyl-terminated polydimethylsiloxane, vinyl-terminated diphenyl siloxane-dimethyl siloxane copolymer, vinyl-terminated polyphenyl methyl siloxane, vinyl-terminated difluoromethyl siloxane-dimethyl siloxane copolymer, vinyl-terminated diethyl siloxane-dimethyl siloxane copolymer, vinyl methyl siloxane, monomethacryloxypropyl-terminated polydimethylsiloxane, monovinyl-terminated polydimethylsiloxane, monoallyl-mono-trimethylsilyloxy-terminated polyethylene oxide, and combinations thereof.

In some embodiments, the UV curable resin is a mercapto functional compound that can be cross-linked under UV curing conditions with an isocyanate, an epoxy resin, or an unsaturated compound. In some embodiments, the mercapto functional compound is a polythiol. In some embodiments, the polythiol is selected from: pentaerythritol tetrakis(3-mercaptopropionate) (PETMP), trimethylolpropane tris(3-mercaptopropionate) (TMPMP), ethylene glycol bis(3-mercaptopropionate) (GDMP); tris[25-(3-mercapto-propionyloxy)ethyl]isocyanurate (TEMPIC), dipentaerythritol hexa(3-mercaptopropionate) (Di-PETMP), ethoxylated trimethylolpropane tri(3-mercaptopropionate) (ETMP1300 and ETTMP700), polycaprolactone tetra(3-mercaptopropionate) (PCL4MP1350), pentaerythritol tetramercaptoacetate (PETMA), trimethylolpropane trimercaptoacetate (TMPMA), and ethylene glycol dimercaptoacetate (GDMA). These compounds are sold under the trade name THIOCURE® by Bruno Bock (Malsacht, Germany).

In some embodiments, the UV curable resin further comprises photoinitiator. The photoinitiator will initiate crosslinking and/or curing reactions of the photosensitive material during exposure to light. In some embodiments, the photoinitiator is a compound such as acetophenone-based, benzoin-based, or thidrone-based that initiate the polymerization, crosslinking and curing of monomers.

In some embodiments, the UV curable resin comprises mercapto-functional compound, methacrylate, acrylate, isocyanate, or combinations thereof. In some embodiments, the UV curable resin comprises polythiols, methacrylates, acrylates, isocyanates, or combinations thereof.

In some embodiments, the photoinitiator is MINS-311RM (Minuta Technology Co., Ltd (Korea)).

In some embodiments, the photoinitiator is Irgacure® 127, Irgacure® 184, Irgacure® 184 D, Irgacure® 2022, Irgacure® 2100, Irgacure® 250, Irgacure® 270, Irgacure® 2959, Irgacure® 369, Irgacure® 369EG, Irgacure® 379, Irgacure® 500, Irgacure® 651, Irgacure® 754, Irgacure® 784, Irgacure® 819, Irgacure® 819DW, Irgacure® 907, Irgacure® 907FF, Irgacure® OxeOi, Irgacure® TPO-L, Irgacure® 1173, Irgacure® 1173D, Irgacure® 4265, Irgacure® BP, or Irgacure® MBF (BASF Corporation (Wyandotte, Michigan)). In some embodiments, the photoinitiator is TPO (2,4,6-trimethylbenzoyl-diphenyl-oxide) or MBF (methyl benzoyl formate).

In some embodiments, the weight percentage of organic resin in the formulation is about 50% to about 99%, about 50% to about 95%, about 50% to about 90%, about 50% to about 85%, about 50% to about 80%, about 50% to about 70%, about 50% to about 60%, about 60% to about 99%, about 60% to about 95%, about 60% to about 90%, about 60% to about 85%, about 60% to about 80%, about 60% to about 70%, about 70% to about 99%, about 70% to about 95%, about 70% to about 90%, about 70% to about 85%, about 70% to about 80%, about 80% to about 99%, about 80% to about 90%, about 80% to about 85%, about 85% to about 99%, about 85% to about 95%, about 85% to about 90%, about 90% to about 99%, about 90% to about 95%, or about 95% to about 99%.

In some embodiments, the formulation comprises a compound containing a structural unit of formula (1) or (2), wherein $R^4$ to $R^{10}$ are independently selected from the group consisting of H, D, a $C_1$-$C_{10}$ linear alkyl group, a $C_1$-$C_{10}$ linear alkoxy group, a $C_1$-$C_{10}$ linear thioalkoxy group, a $C_3$-$C_{10}$ branched/cyclic alkyl group, a $C_3$-$C_{10}$ branched/cyclic alkoxy group, a $C_3$-$C_{10}$ branched/cyclic thioalkoxy group, a $C_3$-$C_{10}$ branched/cyclic silyl group, a $C_1$-$C_{10}$ ketone group, a $C_2$-$C_{10}$ alkoxycarbonyl group, a $C_7$-$C_{10}$ aryloxycarbonyl group, a cyano group (—CN), a carbamoyl group (—C(=O)$NH_2$), a haloformyl group (—C(=O)—X where X represents a halogen atom), a formyl group (—C(=O)—H), an isocyano group, an isocyanate group, a thiocyanate group, an isothiocyanate group, a hydroxyl group, a nitro group, a $CF_3$ group, Cl, Br, F, a crosslinkable group, a substituted/unsubstituted aromatic/heteroaromatic group containing 5 to 20 ring atoms, an aryloxy/heteroaryloxy group containing 5 to 20 ring atoms, and any combination thereof, wherein one or more of the substituent $R^2$ groups can form a monocyclic or polycyclic aliphatic or aromatic ring system with each other and/or with the ring bonded to the groups.

In some embodiments, at least one of $X^1$ or $X^2$ is null; particularly preferrably, both are null, in which case the compound comprises a structural unit of formula (1b) or (2b).

(1b)

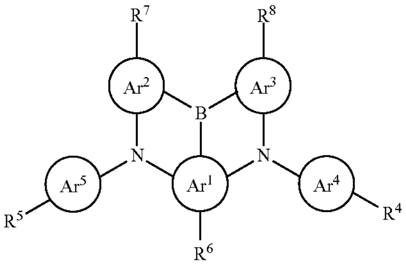

(2b)

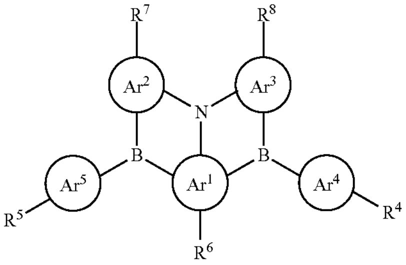

In some embodiments, at least one of $X^1$ or $X^2$ is a single bond; particularly preferrably, both are single bonds, and the compound comprises a structural unit of formula (1c) or (2c):

(1c)

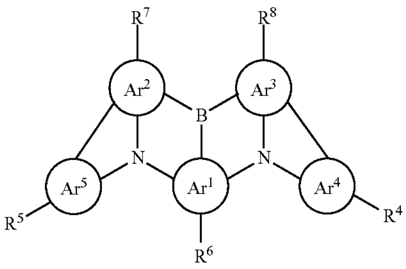

(2c)

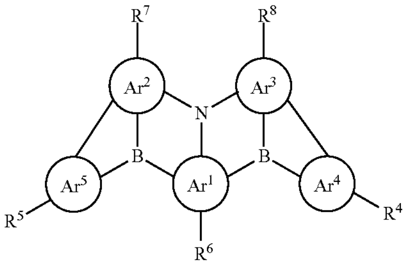

In some embodiments, $X^1$ and $X^2$ at each occurrence are the same or different di-bridging group; the preferred di-bridging groups are represented by the following formulas:

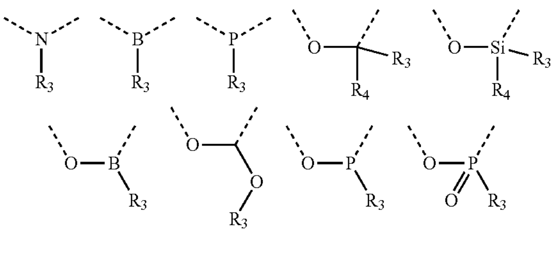

-continued

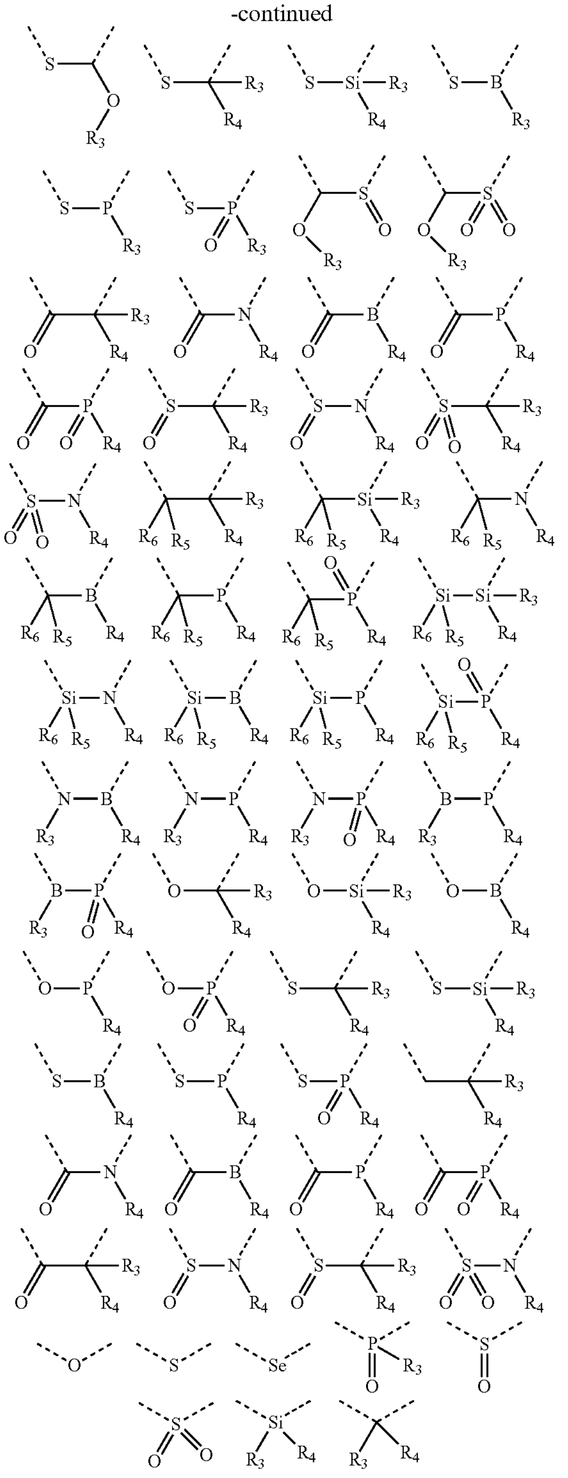

wherein $R_3$, $R_4$, $R_5$ and $R_6$ are identically defined as the above-mentioned $R^4$, and the dashed bonds refer to the covalent bonds connecting to the adjacent structural units.

For the purposes of the present disclosure, the aromatic ring systems contain 5 to 10 carbon atoms in the ring systems, the heteroaromatic ring systems contain 1 to 10 carbon atoms and at least one heteroatom in the ring systems, while the total number of carbon atoms and heteroatoms is at least 4. The heteroatoms are preferably selected from Si, N, P, O, S and/or Ge, particularly preferably from Si, N, P, O and/or S.

For the purposes of the present disclosure, the aromatic or heteroaromatic groups contain not only aromatic or heteroaromatic systems, but also a plurality of aromatic or heteroaromatic groups are interconnected by short non-aromatic units (for example by <10% of non-H atoms, more specifically 5% of non-H atoms, such as C, N or O atoms). Therefore, systems such as 9,9'-spirobifluorene, 9,9-diaryl fluorene, triarylamine, diaryl ethers, and other systems, should also be considered as aromatic aromatic ring system for the purpose of this disclosure.

For the purposes of the present disclosure, the any H atom on the compound may be optionally substituted with a $R^4$ group, wherein the definition of $R^4$ is as described above; and $R^4$ preferably from (1) a $C_1$-$C_{10}$ alkyl group, particularly preferably the following groups: Methyl, n-propyl, isopropyl, cyclopropyl, n-butyl, isobutyl, sec-butyl, tert-butyl, cyclobutyl, 2-methylbutyl, n-pentyl, n-hexyl, cyclohexyl, n-heptyl, cycloheptyl, n-octyl, cyclooctyl, 2-ethylhexyl, trifluoromethyl, pentafluoromethyl, 2,2,2-trifluoroethyl, vinyl, propenyl, butenyl, pentenyl, cyclopentenyl, hexenyl, cyclohexenyl, heptyl, cycloheptyl, octenyl, cycloheptyl, octenyl, cyclooctenyl, ethynyl, propynyl, butynyl, pentynyl, hexynyl, and octynyl; (2) a $C_1$-$C_{10}$ alkoxy group, particularly preferably the following groups: Methoxy, ethoxy, n-propoxy, isopropoxy, n-butoxy, isobutoxy, sec-butoxy, tert-butoxy, or 2-methylbutoxy; (3) a $C_2$-$C_{10}$ aryl or heteroaryl group, depending on the use which may be monovalent or divalent, in each case may also be substituted by the $R^4$ group mentioned above and may be linked to an aromatic or heteroaromatic ring by any desired position, particularly preferably the following groups: benzene, naphthalene, anthracene, pyrene, dihydropyrene, chrysene, fluoranthene, naphthacene, pentacene, benzopyrene, furan, benzofuran, isobenzofuran, dibenzofuran, thiophene, benzothiophene, isobenzothiophene, thiofluorene, pyrrole, indole, isoindole, carbazole, pyridine, quinoline, isoquinoline, acridine, phenanthridine, benzo-5,6-quinoline, benzo-6,7-quinoline, benzo-7,8-quinoline, phenothiazine, phenoxazine, pyrazole, indazole, imidazole, benzimidazole, naphthimidazole, phenimidazole, pyridimidazole, pyrazine-imidazole, quinoxaline-imidazole, oxazole, benzoxazole, naphthoxazole, anthracenazole, phenoxazole, isoxazole, 1,2-thiazole, 1,3-thiazole, benzothiazole, pyridazine, benzopyridazine, pyrimidine, benzopyrimidine, quinoxaline, pyrazine, phenazine, 1,5-naphthyridine, carbazole, benzocholine, phenanthroline, 1,2,3-triazole, 1,2,4-triazole, benzotriazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 1,3,5-triazine, 1,2,4-triazine, 1,2,3-triazine, tetrazole. 1,2,4,5-tetrazine, 1,2,3,4-tetrazine, 1,2,3,5-tetrazine, purine, pteridine, indolizine and benzothiadiazole. For the purposes of the present disclosure, aromatic and heteroaromatic ring systems are particularly considered to, in addition to the above-mentioned aryl and heteroaryl groups, also refer to biphenylene, terphenylene, fluorene, spirofluorene, dihydrophenanthrene, tetrahydropyrene, and cis- or trans-indenofluorene.

In some embodiments, the compound comprises a structural unit of formulas (1)-(1e) or (2)-(2e), wherein $Ar^1$ to $Ar^5$ may be the same or difference at each occurrence, are independently selected from the group consisting of aromatic/heteroaromatic groups containing 5 to 20 ring atoms; preferably from the aromatic/heteroaromatic containing 5 to 18 ring atoms, more preferably from the aromatic/heteroaromatic groups containing 5 to 15 ring atoms; and most preferably from the aromatic/heteroaromatic groups containing 5 to 10 ring atoms; they can be unsubstituted or further substituted by one or two $R^4$ groups. Preferred aromatic/heteroaryl groups include benzene, naphthalene, anthracene, phenanthrene, pyridine, pyrene, and thiophene.

In some embodiments, $Ar^1$ to $Ar^5$ are each independently selected from the following structural formulas:

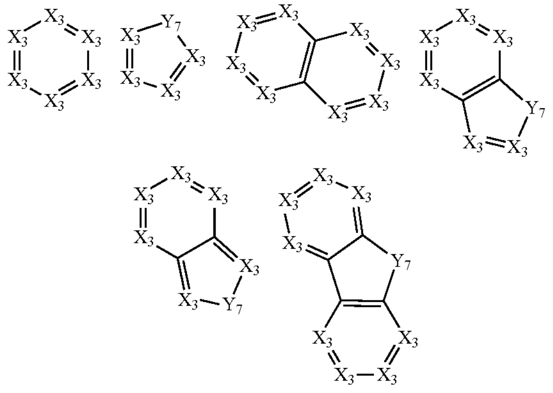

each $X_3$ is $CR^6$ or N;

each $Y_7$ is $CR^7R^8$, $SiR^9R^{10}$, $NR^6$, C(=O), S, or O.

Further, each of $Ar^1$, $Ar^2$, $Ar^3$, $Ar^4$, $Ar^5$ can be independently selected from one or any combination of the following structural formulas, which may be further arbitrarily substituted:

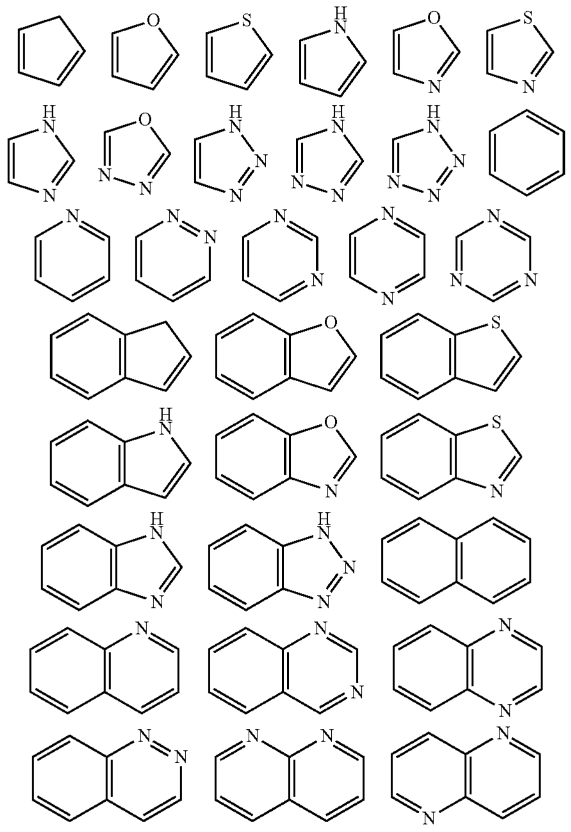

-continued

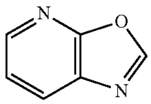 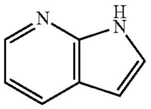 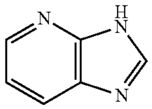

For the purposes of the present disclosure, in some embodiments, each of $Ar^1$ to $Ar^5$ is phenyl in the structural units of formula (1)-(1e) or (2)-(2e).

In some embodiments, the compound comprises a structural unit of formula (1a) or (2a):

(1a)

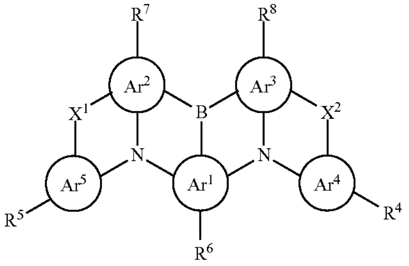

(2a)

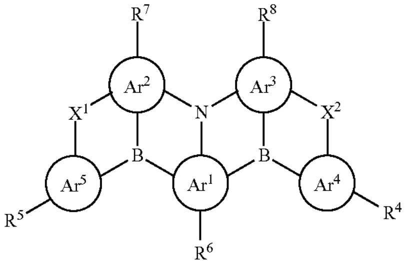

wherein each of $X^1$ and $X^2$ is 0 or S, and particularly preferably is O.

In some embodiments, the compound comprises a structural unit of formula (1d), (2d), (1e), or (2e):

(1d)

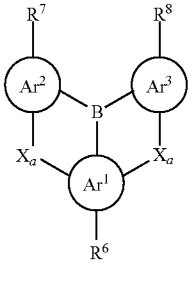

(2d)

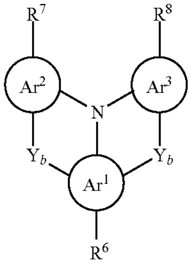

-continued (1e)

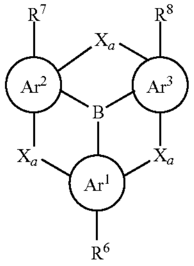

(2e)

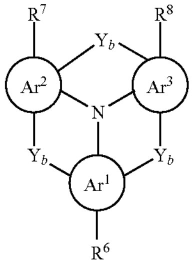

Preferably, each $Y_b$ in formulas (2d) and (2e) is independently C═O, O, P(═O)$R^9$, S═O, or $SO_2$; and particular preferably is C═O.

Preferably, each $X_a$ in formulas (1d) and (1e) is independently N($R^9$), C($R^9R^{10}$), Si($R^9R^{10}$), O, S.

In some embodiments, the structural units according to the formulas (1)-(2), (1a)-(1e), (2a)-(2e), wherein $R^4$ to $R^8$ may be same or different, at each occurrence, comprising the following units or any combination thereof:

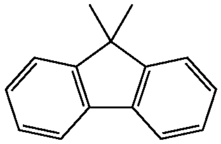 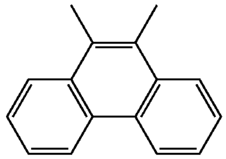

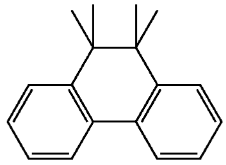 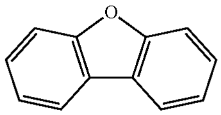

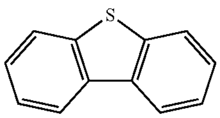 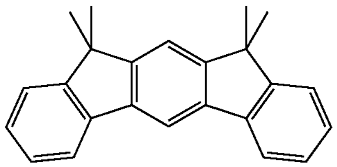

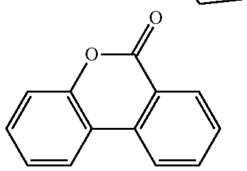 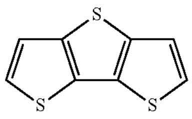

-continued
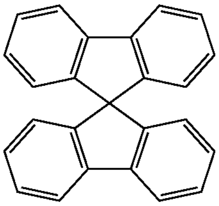
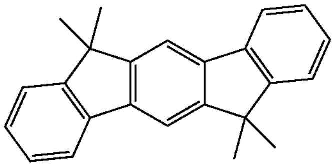
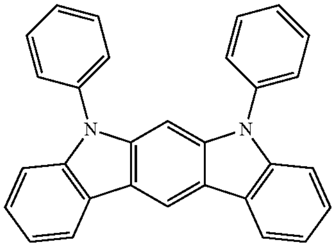
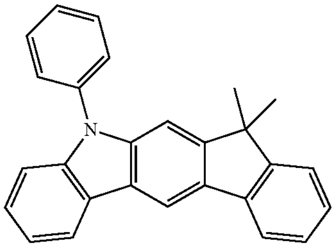
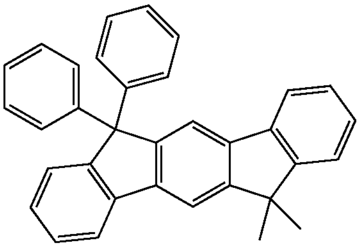
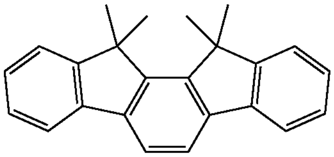
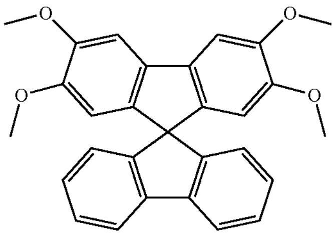
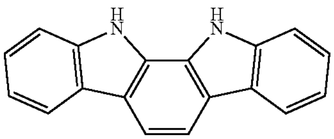
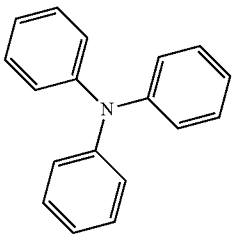
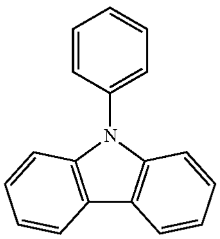
-continued
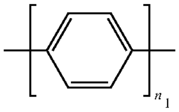
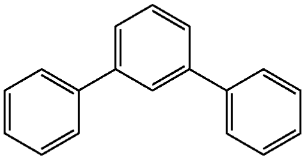
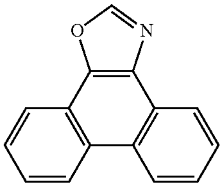
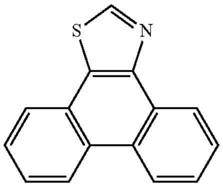
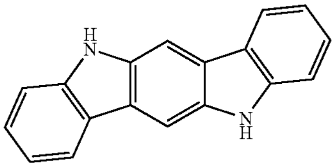
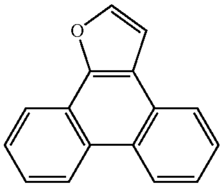
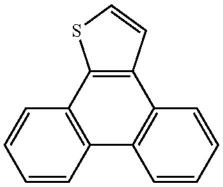
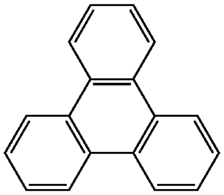
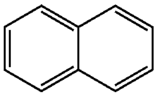
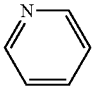
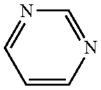
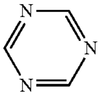
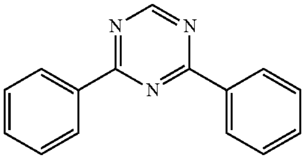
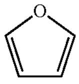
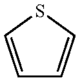
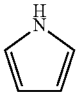
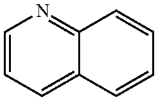
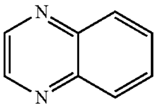
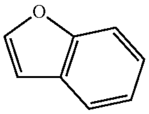
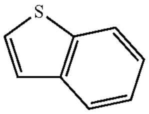
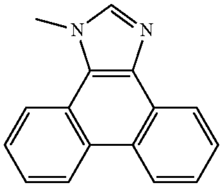
wherein $n_1$ is 1, or 2, or 3, or 4.
In some embodiments, the structure of the compound is shown below:

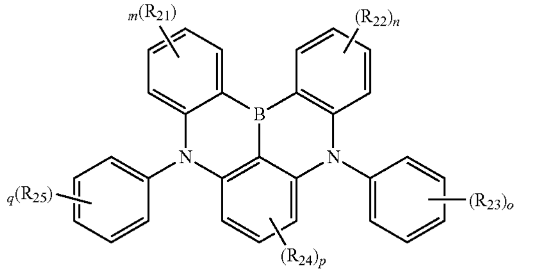

wherein, $R_{21}$ to $R_{25}$ are independently selected from the group consisting of H, D, a $C_1$-$C_{20}$ linear alkyl group, a $C_1$-$C_{20}$ alkoxy group, a $C_1$-$C_{20}$ thioalkoxy group, a $C_3$-$C_{20}$ branched/cyclic alkyl group, a $C_3$-$C_{20}$ branched/cyclic alkoxy group, a $C_3$-$C_{20}$ branched/cyclic thioalkoxy group, a $C_3$-$C_{20}$ branched/cyclic silyl group, a $C_1$-$C_{20}$ substituted ketone group, a $C_2$-$C_{20}$ alkoxycarbonyl group, a $C_7$-$C_{20}$ aryloxycarbonyl group, a cyano group (—CN), a carbamoyl group (—C(=O)$NH_2$), a haloformyl group (—C(=O)—X where X represents a halogen atom), a formyl group (—C(=O)—H), an isocyano group, an isocyanate group, a thiocyanate group, an isothiocyanate group, a hydroxyl group, a nitro group, a $CF_3$ group, Cl, Br, F, a crosslinkable group, a substituted/unsubstituted aromatic/heteroaromatic group containing 5 to 40 ring atoms, an aryloxy/heteroaryloxy group containing 5 to 40 ring atoms, and any combination thereof, wherein one or more of the substituent groups can form a monocyclic or polycyclic aliphatic or aromatic ring system with each other and/or with the ring bonded to the groups; and at least one of $R_{21}$ to $R_{24}$ comprises an alcohol-soluble or a water-soluble group.

m, n are integers from 0 to 4; o, q are integers from 0 to 5; p is an integer from 0 to 3.

Preferably, $R_{21}$-$R_{25}$ are independently selected from the group consisting of H, D, a $C_1$-$C_{10}$ linear alkyl group, a $C_1$-$C_{10}$ alkoxy group, a $C_1$-$C_{10}$ thioalkoxy group, a $C_3$-$C_{10}$ branched/cyclic alkyl group, a $C_3$-$C_{10}$ branched/cyclic alkoxy group, a $C_3$-$C_{10}$ branched/cyclic thioalkoxy group, a $C_3$-$C_{10}$ branched/cyclic silyl group, a $C_1$-$C_{20}$ substituted ketone group, a $C_2$-$C_{10}$ alkoxycarbonyl group, a $C_7$-$C_{10}$ aryloxycarbonyl group, a cyano group (—CN), a carbamoyl group (—C(=O)$NH_2$), a haloformyl group (—C(=O)—X where X represents a halogen atom), a formyl group (—C(=O)—H), an isocyano group, an isocyanate group, a thiocyanate group, an isothiocyanate group, a hydroxyl group, a nitro group, a $CF_3$ group, Cl, Br, F, a crosslinkable group, a substituted/unsubstituted aromatic/heteroaromatic group containing 5 to 20 ring atoms, an aryloxy/heteroaryloxy group containing 5 to 20 ring atoms, and any combination thereof, wherein one or more of the substituent $R^2$ groups can form a monocyclic or polycyclic aliphatic or aromatic ring system with each other and/or with the ring bonded to the groups.

In the embodiments of the present disclosure, triplet energy level (T1), singlet energy level (S1), HOMO, and LUMO play key roles in the energy level structure of the organic material. The determination of these energy levels is introduced as follows.

Highest occupied molecular orbital (HOMO) and lowest unoccupied molecular orbital (LUMO) energy levels can be measured by photoelectric effects, for example by XPS (X-ray photoelectron spectroscopy), UPS (UV photoelectron spectroscopy), or by cyclic voltammetry (hereinafter referred to as CV). Recently, quantum chemical methods, such as density functional theory (hereinafter referred to as DFT), are becoming effective methods for calculating the molecular orbital energy levels.

The triplet energy level T1 of an organic material can be measured by a low-temperature time-resolved spectroscopy, or by quantum simulation calculation (for example, by Time-Dependent DFT), for instance with the commercial software Gaussian 03W (Gaussian Inc.).

The singlet energy level S1 of an organic material can be determined by the absorption spectrum or the emission spectrum, and can also be obtained by quantum simulation calculation (such as Time-dependent DFT).

It should be noted that the absolute values of HOMO, LUMO, T1 and Si may varies depend on the measurement method or calculation method used. Even for the same method, different ways of evaluation, for example, using either the onset or peak value of a CV curve as reference, may result in different HOMO/LUMO values. Therefore, a reasonable and meaningful comparisons should be carried out by using the same measurement and evaluation methods. In the embodiments of the present disclosure, the values of HOMO, LUMO, T1, and S1 are based on Time-dependent DFT simulation, which however should not exclude the applications of other measurement or calculation methods.

In some embodiments, in the compound as described herein, the (S1−T1)≤0.30 eV, preferably ≤0.25 eV, more preferably ≤0.20 eV, particularly preferably ≤0.15 eV, and most preferably ≤0.10 eV.

In some embodiments, the FWHM of the emission spectrum of the compound ≤50 nm, preferably ≤45 nm, more preferably ≤40 nm, particularly preferably ≤35 nm, and most preferably ≤30 nm.

In some embodiments, the compound of the formulation is selected from small molecules or polymers.

In some embodiments, the compound has good solubility in the resin or resin prepolymer.

In some embodiments, the compound comprises at least one alcoholic-soluble or water-soluble group, as disclosed in a contemporaneous patent with the application No. CN 20211037084.X. The patent document above are specially incorporated herein by reference in their entirety.

In some embodiments, the compound comprises at least two alcohol-soluble or water-soluble groups.

In some embodiments, the compound comprises at least three alcohol-soluble or water-soluble groups.

In some embodiments, the alcohol-soluble or water-soluble group of the compound is selected from: alcohol, aldehyde, acid, crown ether, polyether, primary amine, and other groups.

Preferably, the alcohol-soluble or water-soluble group is selected from the group consisting of:

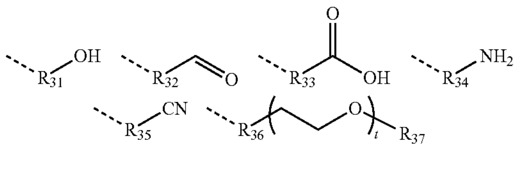

$R_{31}$ to $R_{37}$ are independently selected from the group consisting of a $C_1$-$C_{20}$ linear alkyl group, a $C_1$-$C_{20}$ alkoxy group, a $C_1$-$C_{20}$ thioalkoxy group, a $C_3$-$C_{20}$ branched/cyclic alkyl group, a $C_3$-$C_{20}$ branched/cyclic alkoxy group, a $C_3$-$C_{20}$ branched/cyclic thioalkoxy group, a $C_3$-$C_{20}$ branched/cyclic silyl group, a $C_1$-$C_{20}$ substituted ketone group, a $C_2$-$C_{20}$ alkoxycarbonyl group, a $C_7$-$C_{20}$ aryloxycarbonyl group, a cyano group (—CN), a carbamoyl group (—C(═O)$NH_2$), a haloformyl group (—C(═O)—X where X represents a halogen atom), a formyl group (—C(═O)—H), an isocyano group, an isocyanate group, a thiocyanate group, an isothiocyanate group, a hydroxyl group, a nitro group, a $CF_3$ group, Cl, Br, F, a crosslinkable group, a substituted/unsubstituted aromatic/heteroaromatic group containing 5 to 40 ring atoms, an aryloxy/heteroaryloxy group containing 5 to 40 ring atoms, and any combination thereof, wherein one or more of the substituent groups can form a monocyclic or polycyclic aliphatic or aromatic ring system with each other and/or with the ring bonded to the groups.

t is an integer greater than 0.

Furthermore, the individual H atoms or $CH_2$ groups as described herein may be substituted by groups mentioned above or group R. R is selected from $C_1$-$C_{40}$ alkyl groups, preferably from the following group consisting of: methyl, ethyl, n-propyl, isopropyl, cyclopropyl, n-butyl, isobutyl, sec-butyl, tert-butyl, cyclobutyl, methylbutyl, n-pentyl, sec-pentyl, cyclopentyl, n-hexyl, cyclohexyl, n-heptyl, cycloheptyl, n-octyl, cyclooctyl, ethylhexyl, trifluoromethyl, pentafluoroethyl, trifluoroethyl, vinyl, propenyl, butenyl, pentenyl, cyclopentenyl, hexenyl, cyclohexenyl, heptenyl, cycloheptenyl, octenyl, cyclooctenyl, ethynyl, propynyl, butynyl, pentynyl, hexynyl, and octynyl; $C_1$-$C_{40}$ alkoxy groups, such as methoxy, trifluoromethoxy, ethoxy, n-propoxy, isopropoxy, n-butoxy, isobutoxy, sec-butoxy, tert-butoxy, and methylbutoxy.

The following are examples of compounds containing alcohol-soluble or water-soluble groups as described herein but are not limited to:

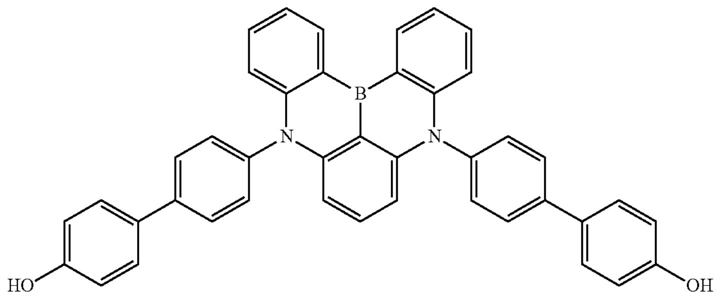

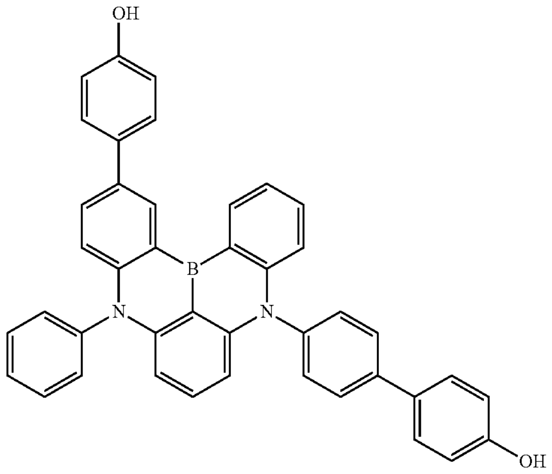

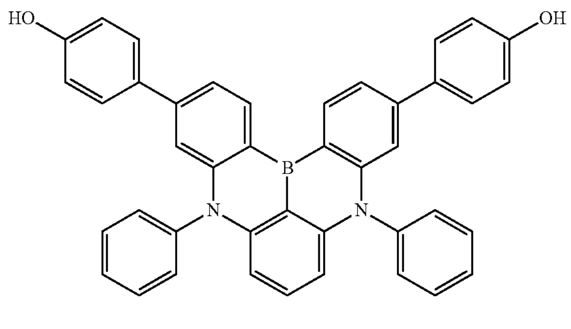

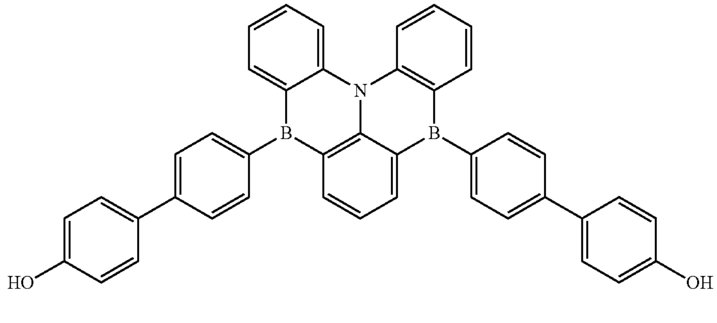

-continued
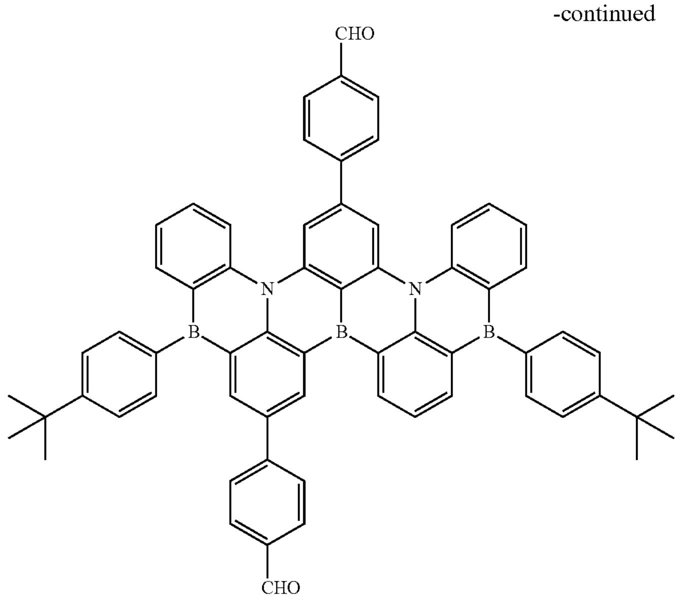
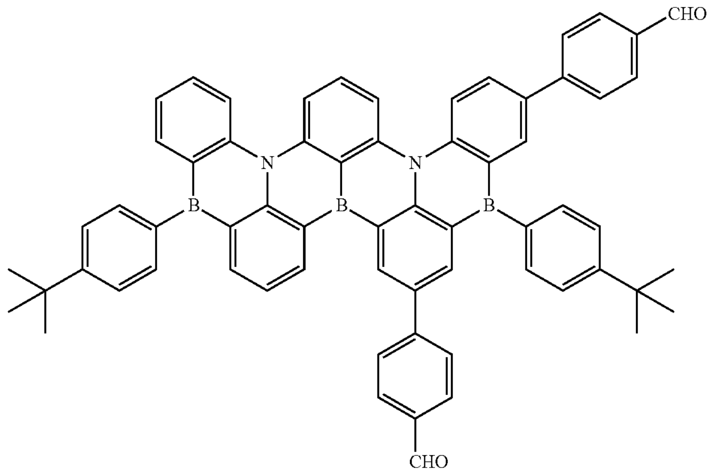
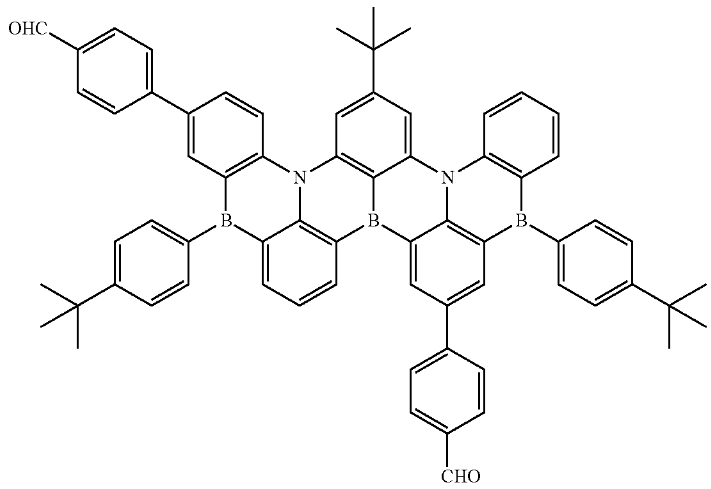

-continued
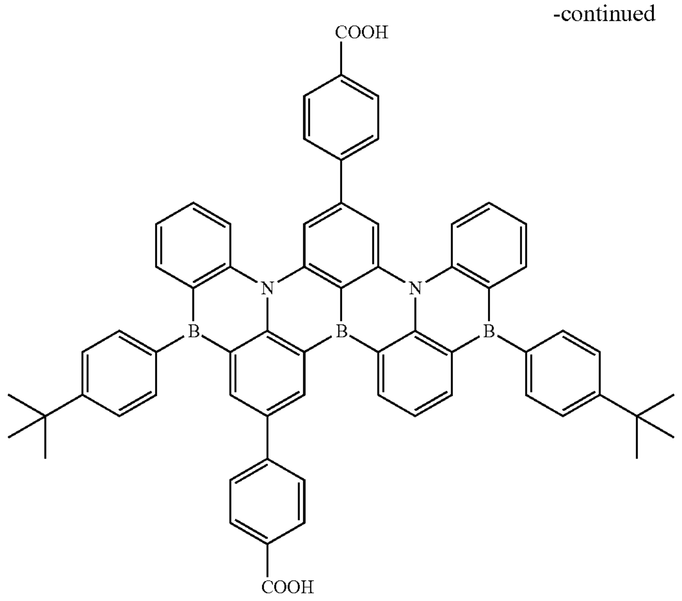
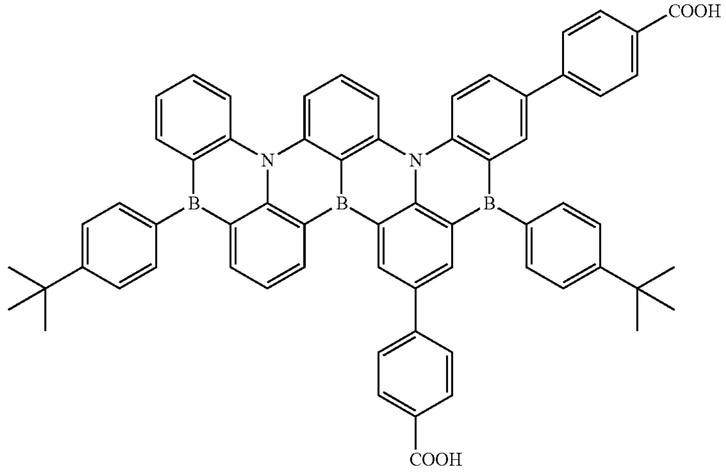
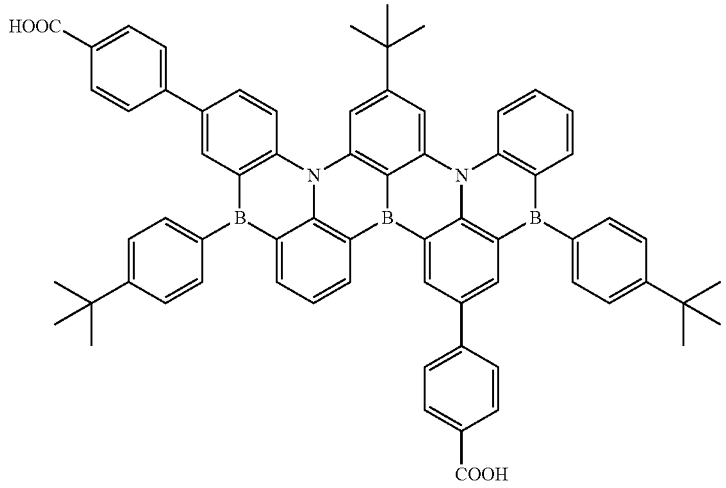

-continued
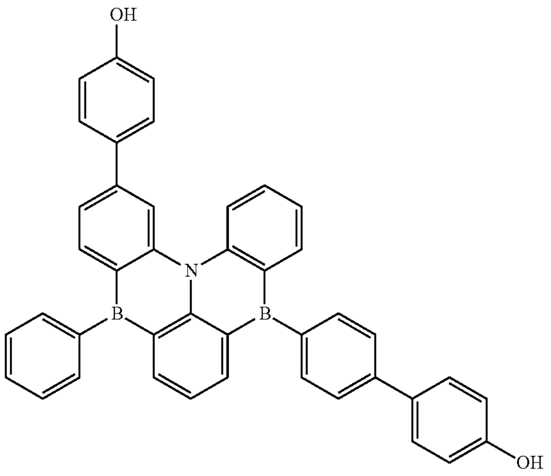
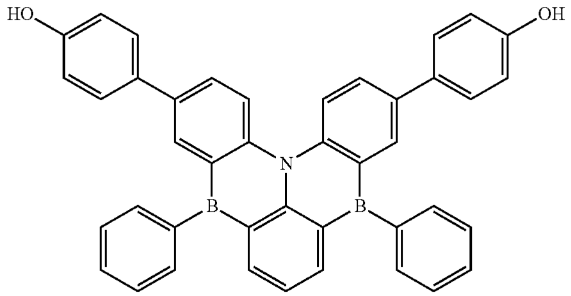
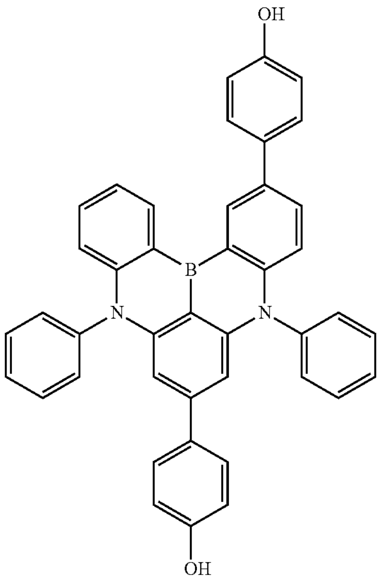
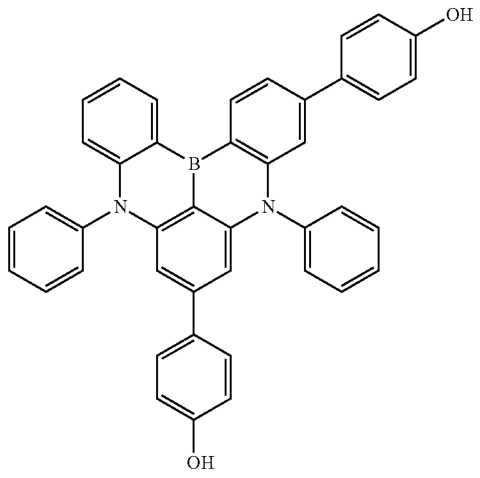
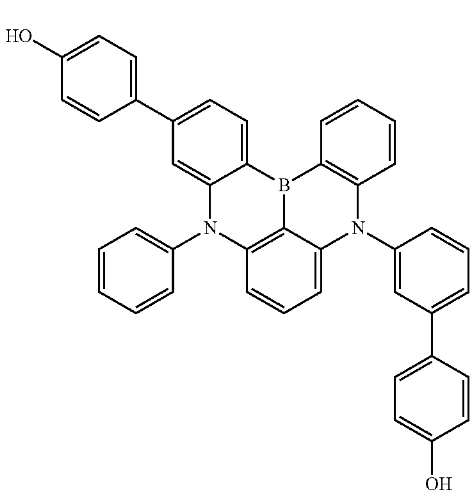
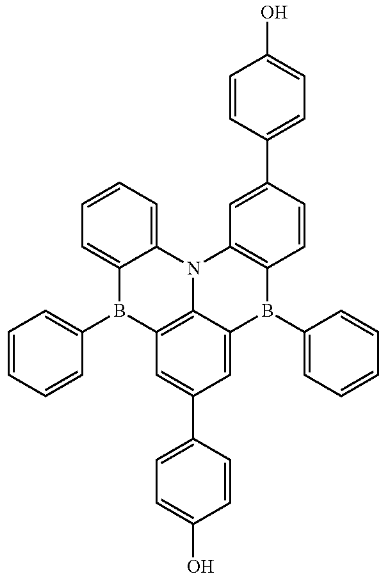

-continued
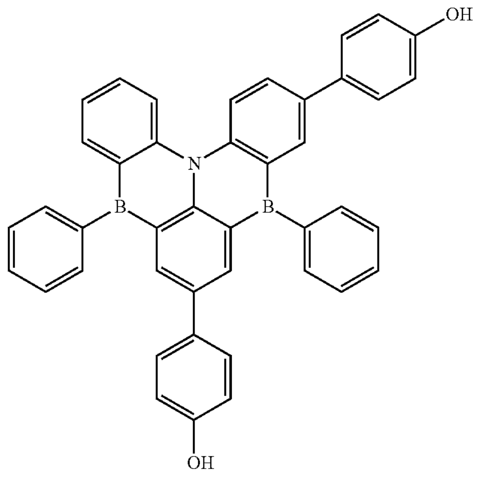
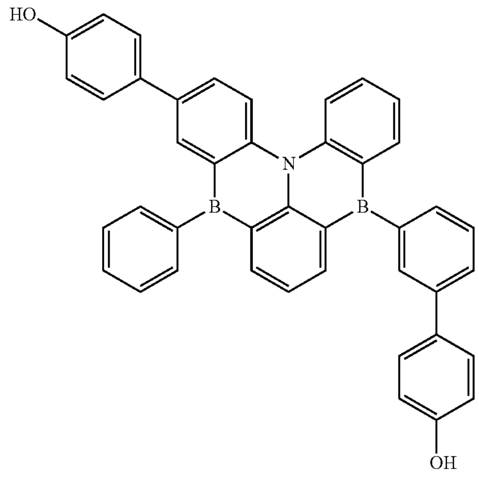
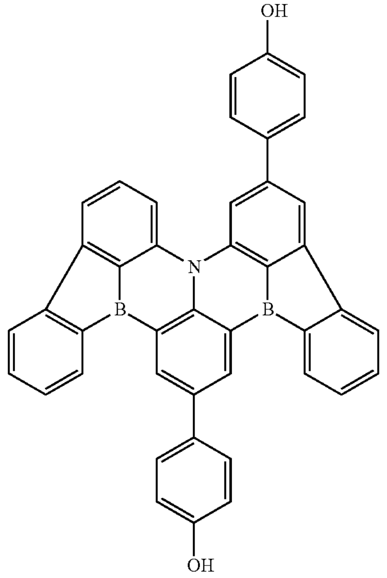
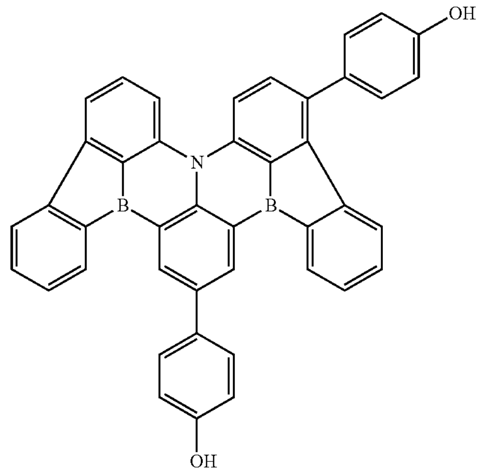
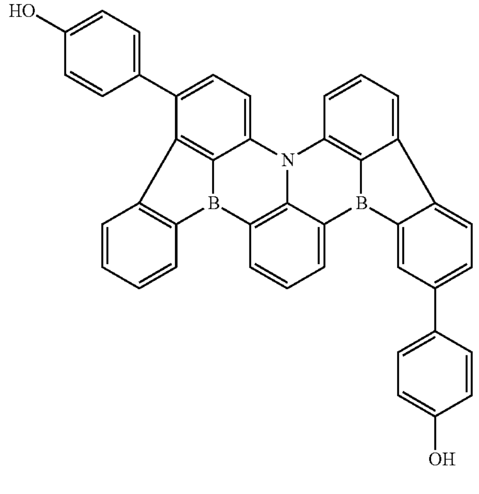
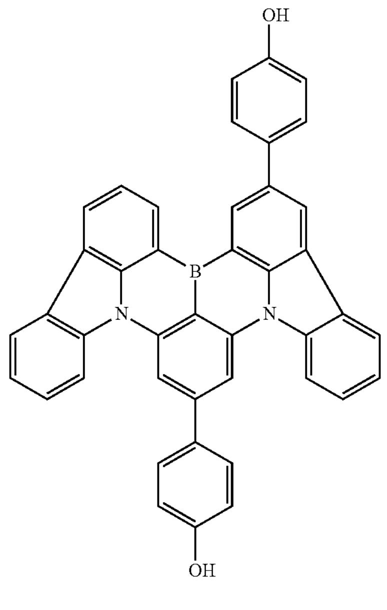

-continued
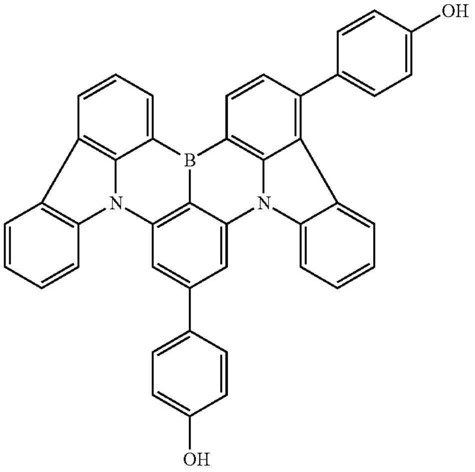
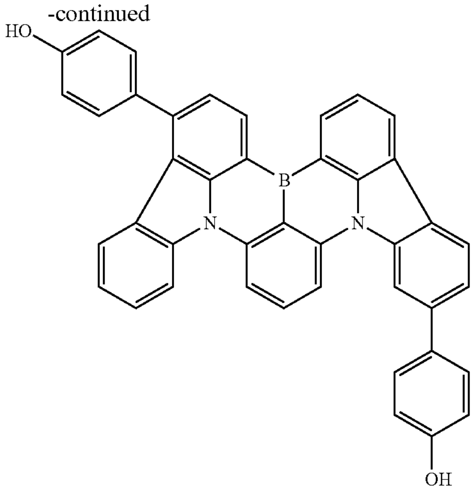
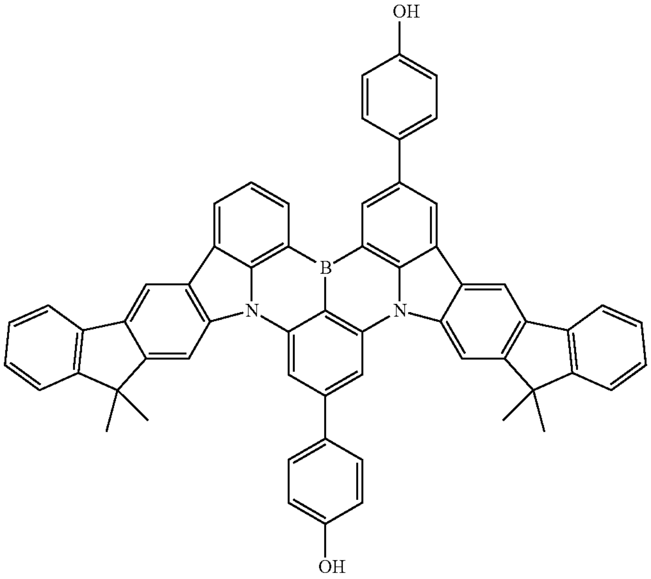
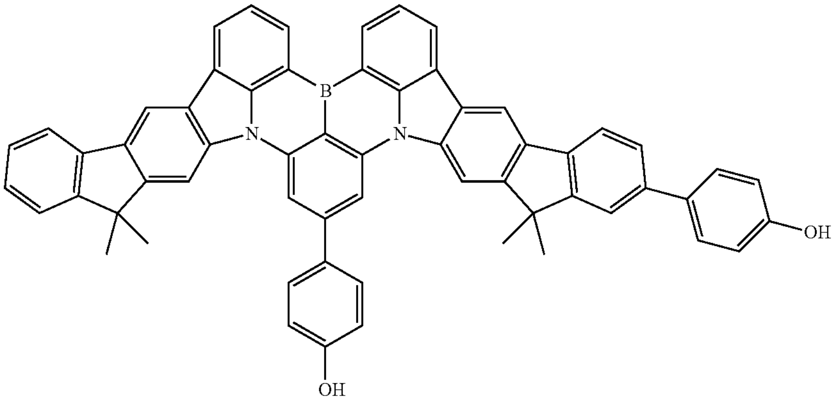

-continued
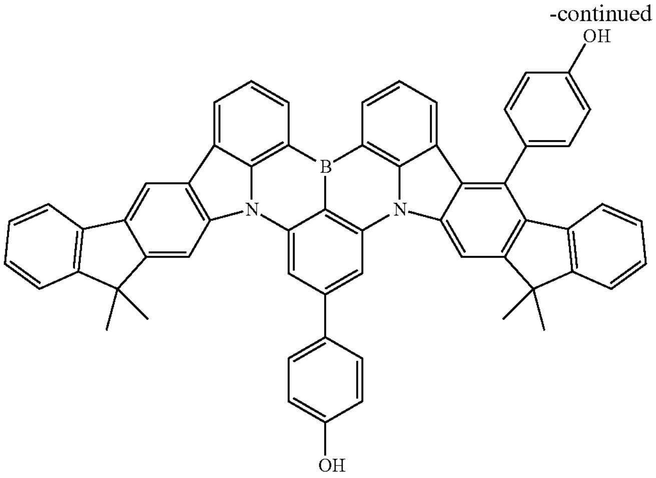
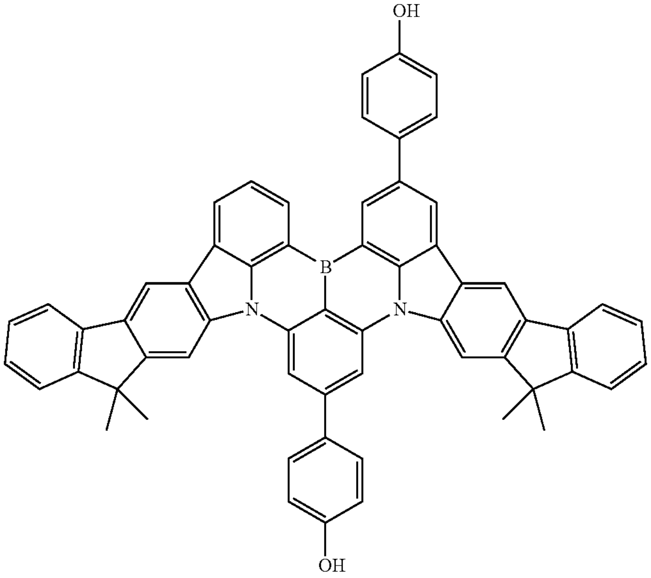
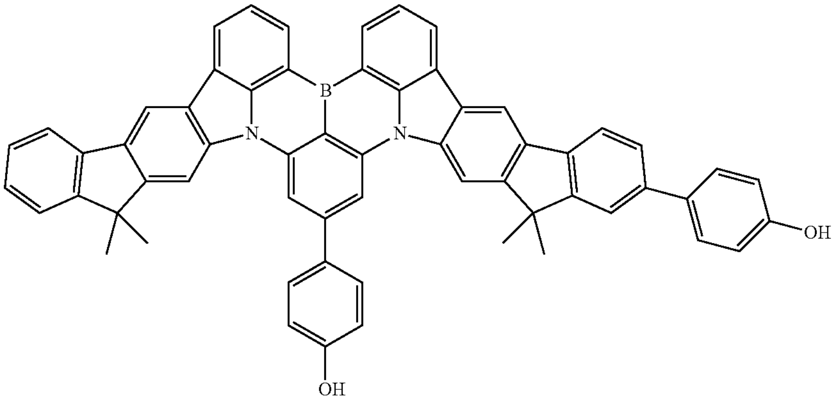

-continued
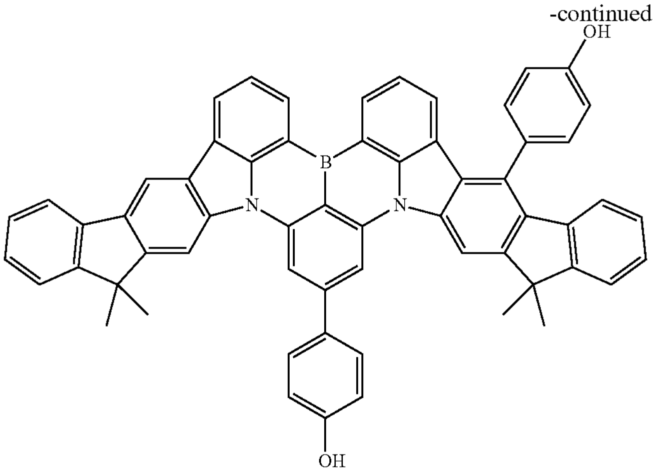
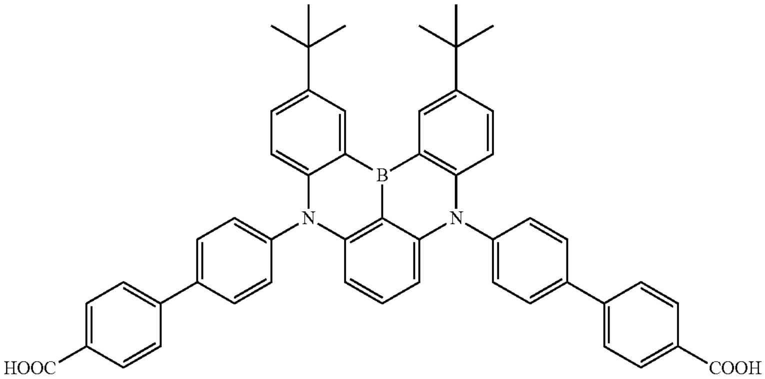
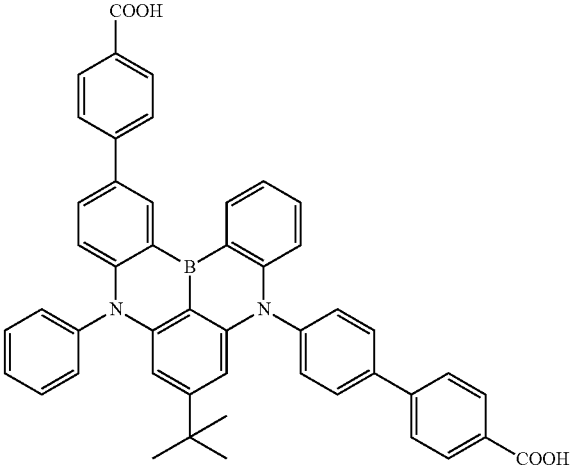
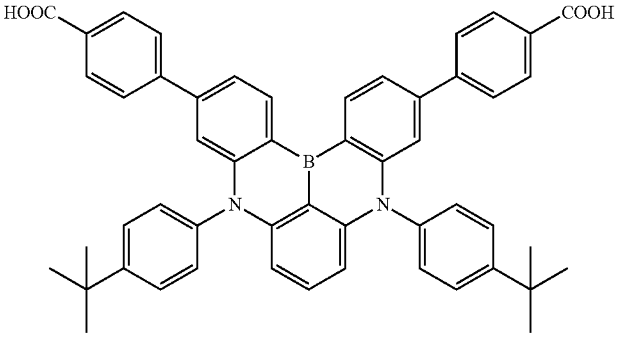

-continued
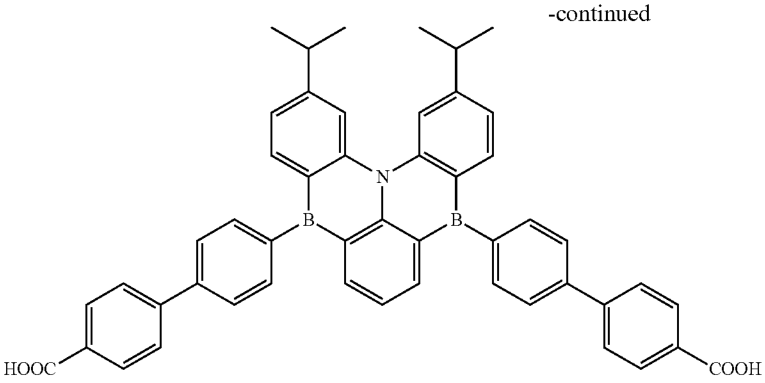
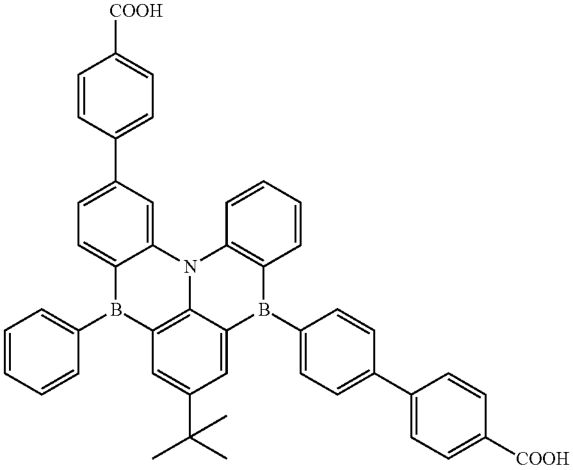
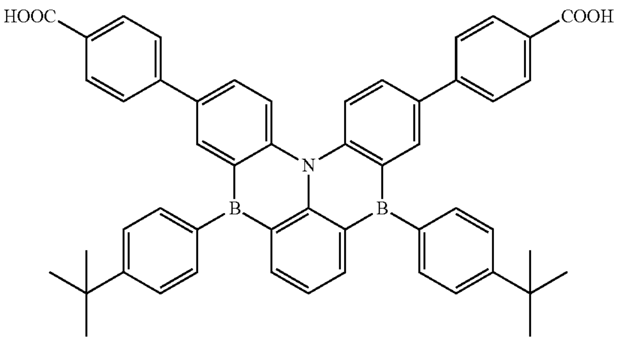
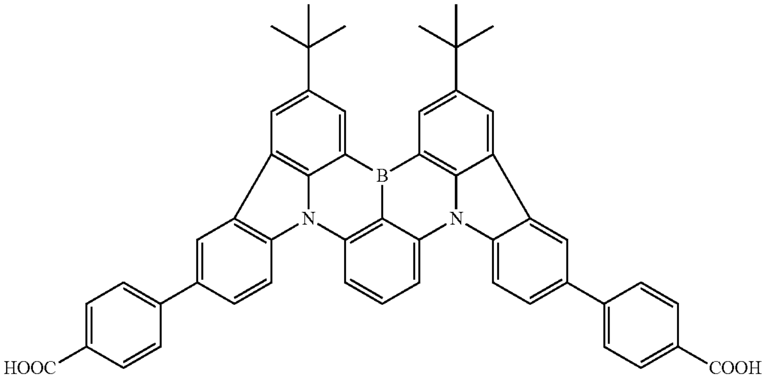

-continued
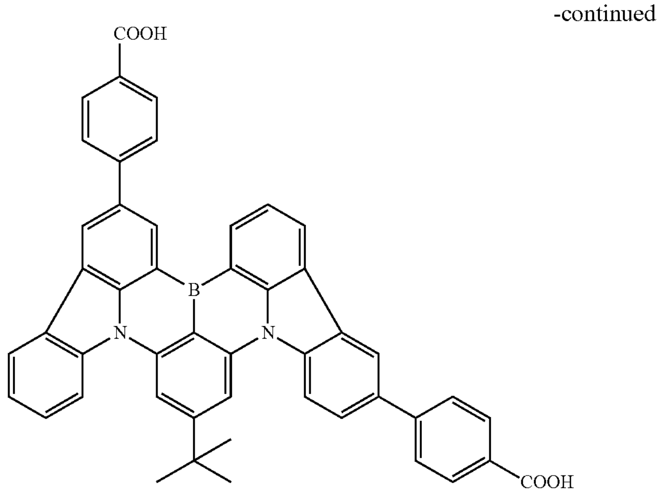
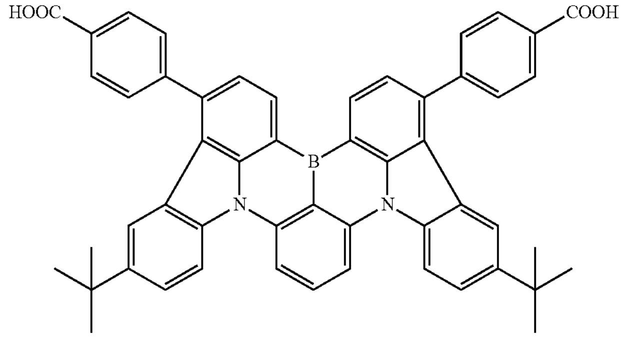
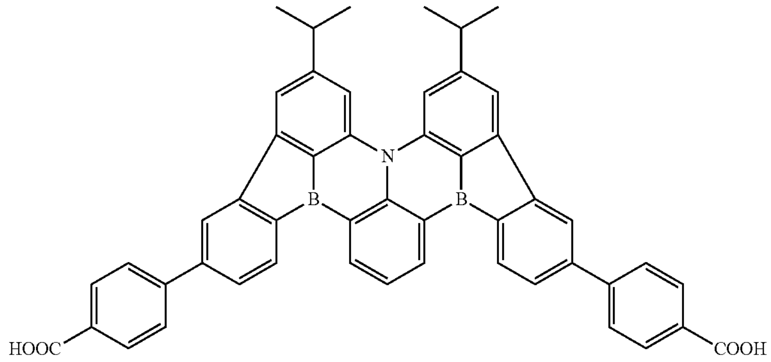
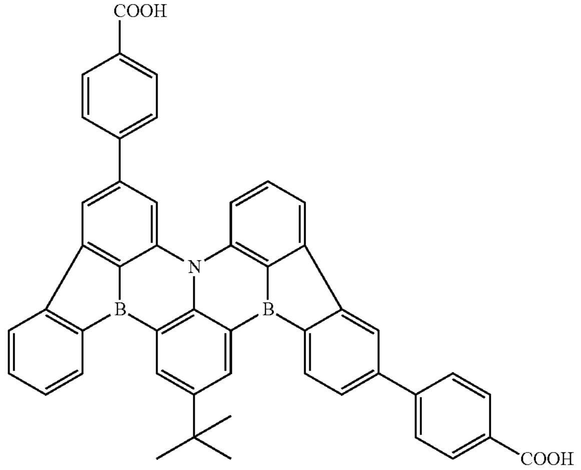

-continued
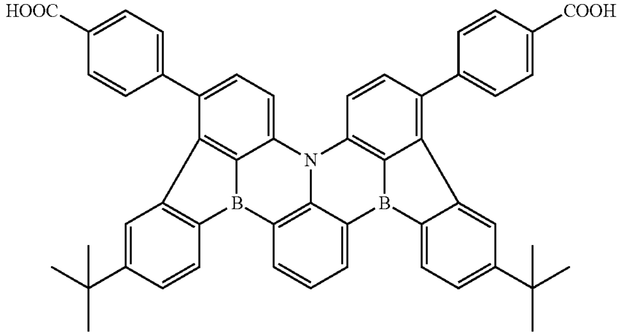
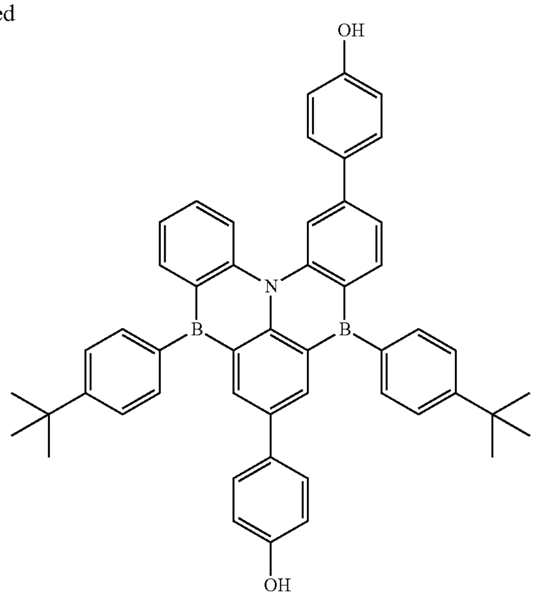
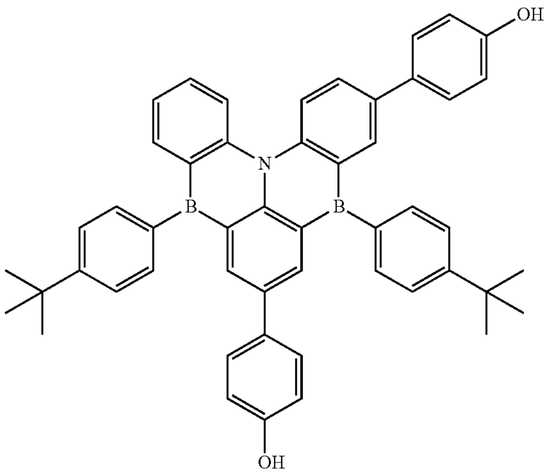
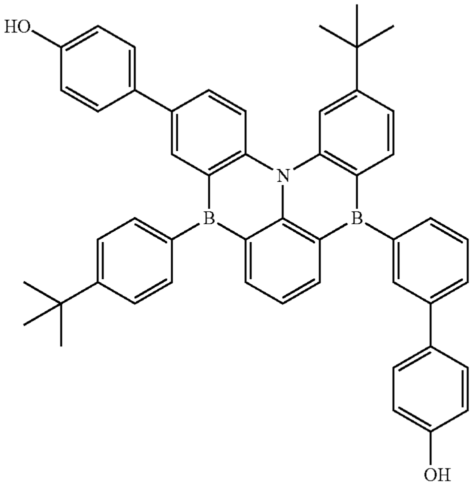
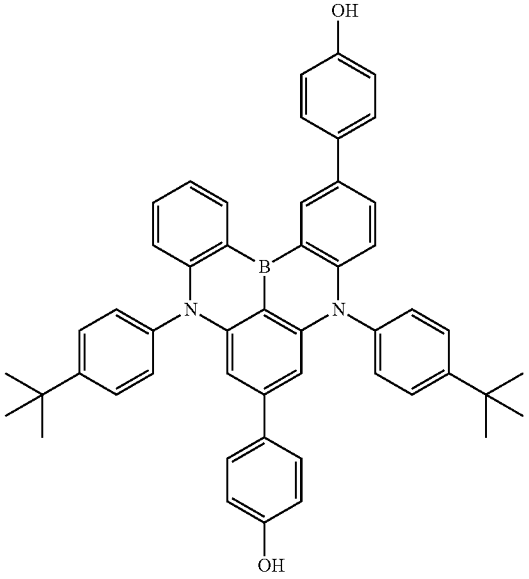
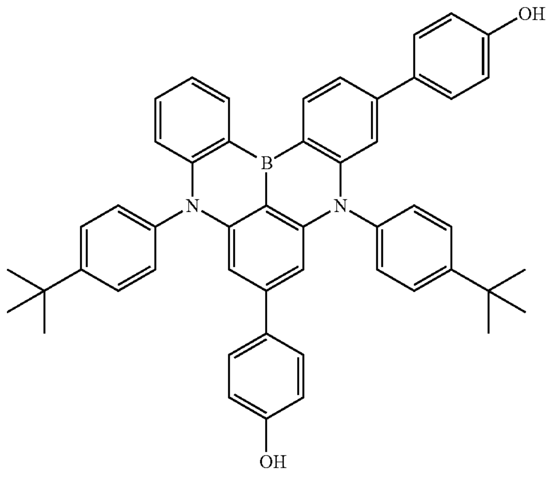

-continued
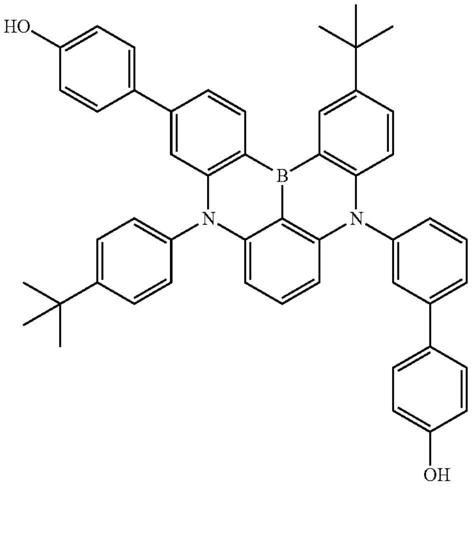
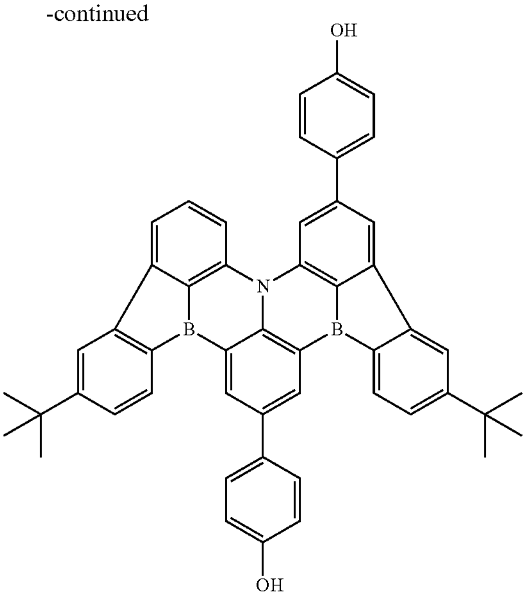
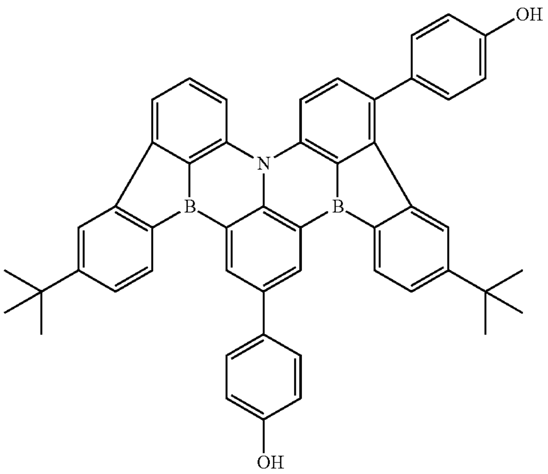
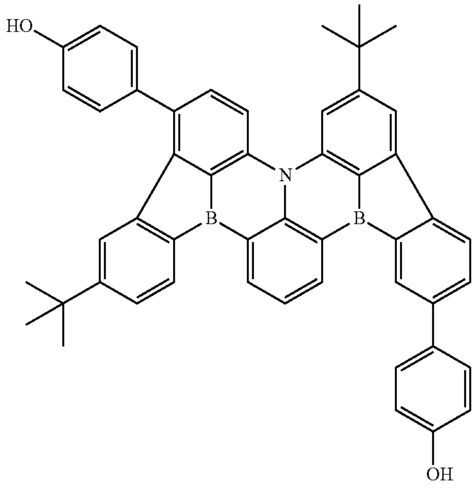
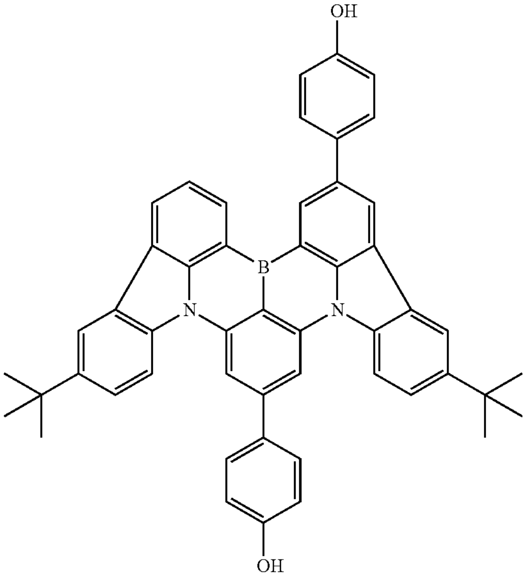
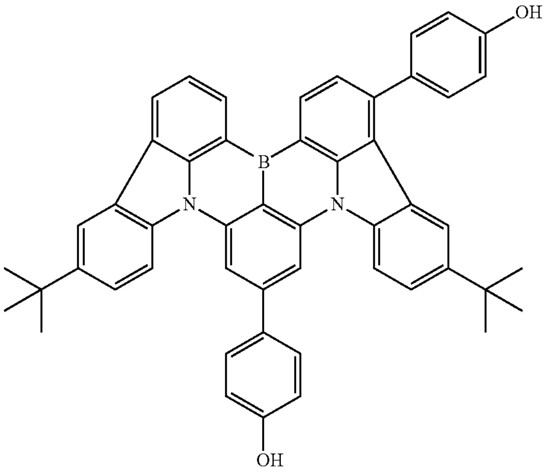

-continued
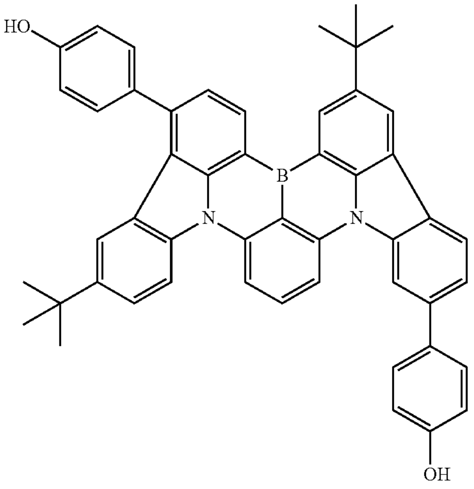
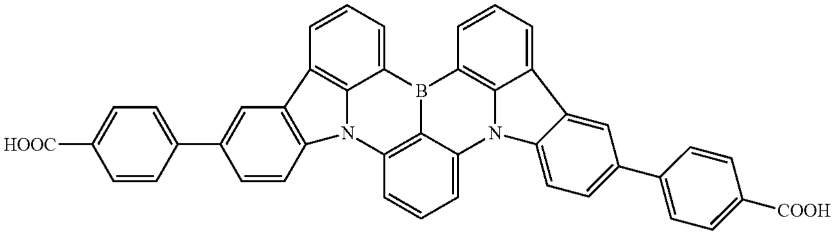
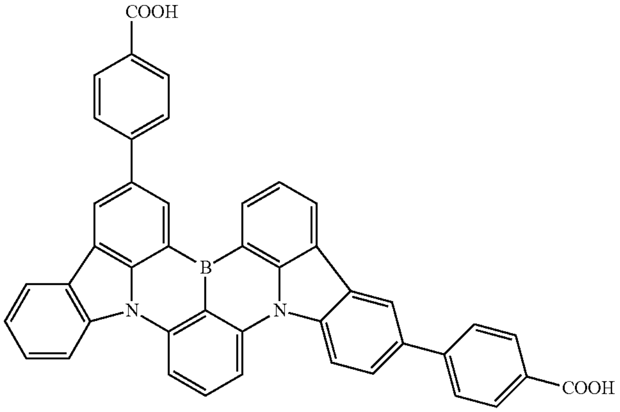
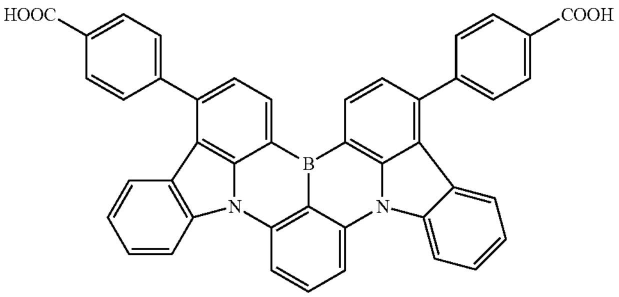
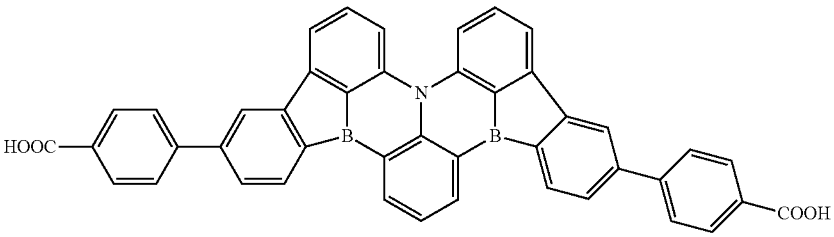

-continued
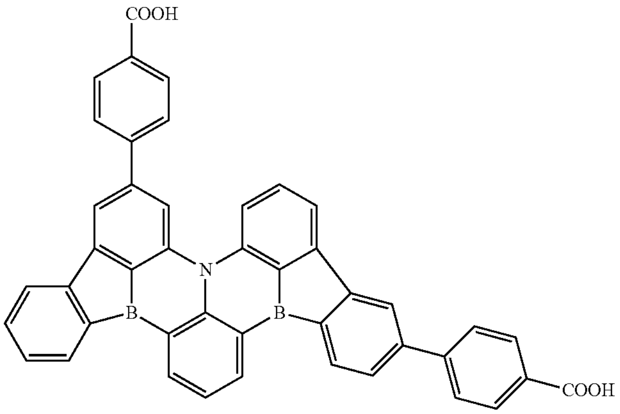
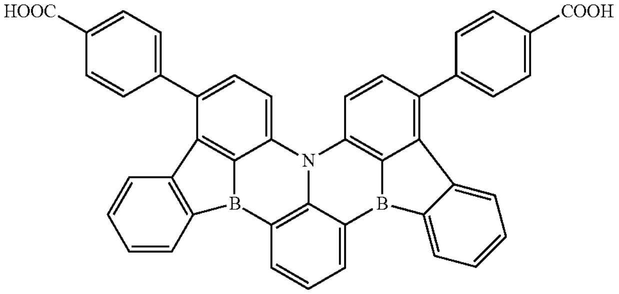
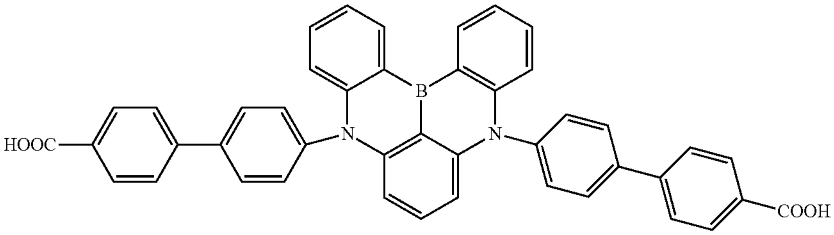
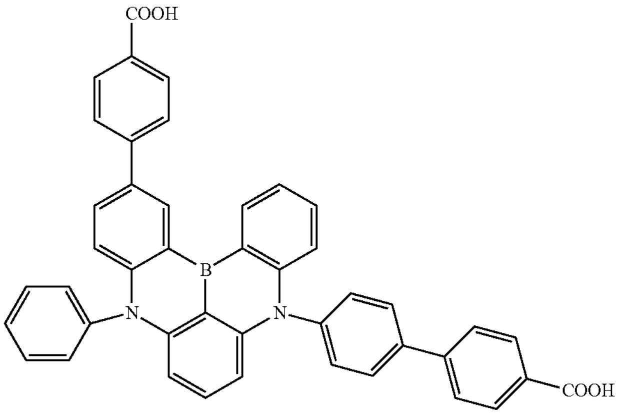
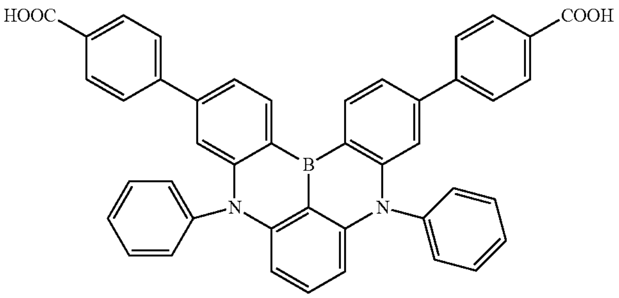

-continued
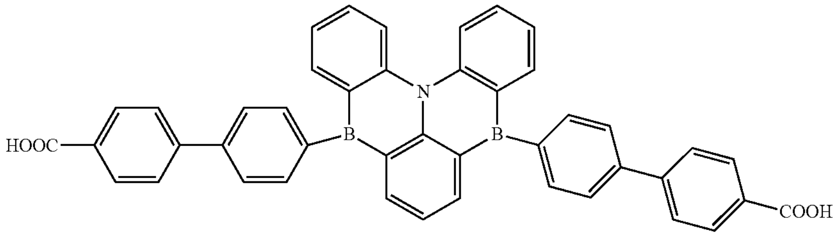
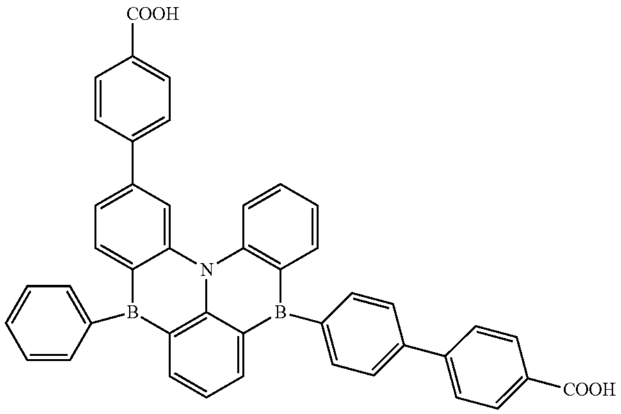
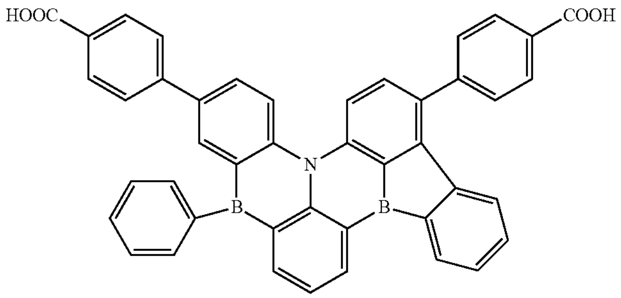
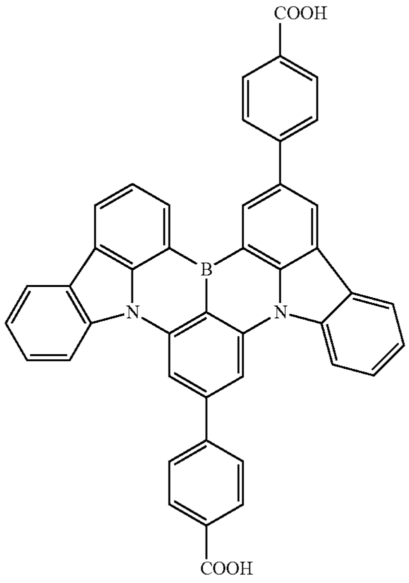
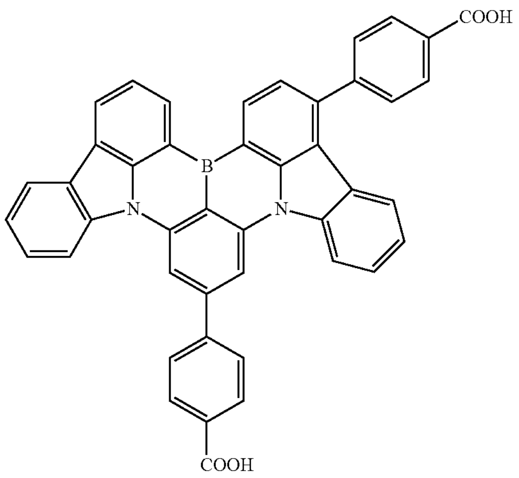
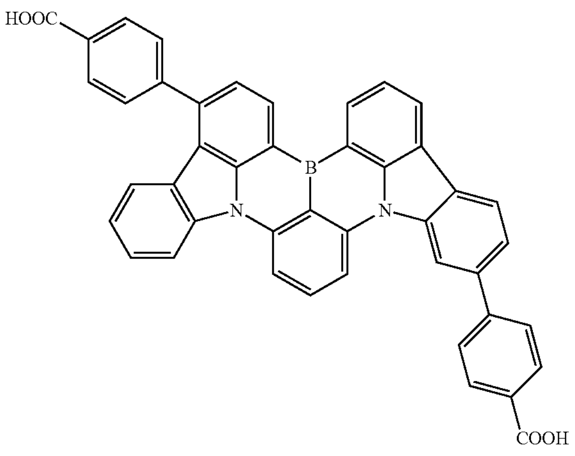

-continued
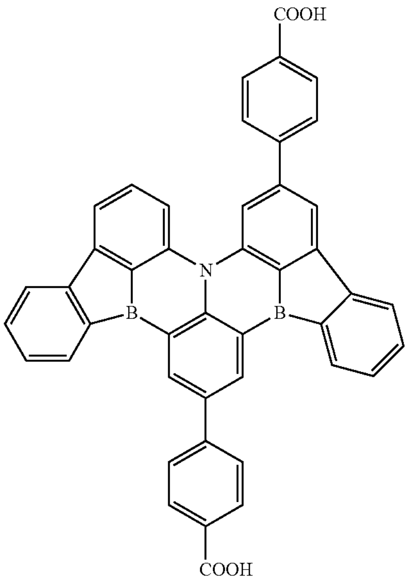
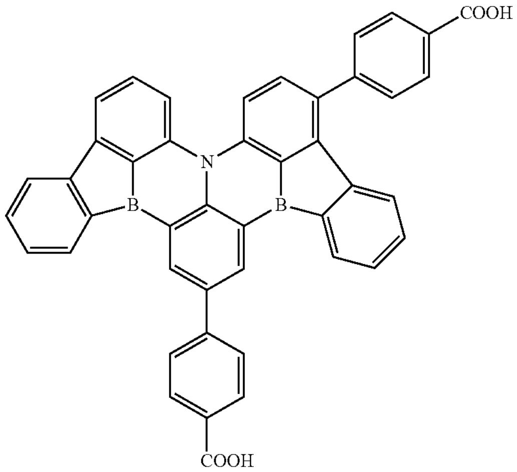
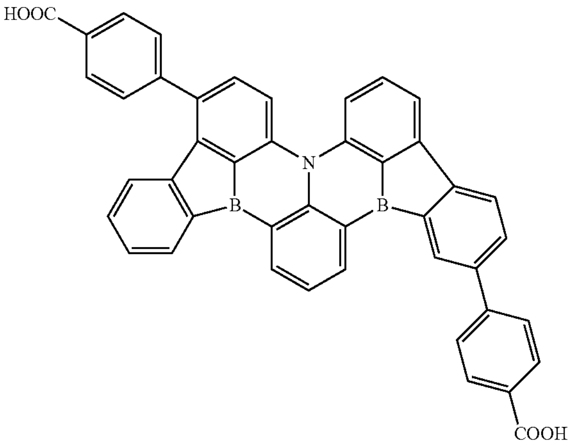
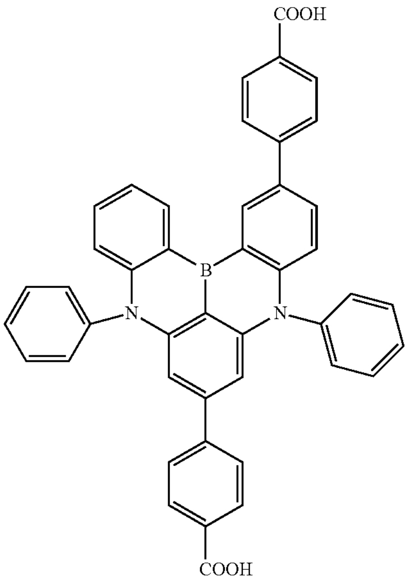
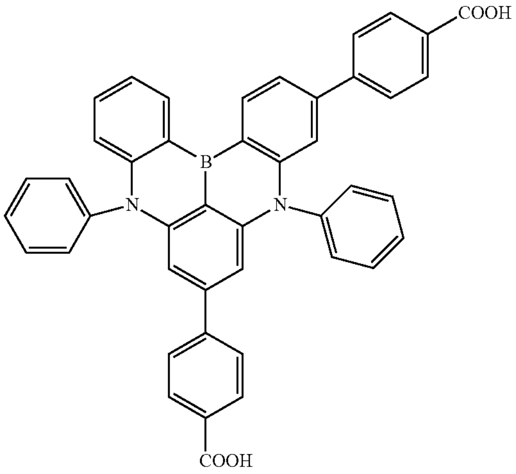
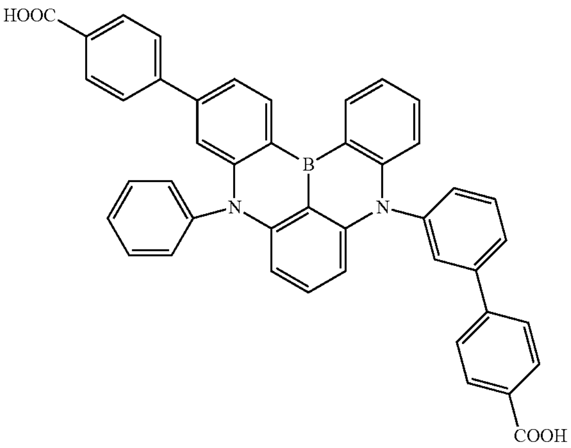

-continued
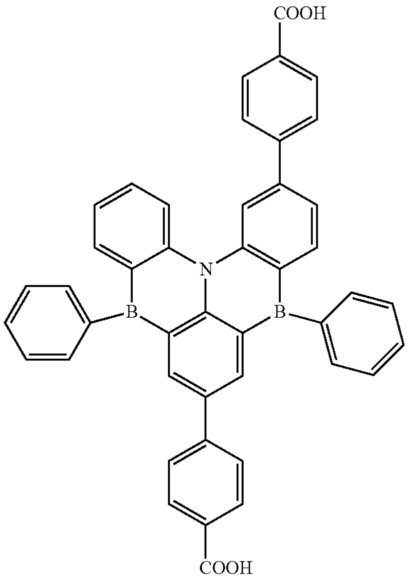
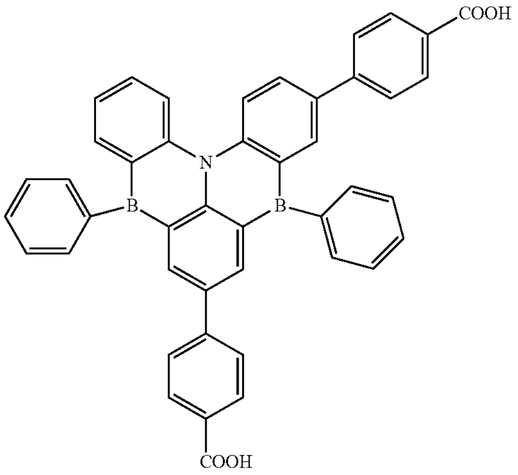
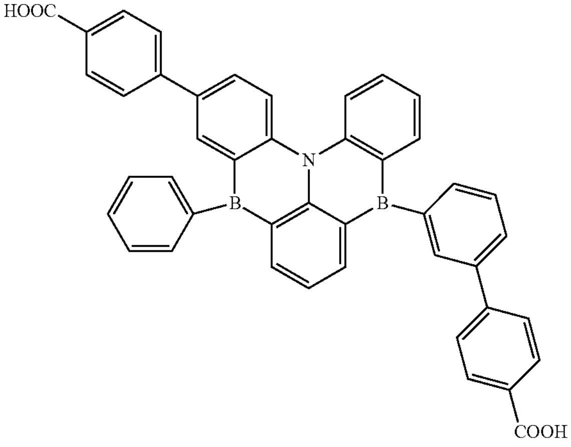
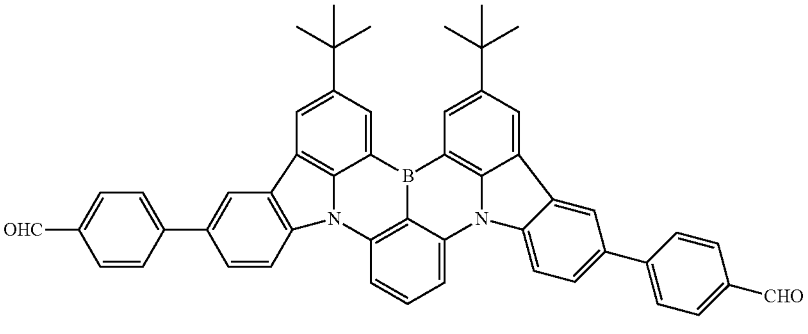

-continued
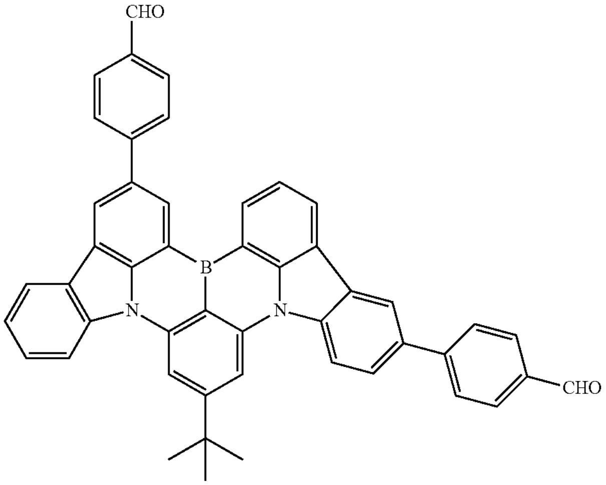
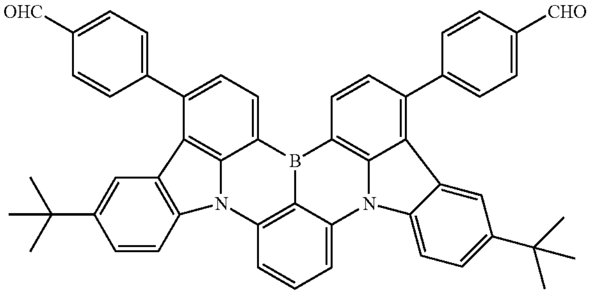
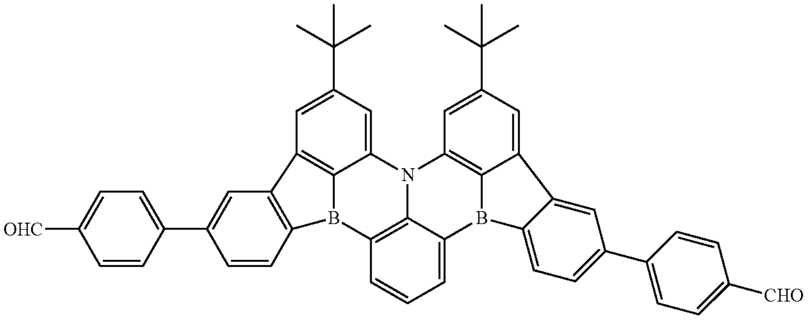
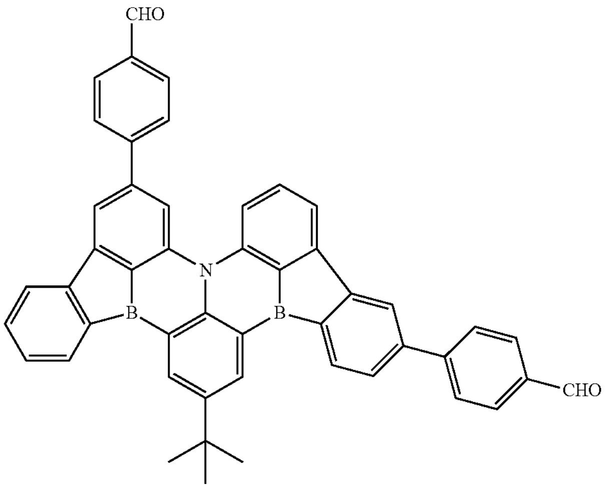

-continued
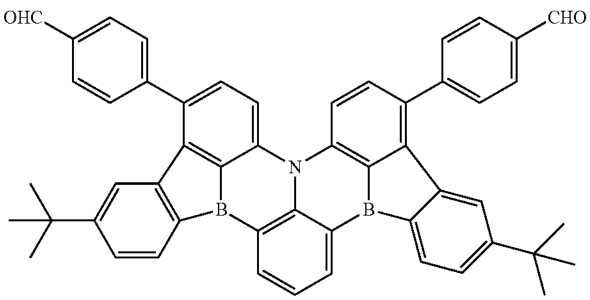
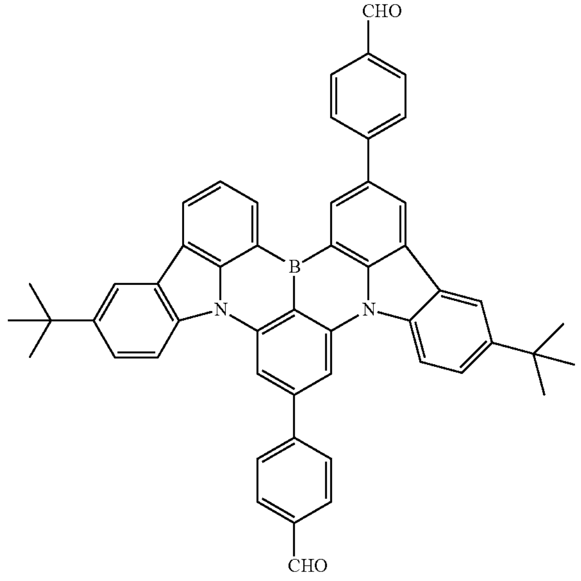
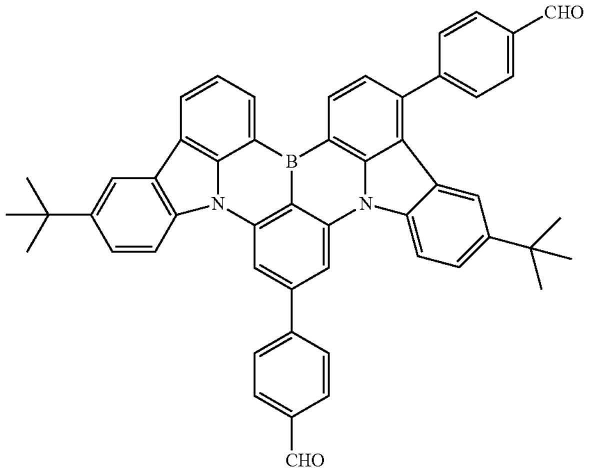
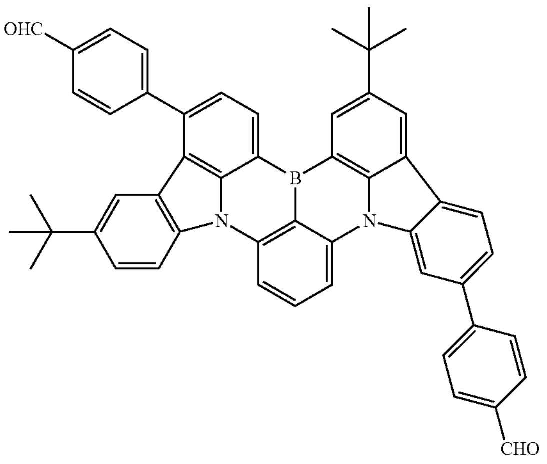
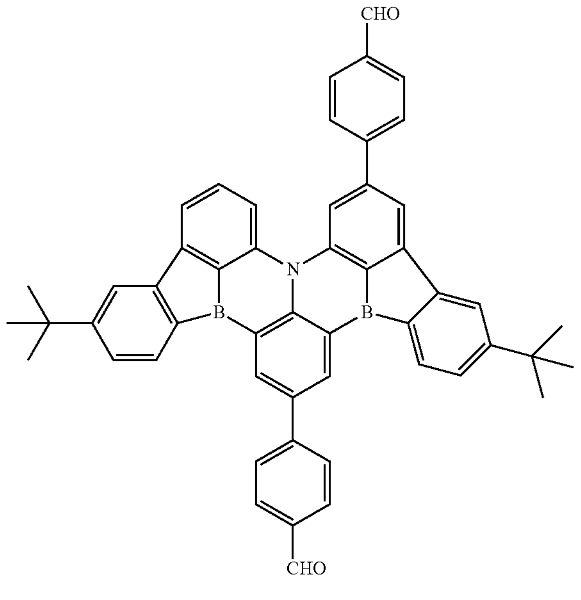

-continued
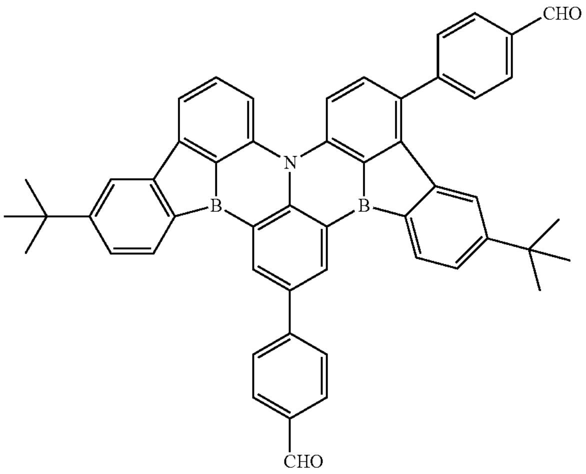
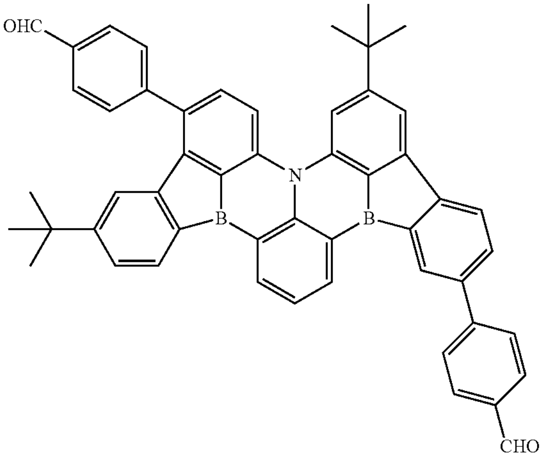
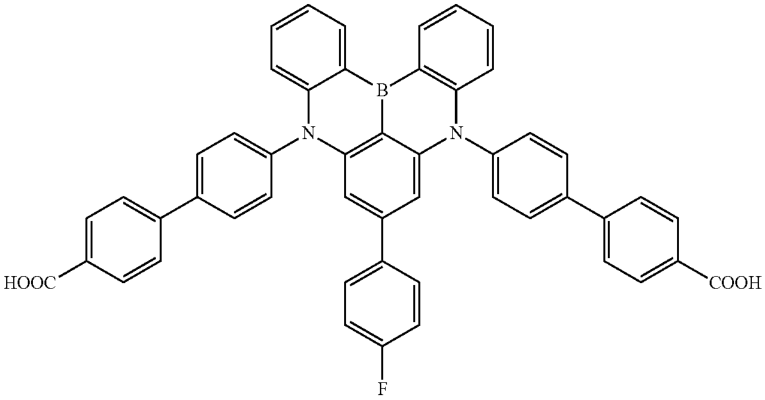
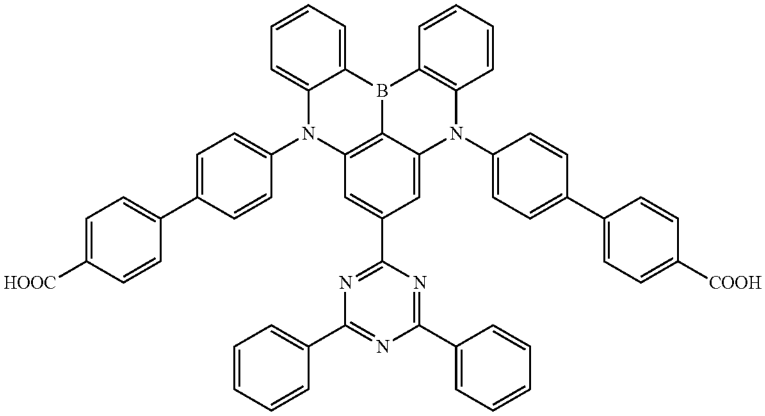

-continued
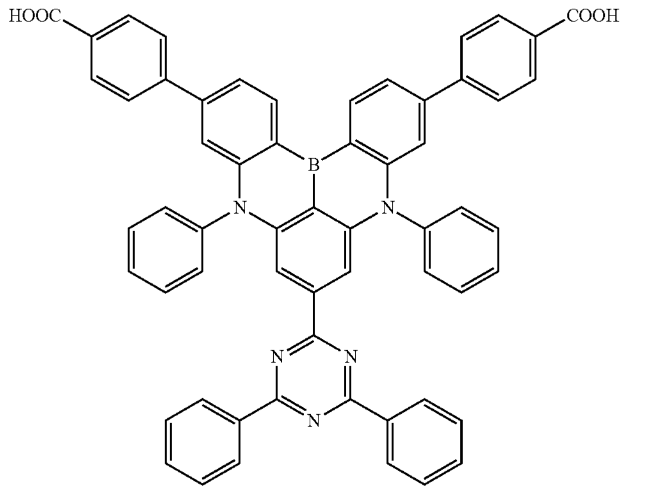
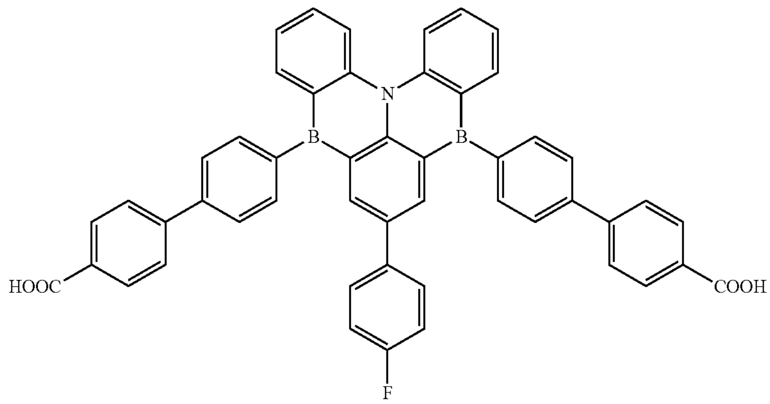
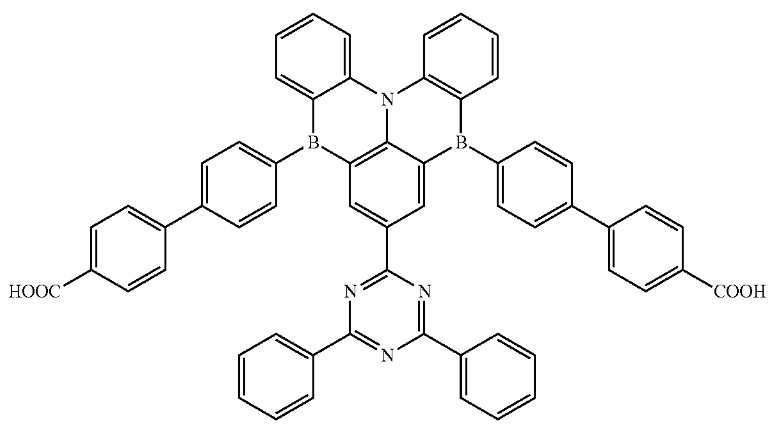

-continued
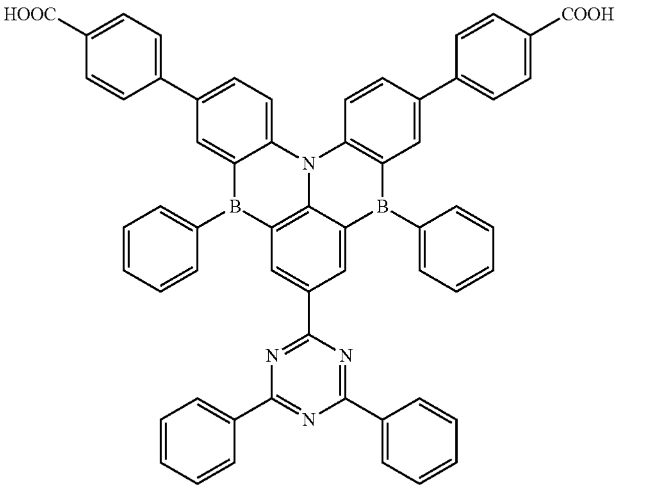
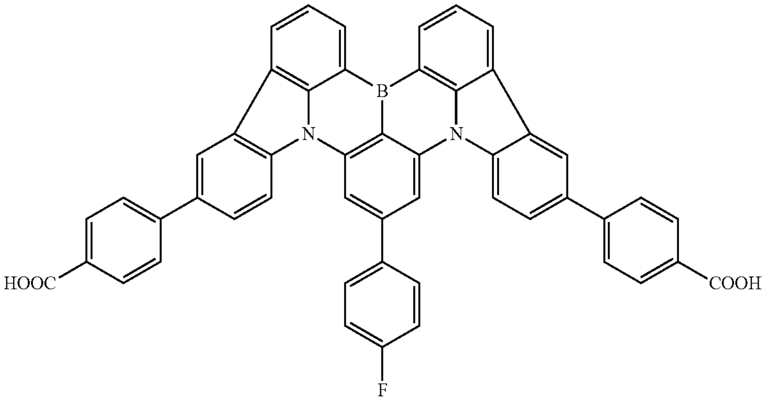
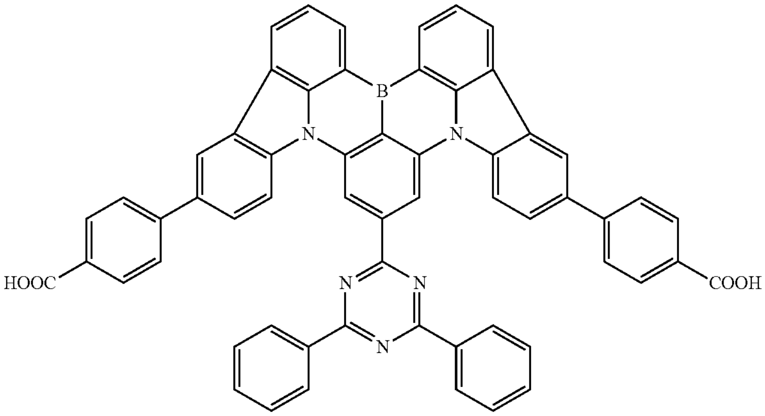

-continued
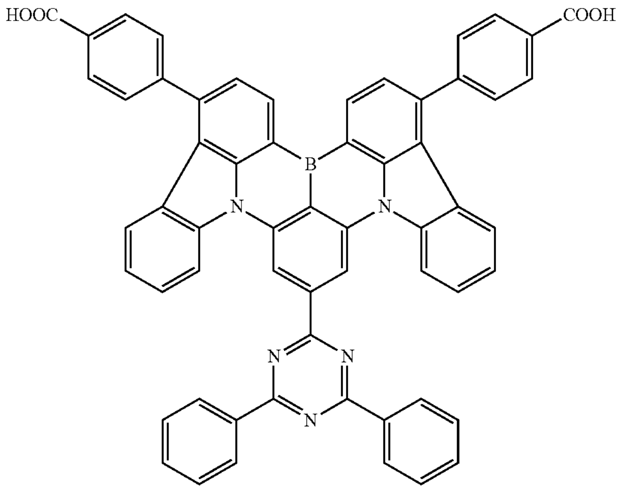
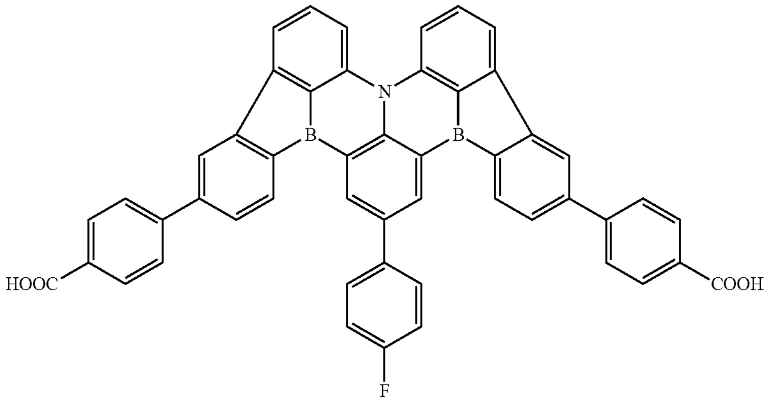
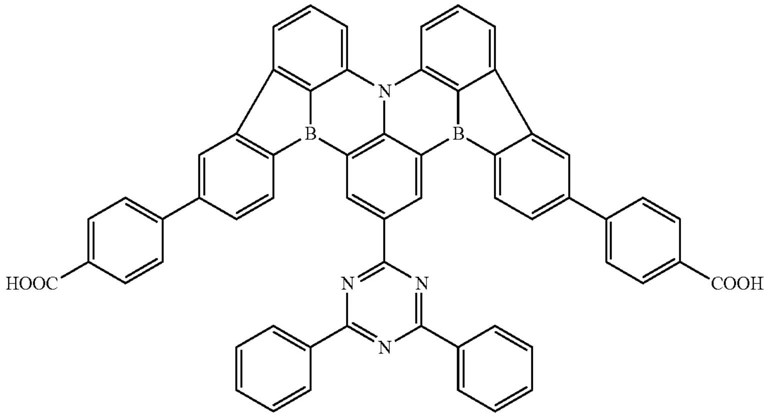

-continued
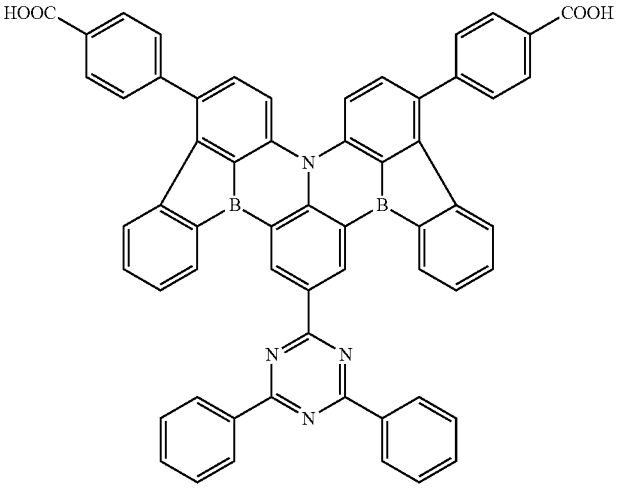
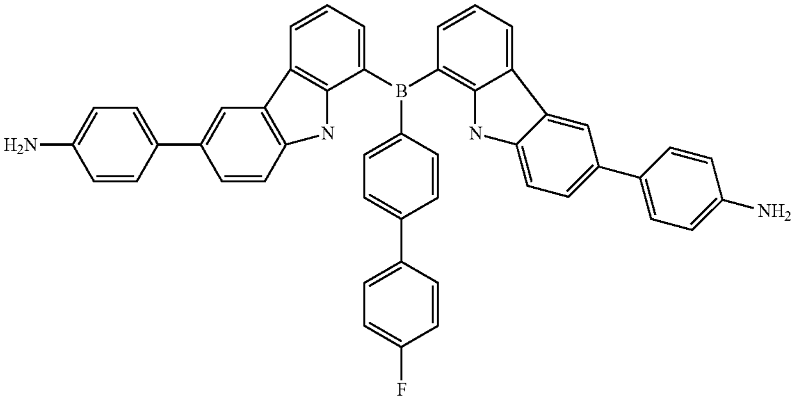
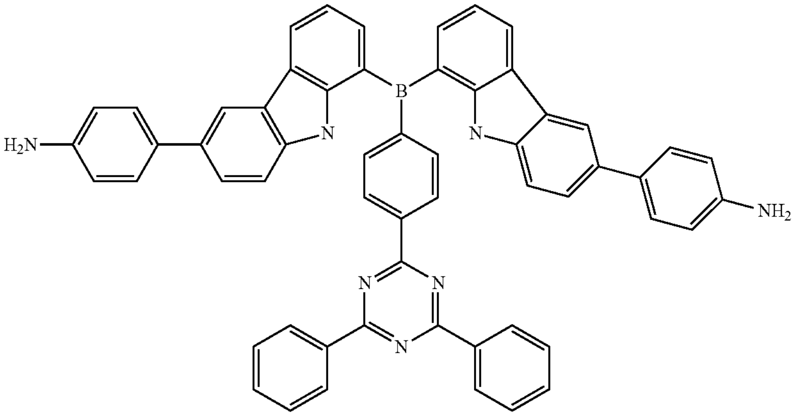

-continued
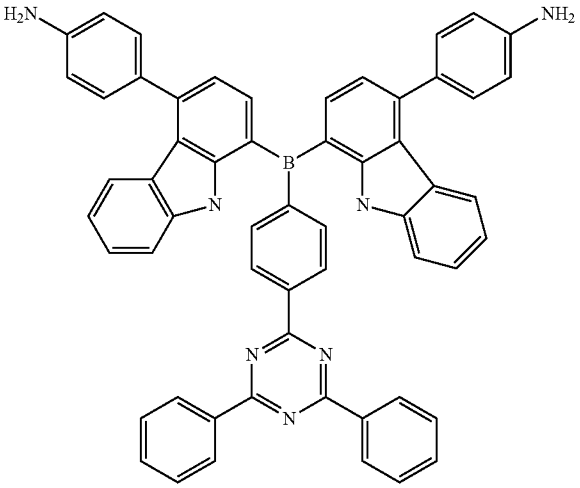
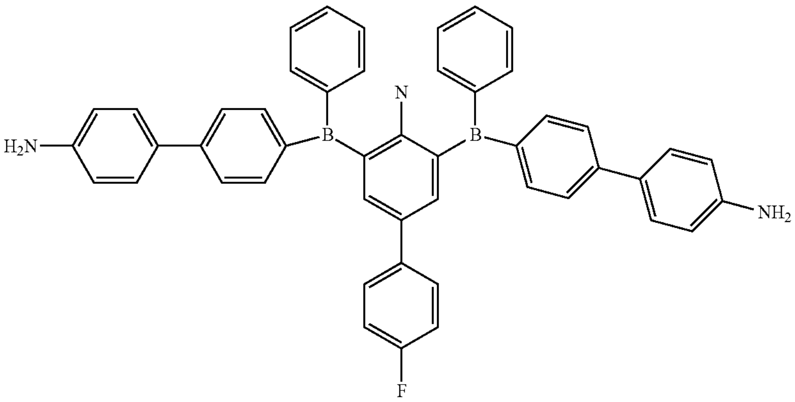
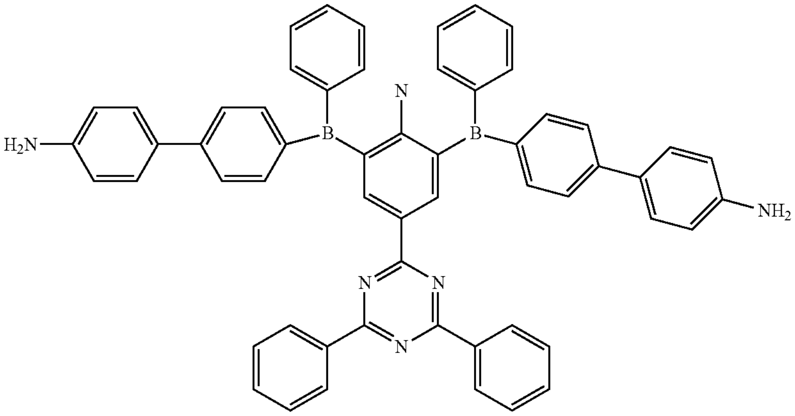

-continued
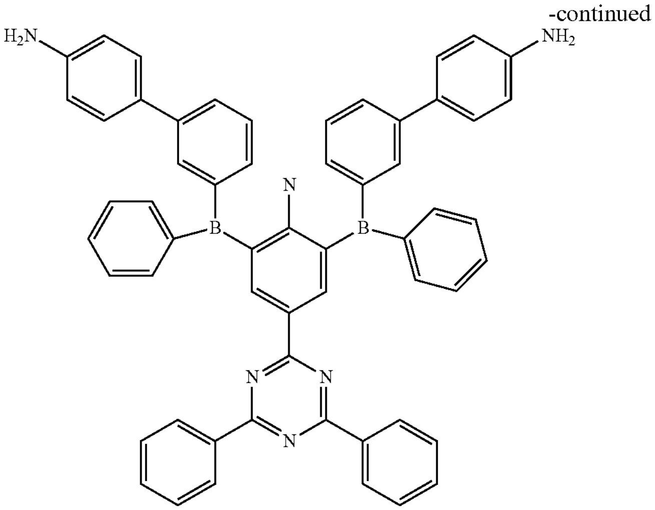
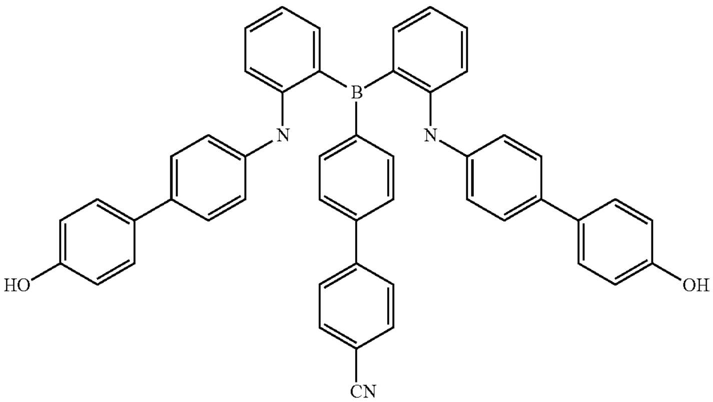
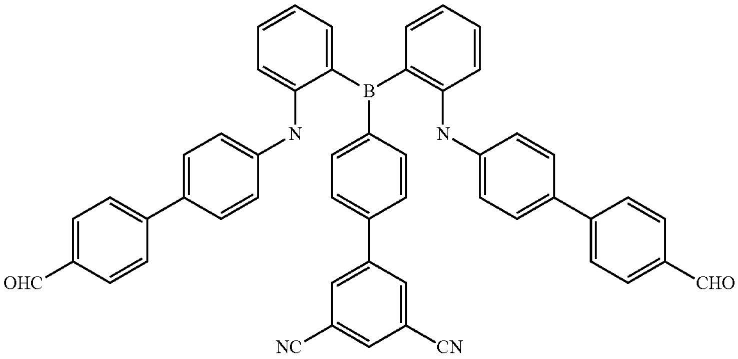
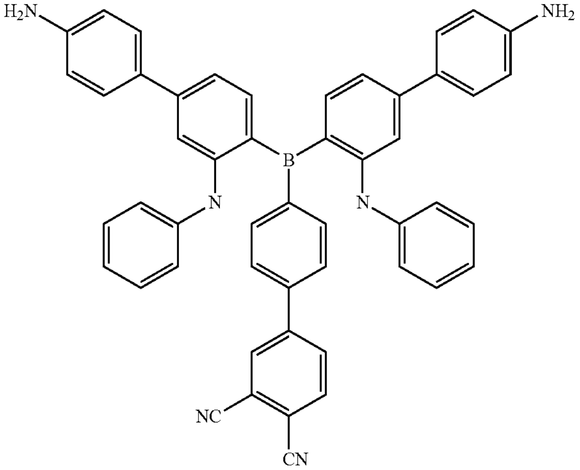

-continued
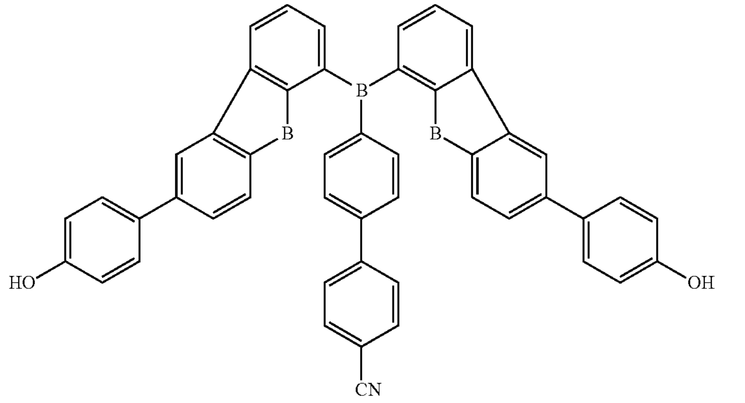
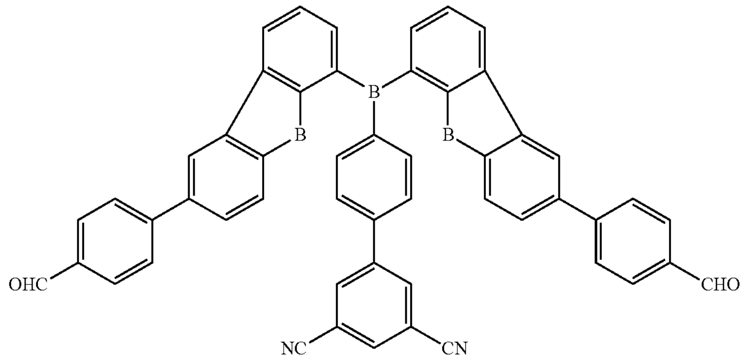
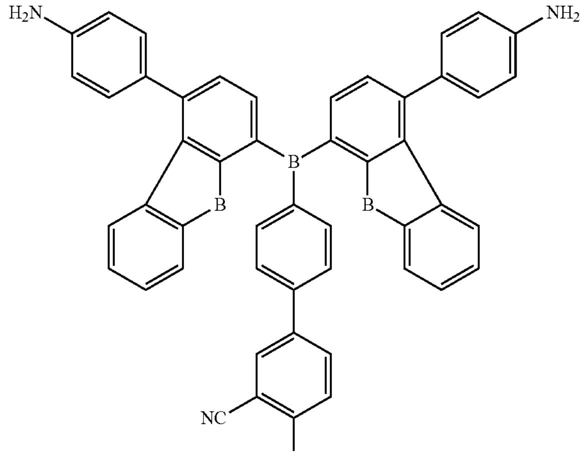
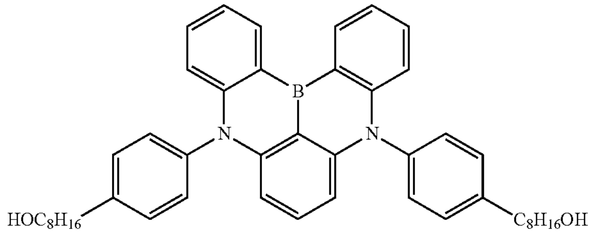
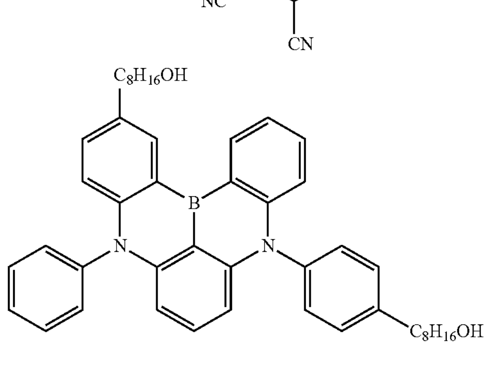
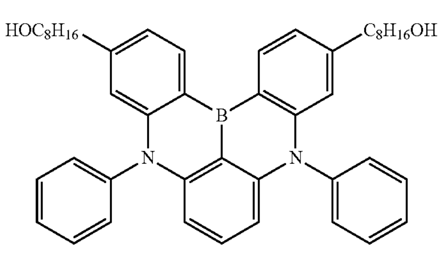

-continued
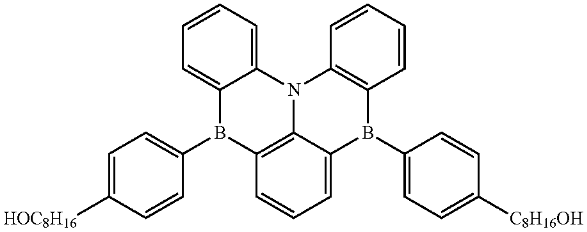
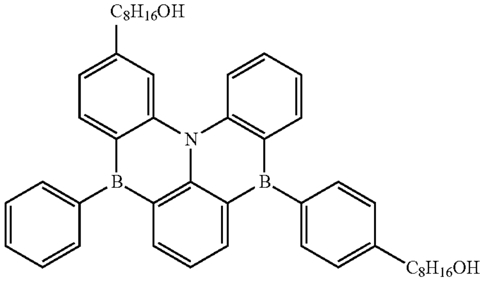
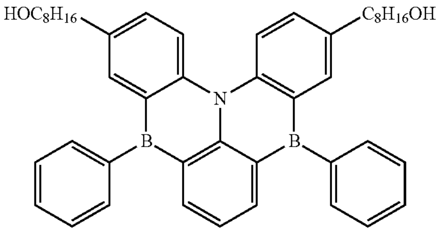
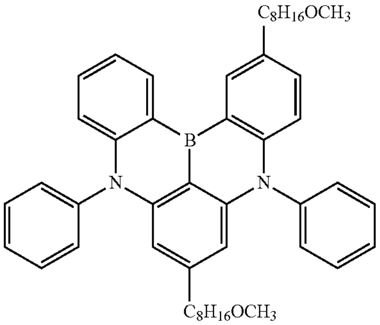
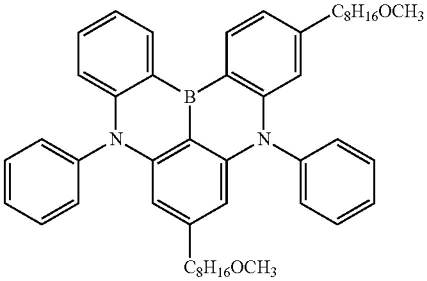
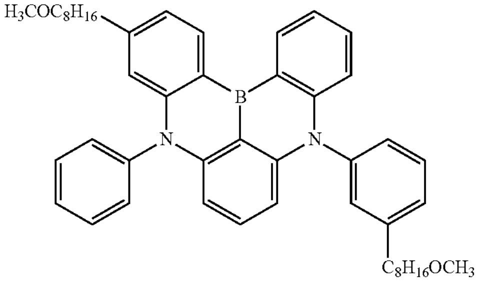
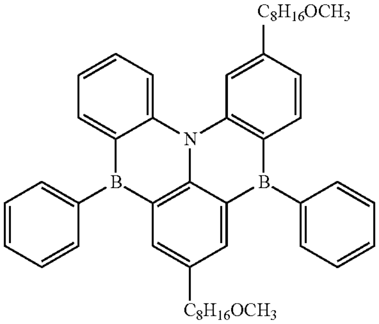
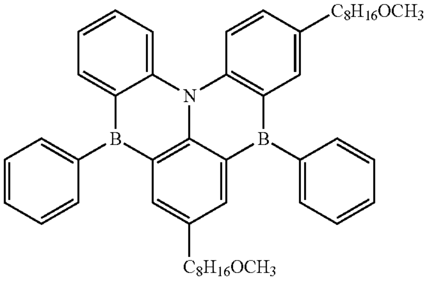
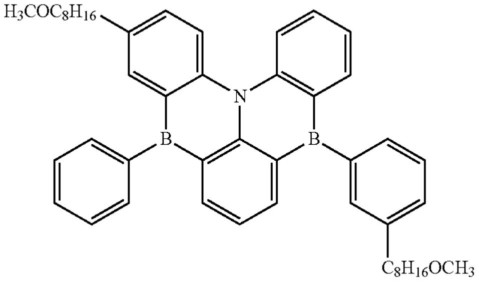
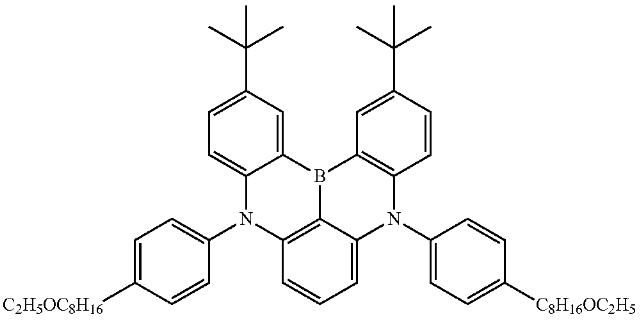

-continued
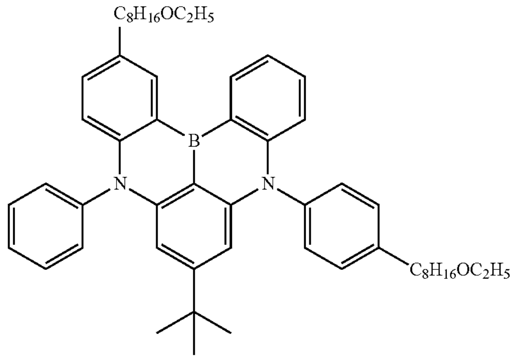
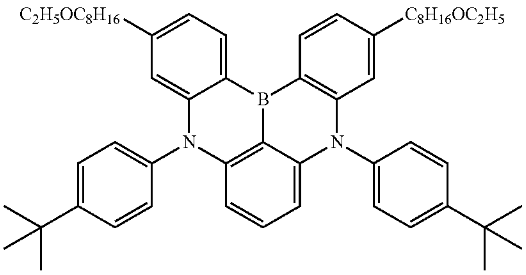
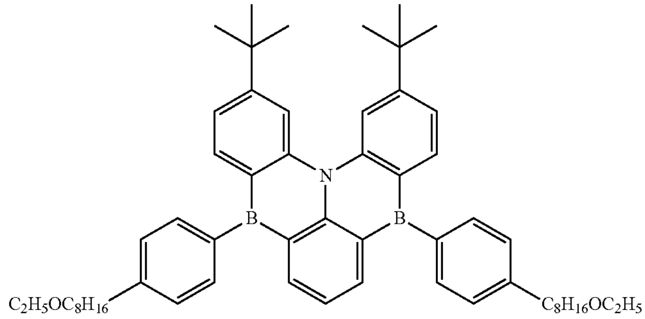
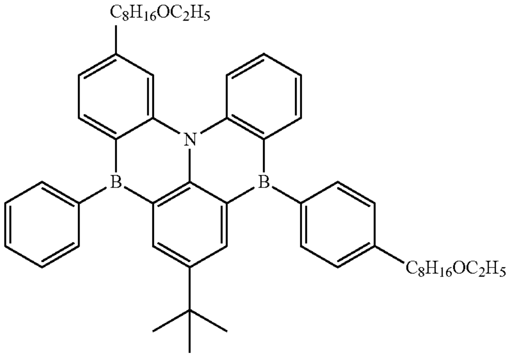
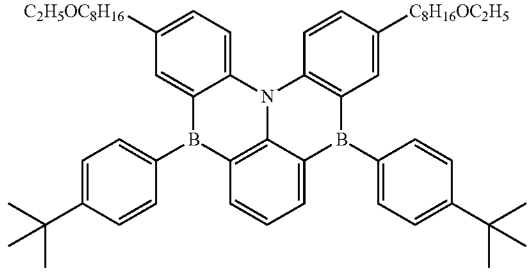
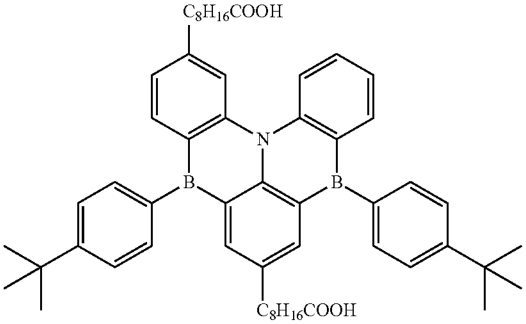
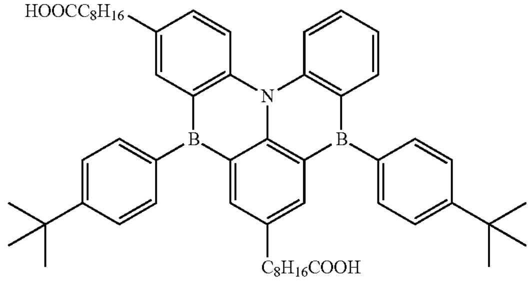
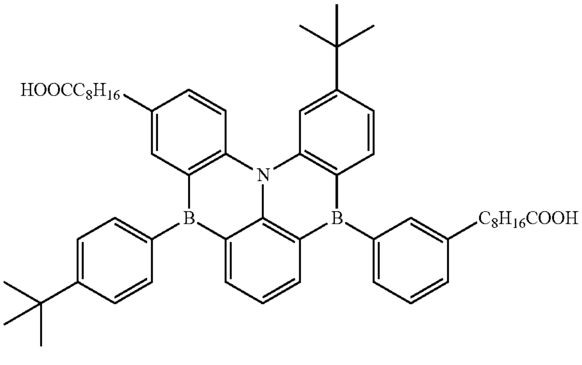
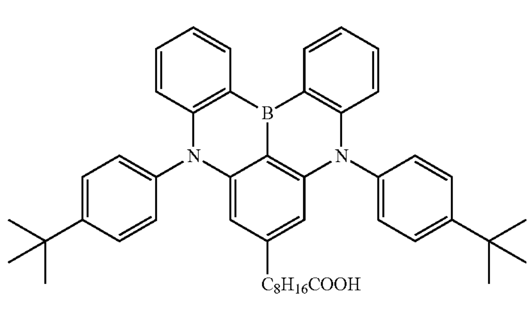
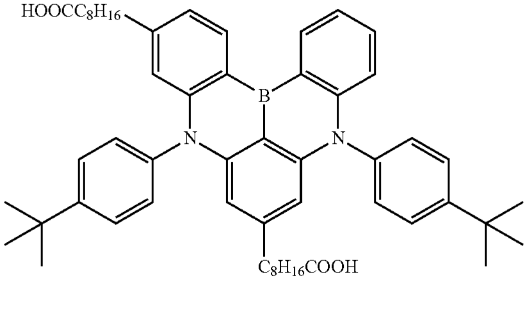

-continued
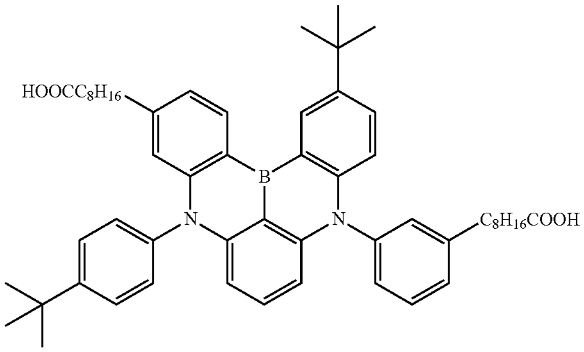
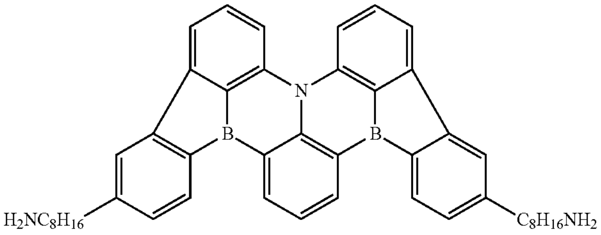
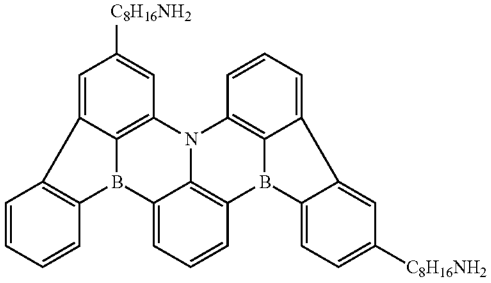
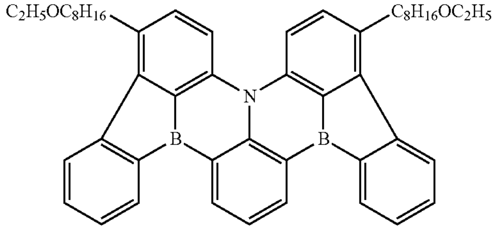
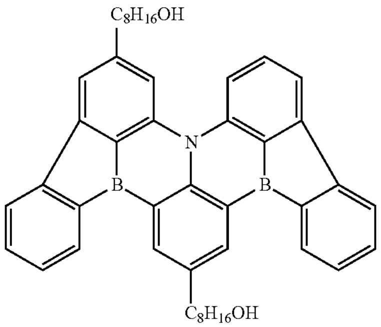
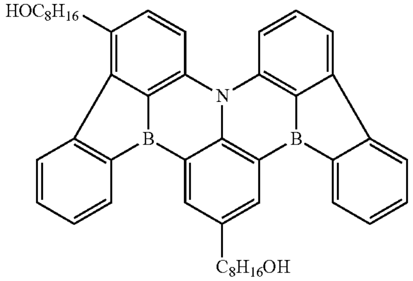
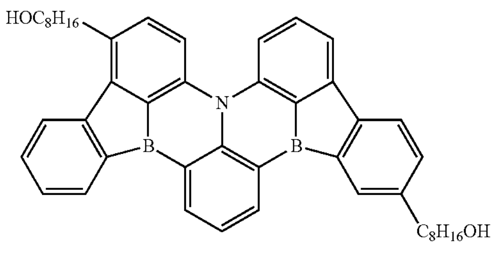
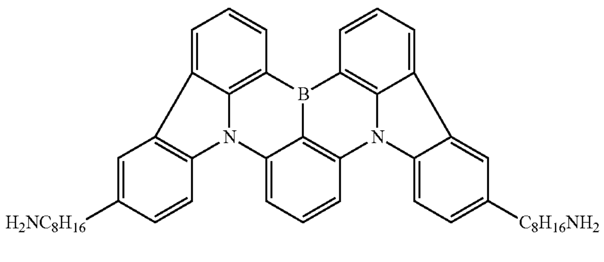
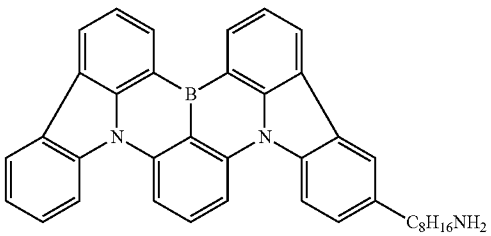
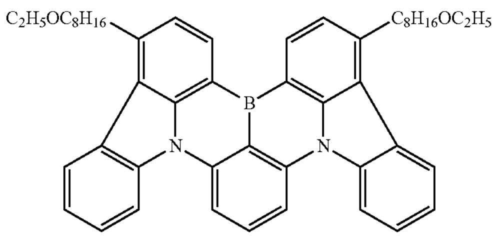

-continued
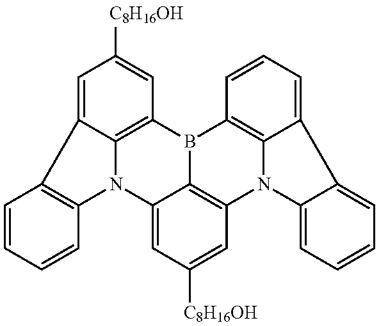
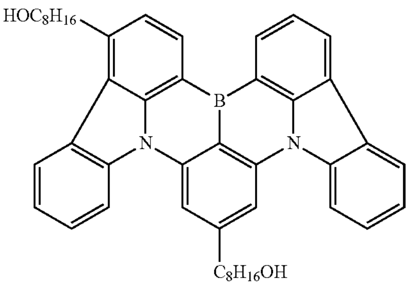
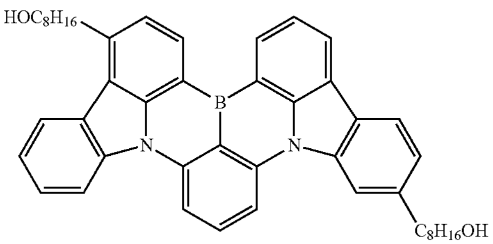
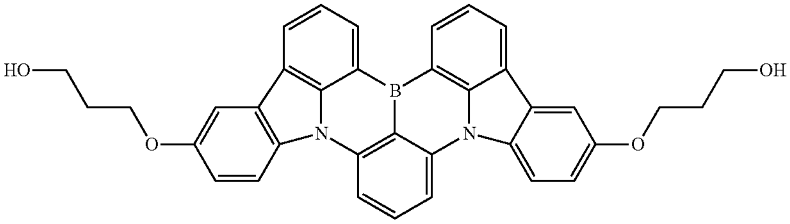
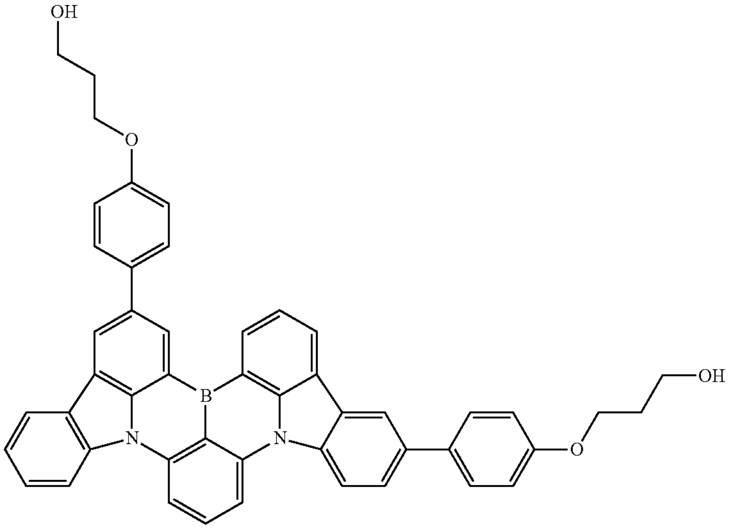

-continued
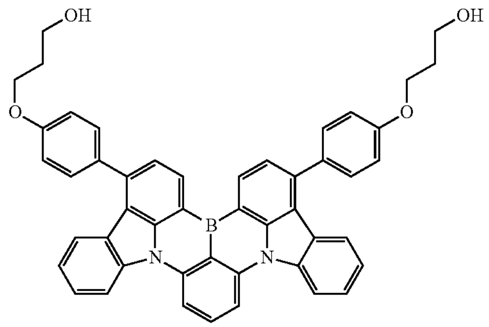
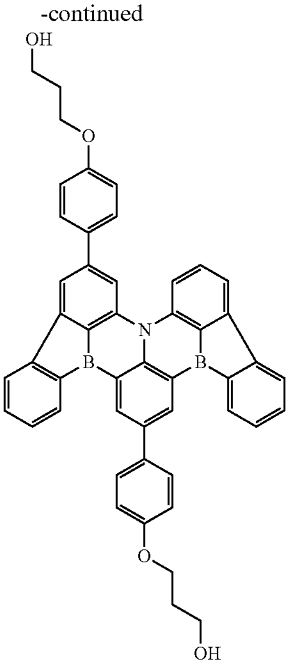
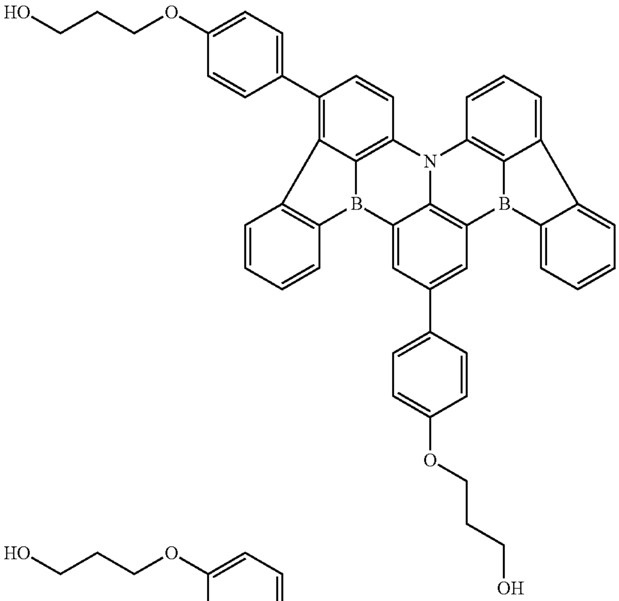
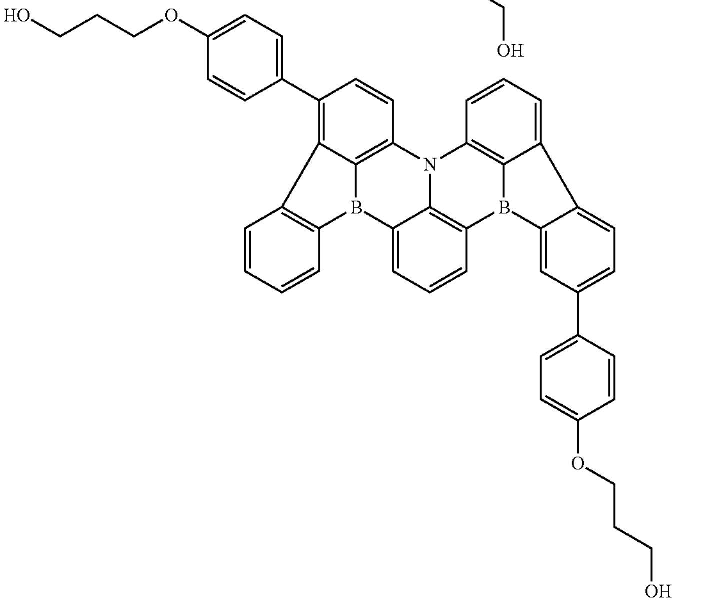

-continued
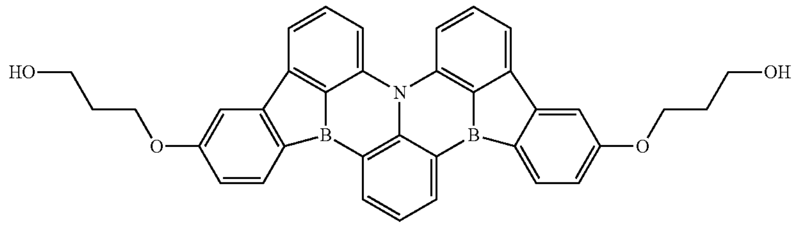
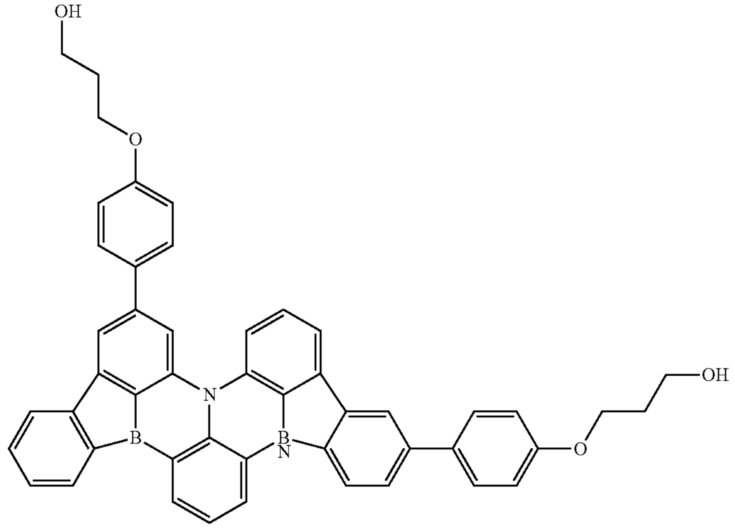
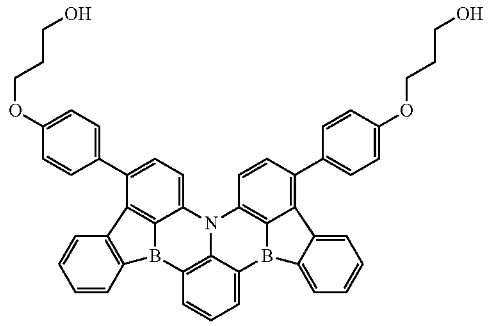
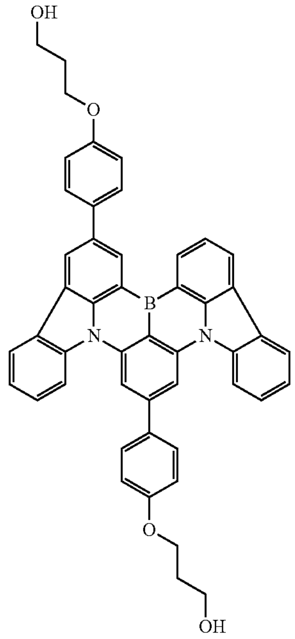

-continued
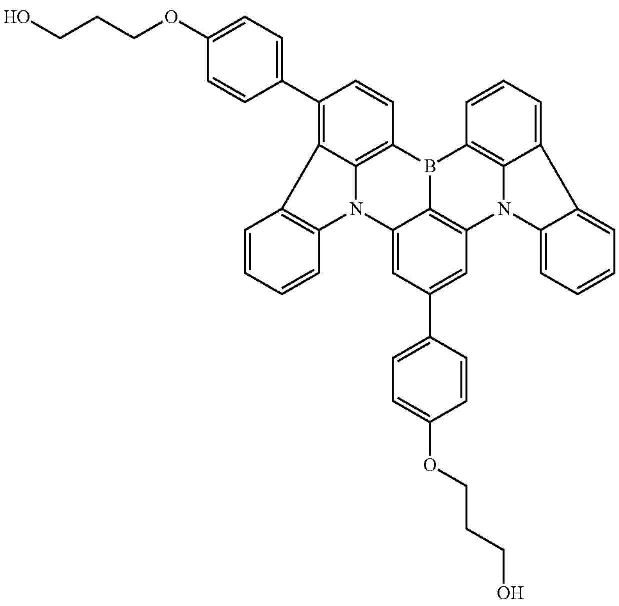
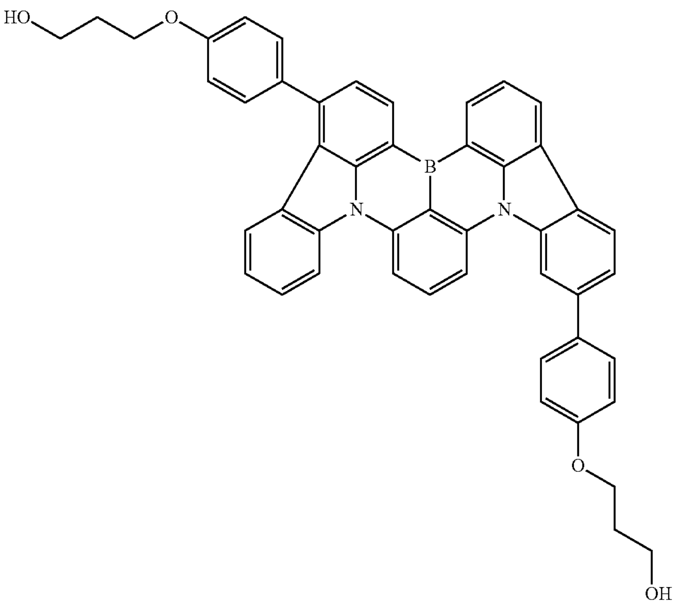

-continued
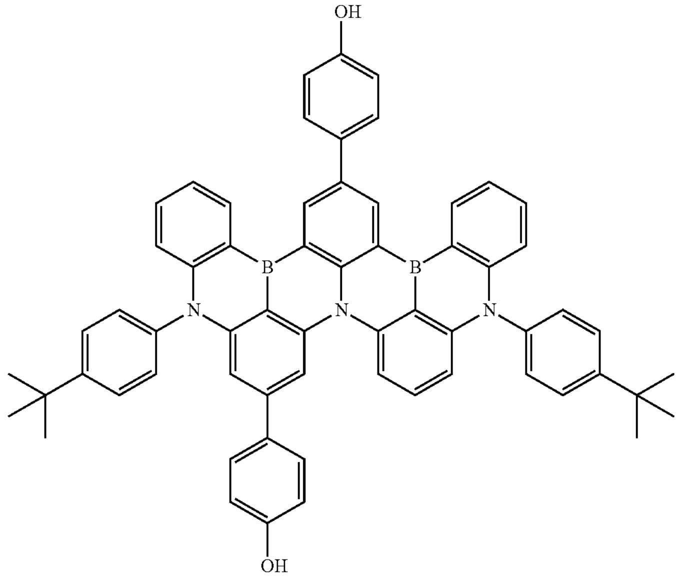
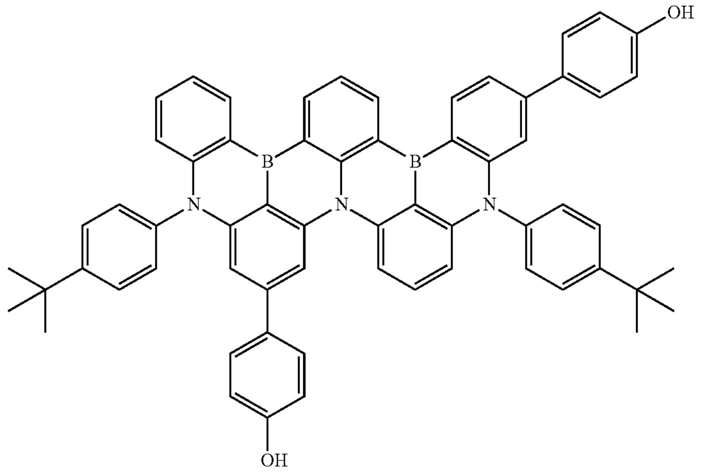
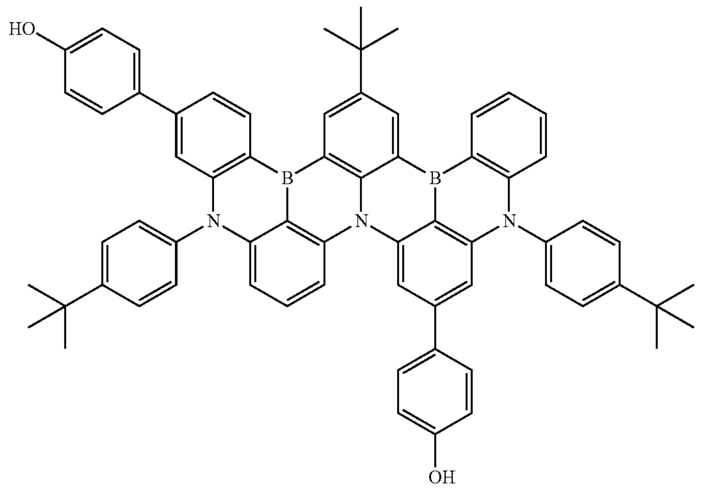

-continued
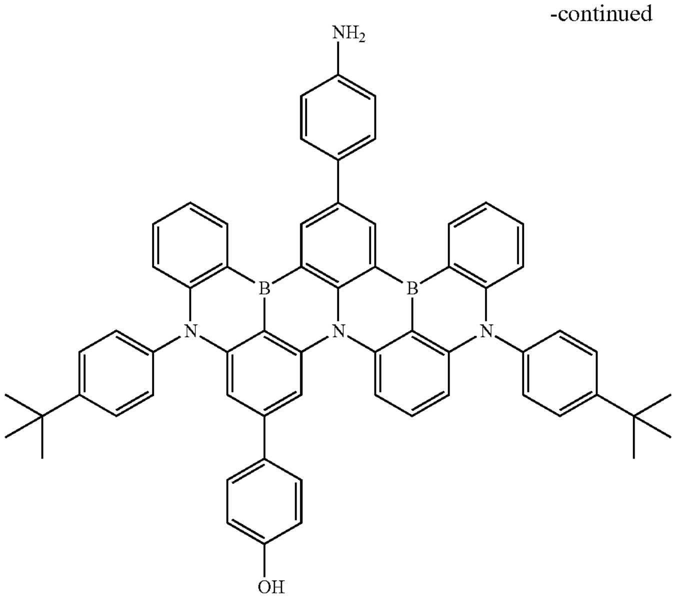
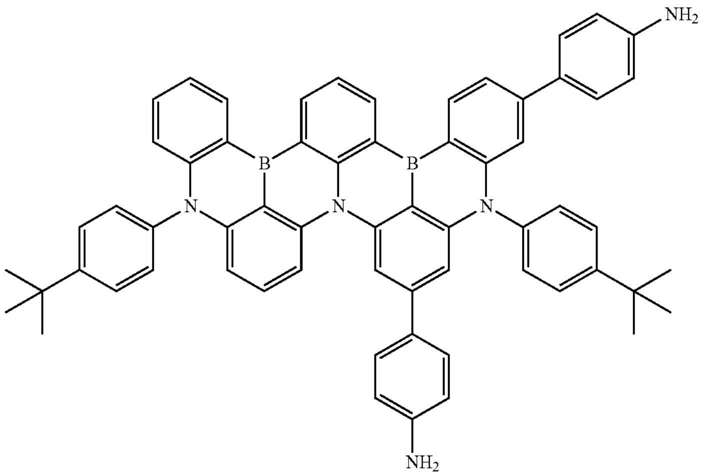
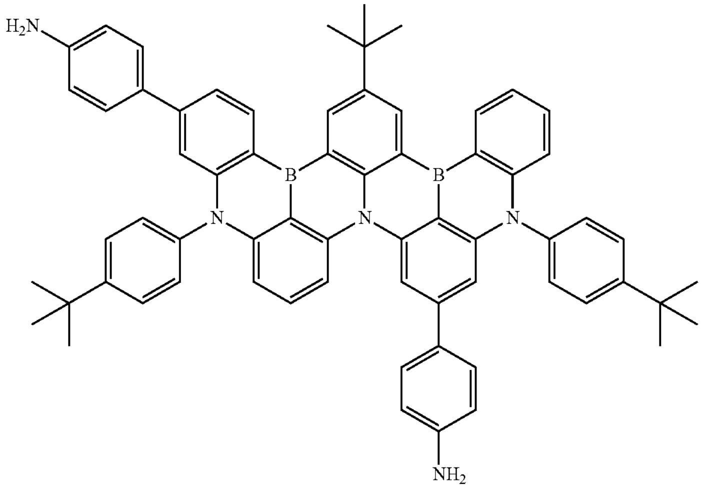

-continued
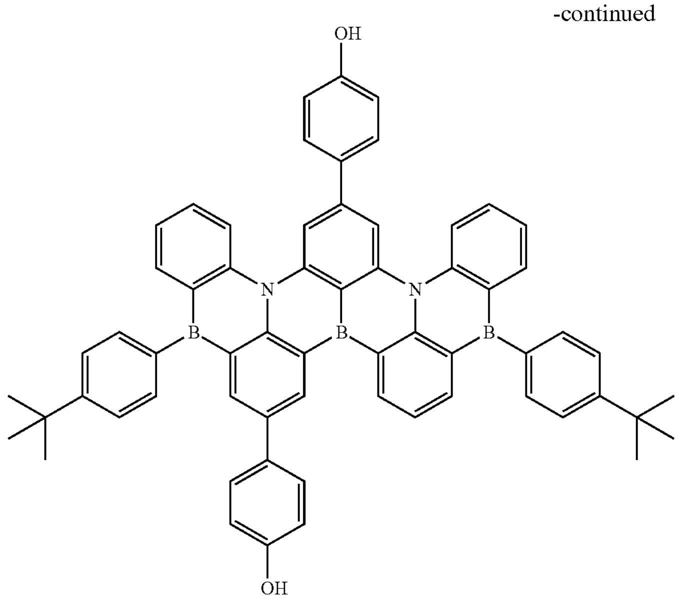
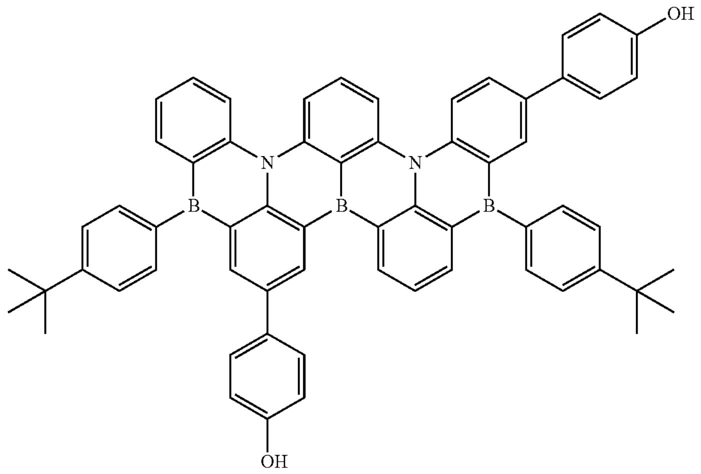
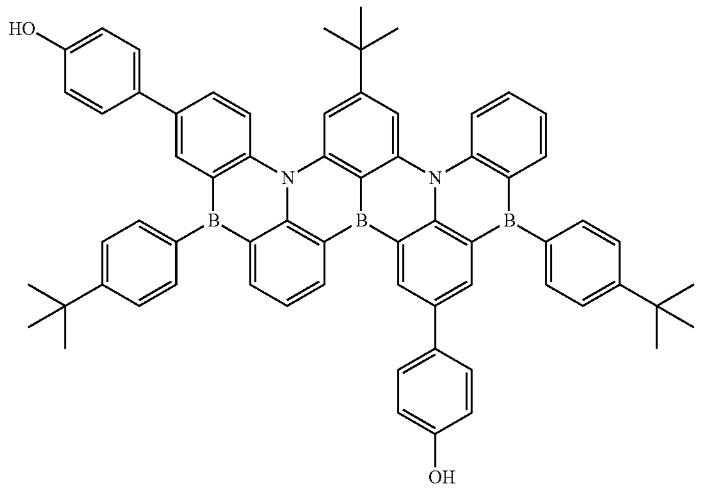

-continued
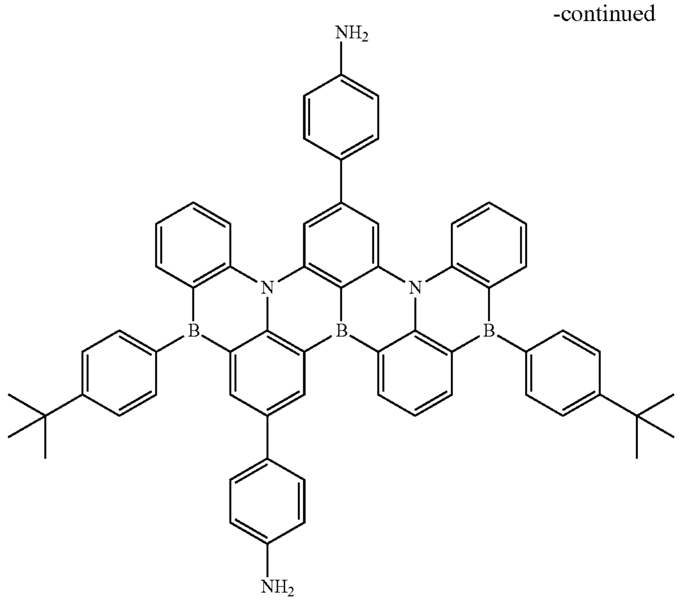
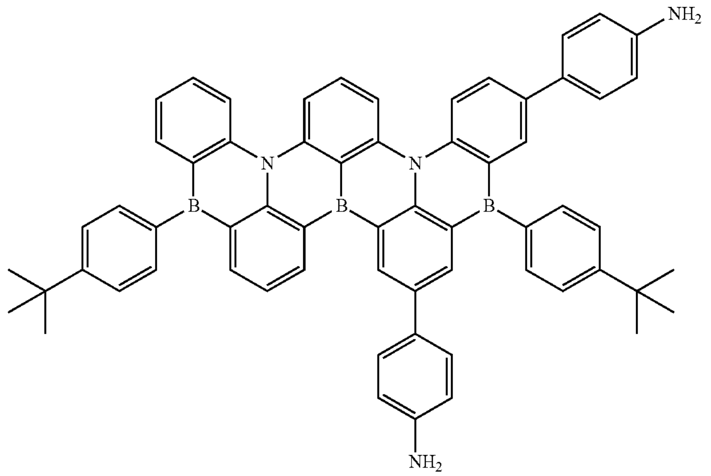
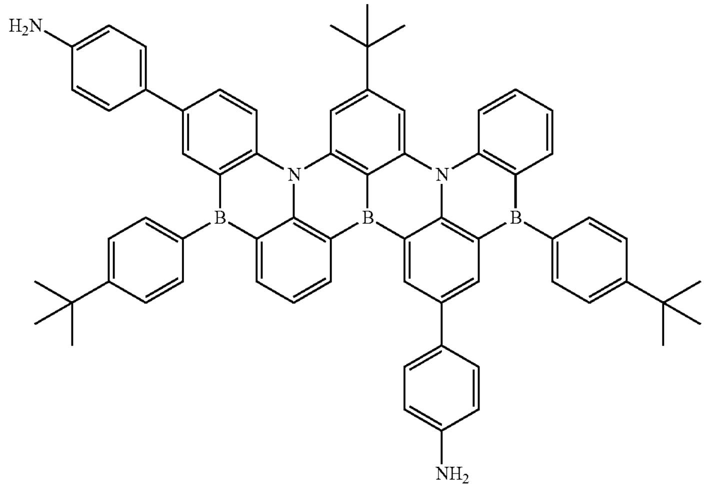

-continued
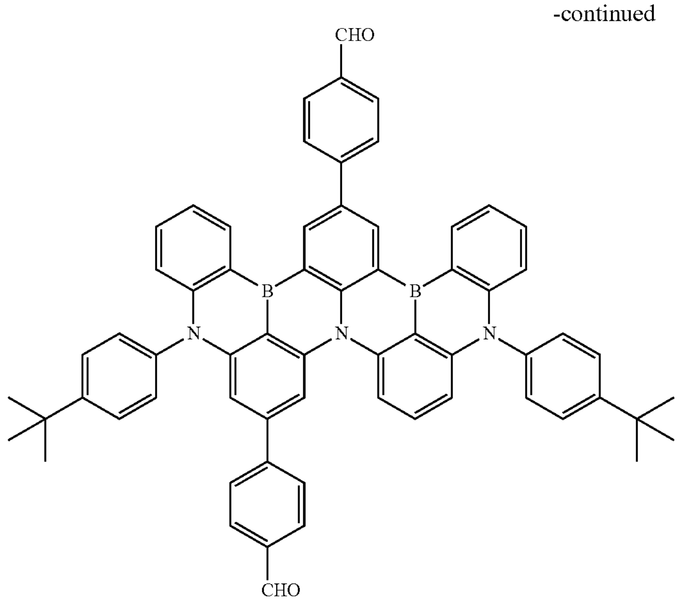
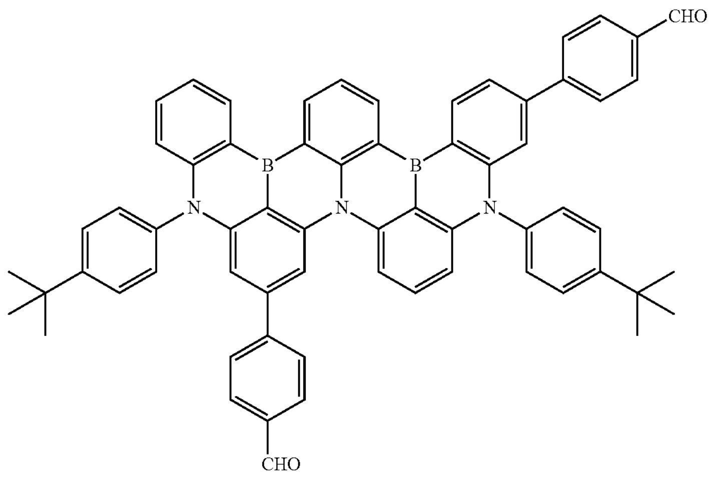
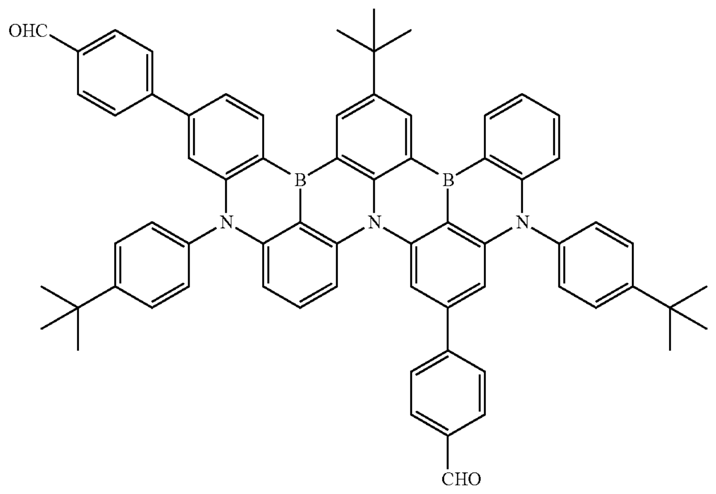

-continued
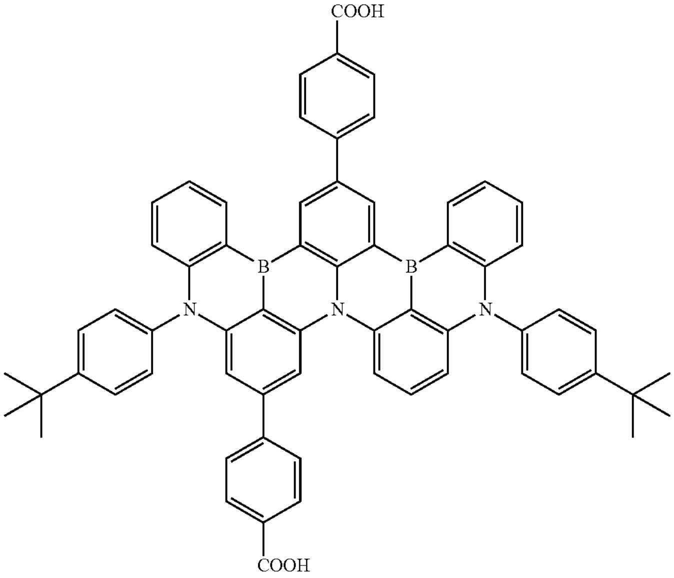
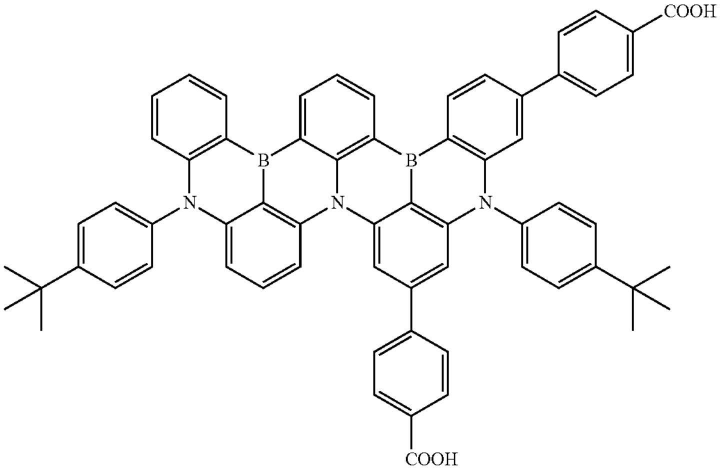
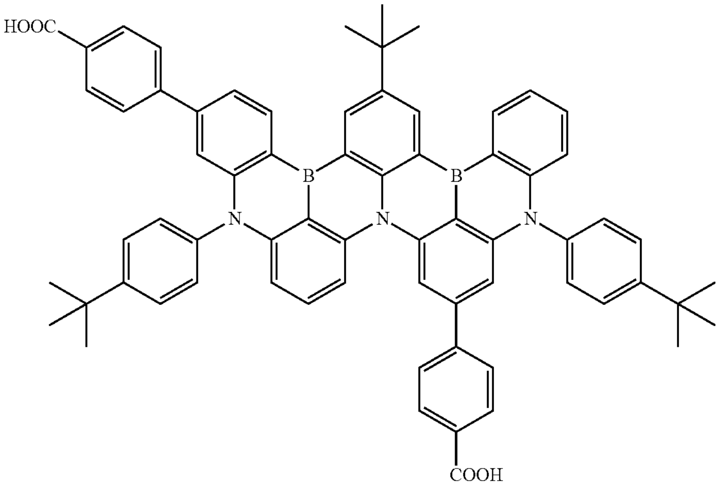

-continued

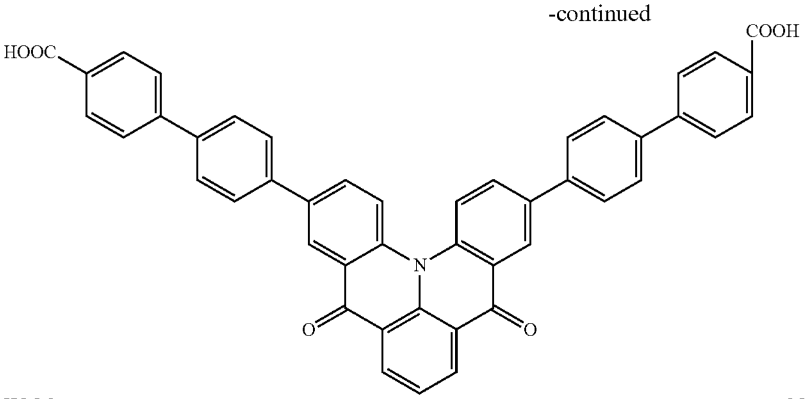

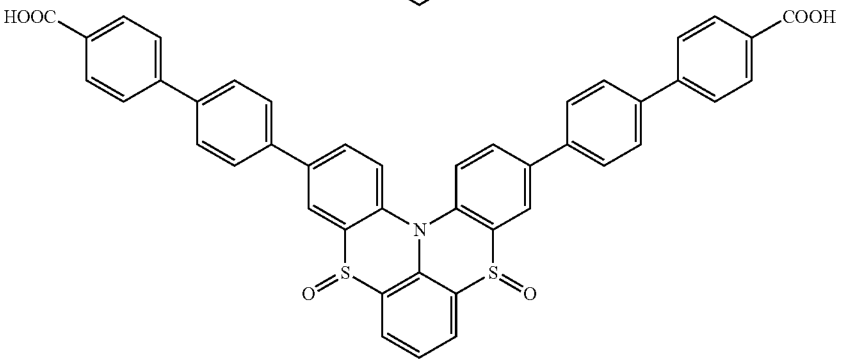

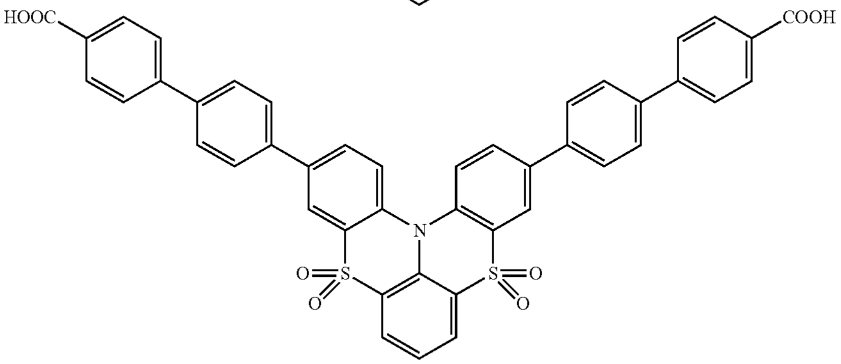

In some embodiments, the compound comprises at least one crosslinkable group, as disclosed in a contemporaneous patent with the application No. CN 202110370910.9, the patent documents above are specially incorporated herein by reference in their entirety. The advantage are that when the resin prepolymer is copolymerized or homopolymerized, the compound can at least partially or completely participate in the polymerisation.

In some embodiments, the compound comprises at least two crosslinkable groups.

In some embodiments, the compound comprises at least three crosslinkable groups.

In some embodiments, the compound is a polymer, comprising at least one repeating structural unit of formulas (1)-(1e), (2)-(2e). Preferably, the polymer is a side chain polymer as disclosed in the contemporaneous patent with the application No. CN202110370854.9. The patent document above are specially incorporated herein by reference in their entirety.

In some embodiments, the formulation as described herein further comprises at least one organic functional material. The organic functional material is selected from a hole-injection material (HIM), a hole-transport material (HTM), a hole-blocking material (HBM), an electron-injection material (EIM), an electron-transport material (ETM), an electron-blocking material (EBM), an organic host material (Host), a singlet emitter (fluorescent emitter), a triplet emitter (phosphorescent emitter), a thermally activated delayed fluorescence material (TADF material), and an organic dye. These organic functional materials are described in details, for example, in WO2010135519A1, US20090134784A1, and WO201110277A1. The entire contents of the these three documents are incorporated herein by reference in their entirety.

In some embodiments, the formulation further comprises a fluorescent host material (or singlet host material).

In some embodiments, the formulation further comprises a fluorescent emitter (or singlet emitter) and a fluorescent host material. In such embodiment, the organic compound as described herein can be used as a co-emitter, and the weight ratio of which to another fluorescent emitter ranges from 1:20 to 20:1.

The fluorescent host material and the fluorescent emitter are described in details below.

1. Singlet Host:

Examples of singlet host materials are not specially limited, any organic compound may be used as a host, as long as its singlet energy is higher than dopant material, especially higher than that of the singlet emitter or the fluorescent emitter.

Examples of the organic compound used as the singlet host material may be selected from cyclic aromatic hydrocarbon compound, such as benzene, biphenyl, triphenylbenzene, triphenylene, benzphenanthrene, naphthalene, anthracene, phenalene, phenanthrene, fluorene, pyrene, chrysene, perylene, azulene. The organic compound used as the singlet host material may be also selected from aromatic heterocyclic compound, such as dibenzothiophene, dibenzofuran, dibenzothiophene, furan, thiophene, benzofuran, benzothiophene, benzoselenophene, carbazole, indocarbazole, pyridindole, pyrroledipyridine, pyrazole, imidazole, triazole, isoxazole, thiazole, oxadiazole, oxatriazole, dioxazole, thiadiazole, pyridine, pyridazine, pyrimidine, pyrazine, triazine, oxazine, oxathiazine, oxadiazine, indole, benzimidazole, indazole, indolizine, benzoxazole, Benzoisoxazole benzothiazole, quinoline, isoquinoline, cinnoline, quinazoline, quinoxaline, naphthalene, phthalein pteridine, xanthene, acridine, phenazine, phenothiazine, phenoxazine, benzofuranopyridine, furandipyridine, benzothienopyridine, thiophenedipyridine, benzoselenophenopyridine, or selenophenodipyridine. The organic compound used as the singlet host material may be containing 2 to 10 ring atoms, which may be the same or different types of cyclic aromatic hydrocarbon groups/aromatic heterocyclic groups, and are linked to each other directly or by at least one of the following groups, such as oxygen atom, nitrogen atom, sulfur atom, silicon atom, phosphorus atom, boron atom, chain structure unit, and aliphatic ring group.

In some embodiments, the singlet host material may be selected from the compounds comprising at least one of the following groups:

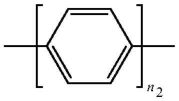
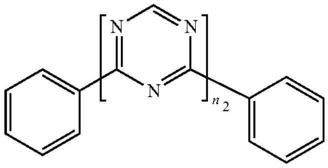
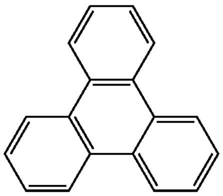
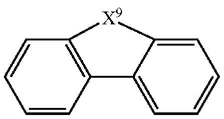
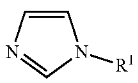
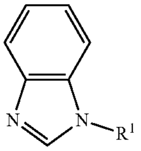
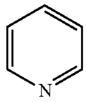
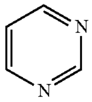
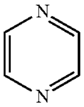
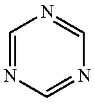
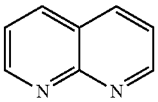
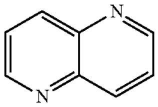
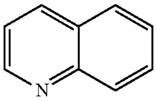
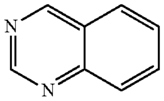

-continued

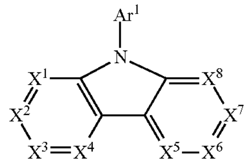
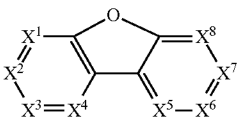
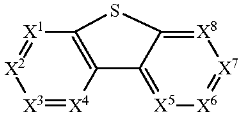
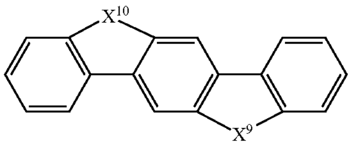
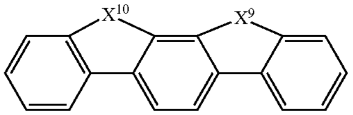
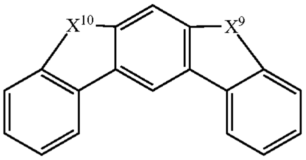
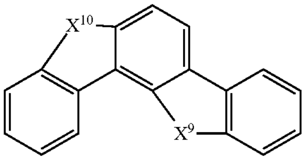
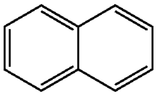
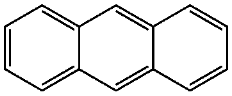
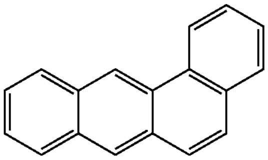
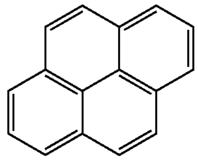
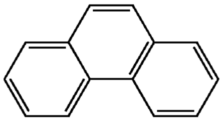
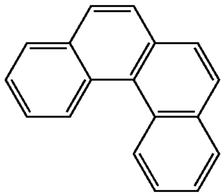
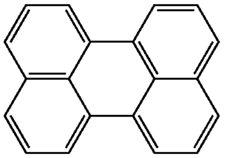

wherein $R^1$ is independently selected from the group consisting of H, alkyl, alkoxy, amino, alkene, alkyne, aralkyl, heteroalkyl, aryl, and heteroaryl; $Ar^1$ is aryl or heteroaryl and in the same definition as $Ar^1$ as described above; $n_2$ is an integer from 0 to 20; each $X^1$ to $X^8$ is independently selected from CH or N; each $X^9$ and $X^{10}$ is independently selected from $CR^1R^2$ or $NR^1$.

The following are some examples of anthracene-based singlet host materials:

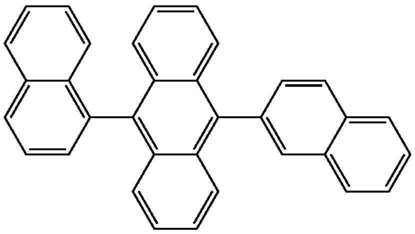

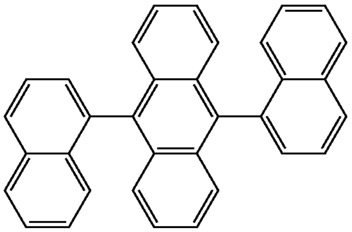

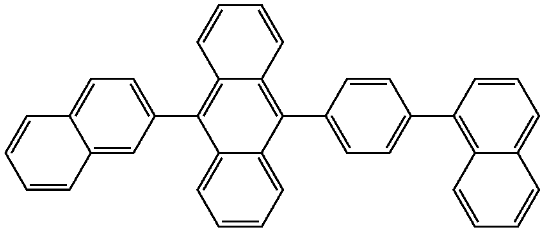

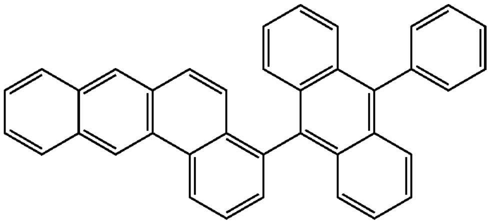

2. Singlet Emitter

The singlet emitter tends to have a longer conjugate 7-electron system. Hitherto, there have been many examples of styryl amines and derivatives thereof as disclosed in JP2913116B and WO2001021729A1, and indenofluorenes and derivatives thereof as disclosed in WO2008/006449 and WO2007/140847.

In some embodiments, the singlet emitter can be selected from the group consisting of monostyrylamines, distyrylamines, tristyrylamines, tetrastyrylamines, styrenphosphines, styrenethers, and arylamines.

A monostyrylamine refers to a compound which comprises one unsubstituted or substituted styryl group and at least one amine, most preferably an aryl amine. Distyrylamine refers to a compound comprising two unsubstituted or substituted styryl groups and at least one amine, most preferably an aryl amine. Ternarystyrylamine refers to a compound which comprises three unsubstituted or substituted styryl groups and at least one amine, most preferably an aryl amine. Quaternarystyrylamine refers to a compound comprising four unsubstituted or substituted styryl groups and at least one amine, most preferably an aryl amine. Preferred styrene is stilbene, which may be further substituted. The corresponding phosphines and ethers are defined similarly as amines. Aryl amine or aromatic amine refers to a compound comprising three unsubstituted or substituted cyclic or heterocyclic aryl systems directly attached to nitrogen. At least one of these cyclic or heterocyclic aryl systems is preferably selected from fused ring systems and most preferably has at least 14 aryl ring atoms. Among the preferred examples are aryl anthramine, aryl anthradiamine, aryl pyrene amines, aryl pyrene diamines, aryl chrysene amines and aryl chrysene diamine. Aryl anthramine refers to a compound in which one diarylamino group is directly attached to anthracene, most preferably at position 9. Aryl anthradiamine refers to a compound in which two diarylamino groups are directly attached to anthracene, most preferably at positions 9,10. Aryl pyrene amines, aryl pyrene diamines, aryl chrysene amines and aryl chrysene diamine are similarly defined, wherein the diarylarylamino group is most preferably attached to position 1 or 1,6 of pyrene.

Examples of singlet emitters based on vinylamines and arylamines, which are also preferred, may be found in the following patent documents: WO2006/000388, WO2006/058737, WO2006/000389, WO2007/065549, WO2007/115610, US250532B2, DE102005058557A1, CN1583691A, JP08053397A, U.S. Pat. No. 6,251,531B1, US2006/210830A, EP1957606A1, and US2008/0113101A1. The patent documents listed above are specially incorporated herein by reference in their entirety.

Examples of singlet emitters based on stilbene and its derivatives may be found in U.S. Pat. No. 5,121,029.

Further preferred singlet emitter can be selected from the group consisting of indenofluorene-amine and indenofluorene-diamine, as disclosed in WO2006/122630, benzoindenofluorene-amine and benzoindenofluorene-diamine, as disclosed in WO2008/006449, dibenzoindenofluorene-amine and dibenzoindenofluorene-diamine, as disclosed in WO2007/140847.

Other materials that can be used as singlet emitter include polycyclic aromatic hydrocarbon compounds, in particular selected from the derivatives of the following compounds: anthracenes such as 9,10-bis(2-naphthoanthracene), naphthalene, tetraphenyl, phenanthrene, perylene such as 2,5,8,11-tetra-t-butylatedylene, indenoperylene, phenylenes such as (4,4'-(bis (9-ethyl-3-carbazovinylene)-1,1'-biphenyl), periflanthene, decacyclene, coronene, fluorene, spirobifluorene, arylpyren (e.g., US20060222886), arylenevinylene (e.g. U.S. Pat. Nos. 5,121,029, 5,130,603), cyclopentadiene such as tetraphenylcyclopentadiene, rubrene, coumarine, rhodamine, quinacridone, pyrane such as 4 (dicyanoethylene)-6-(4-dimethylaminostyryl-2-methyl)-4H-pyrane (DCM), thiapyran, bis (azinyl) imine-boron compounds (e.g. US2007/0092753A1), bis (azinyl) methene compounds, carbostyryl compounds, oxazone, benzoxazole, benzothiazole, benzimidazole, and diketopyrrolopyrrole. Some singlet emitter materials may be found in the following patent documents: U.S. Pat. Nos. 4,769,292, 6,020,078, and US2007/0252517A1. The patent documents listed above are specially incorporated herein by reference in their entirety.

The following are some examples of singlet emitters:

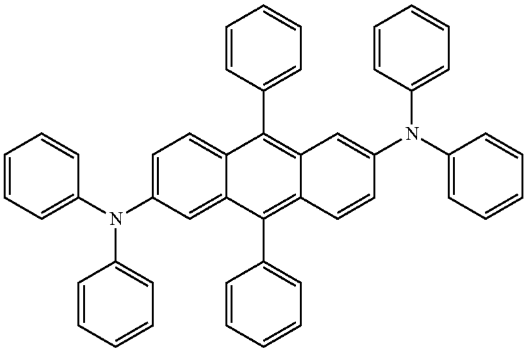

-continued

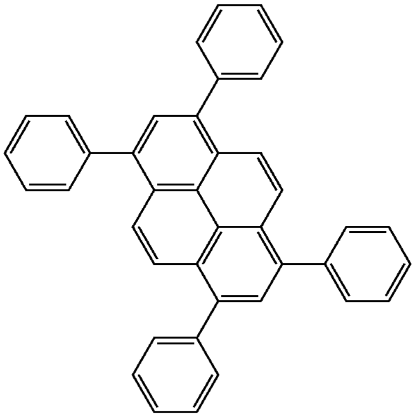

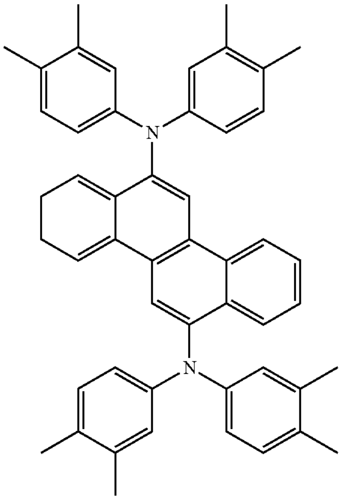

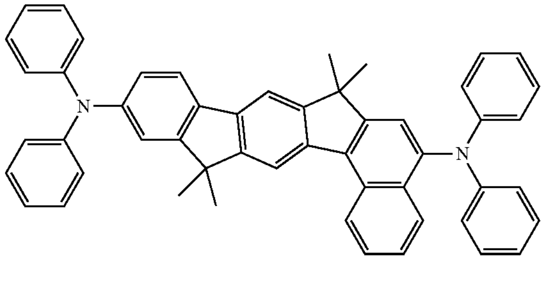

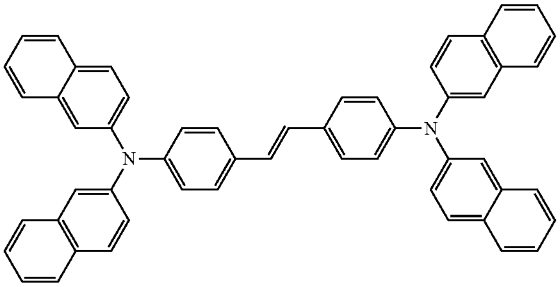

-continued

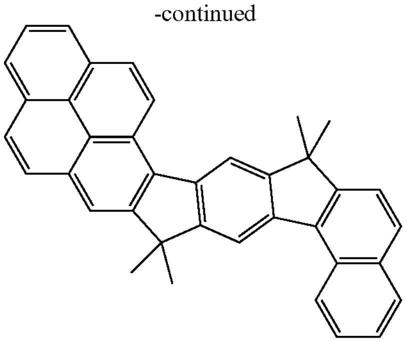

The publications of organic functional material presented above are incorporated herein by reference for the purpose of disclosure.

In some embodiments, the formulation as described herein further comprises at least one solvent.

In some embodiments the formulation as described herein is a solution.

In some embodiments, the formulation as described herein is a dispersion.

The formulations in the embodiments of the present disclosure may comprise the organic compound of 0.01 to 20 wt %, preferably 0.1 to 20 wt %, more preferably 0.2 to 20 wt %, and most preferably 1 to 15 wt %.

Using the formulation as described herein, wherein the color conversion layer may be processed by inkjet printing, transfer printing, photolithography, etc. In this case, the compound as described herein needs to be dissolved alone or together with other materials in a resin (prepolymer) and/or an organic solvent, to form the ink. The mass concentration of the compound (i.e. the color conversion material) as described herein in the ink is not less than 0.1% wt. The color conversion ability of the color conversion layer can be tuned by modifying the concentration of the color conversion material in the ink and the thickness of the color conversion layer. In general, the higher the concentration of the color conversion material or the thickness of the layer, the higher the color conversion efficiency of the color conversion layer would be.

In some embodiments, the solvent is selected from: water, alcohol, ester, aromatic ketone, aromatic ether, aliphatic ketone, aliphatic ether, and inorganic ester compounds such as boronic ester or phosphoric ester, and a mixture of two or more of them.

In some embodiments, the suitable and preferred organic solvents are aliphatics, alicyclics, aromatics, amines, thiols, amides, nitriles, esters, ethers, polyethers, alcohols, diols, or polyols.

In some embodiments, the alcohol represents an organic solvent of the suitable class. Preferred alcohol includes alkylcyclohexanol, particularly methylated aliphatic alcohol, naphthol, etc.

Examples of the suitable alcohol solvents include dodecanol, phenyltridecanol, benzyl alcohol, ethylene glycol, ethylene glycol methyl ether, glycerol, propylene glycol, propylene glycol ethyl ether, etc.

The solvent may be used alone or as mixtures of two or more organic solvents.

Further, examples of organic solvents, include (but are not limited to): methanol, ethanol, 2-methoxyethanol, dichloromethane, trichloromethane, chlorobenzene, o-dichlorobenzene, tetrahydrofuran, anisole, morpholine, toluene, o-xylene, m-xylene, p-xylene, 1,4 dioxane, acetone, methylethylketone, 1,2 dichloroethane, 3-phenoxytoluene, 1,1,1-trichloroethane, 1,1,2,2-tetrachloroethane, ethyl acetate, butyl acetate, dimethylformamide, dimethylacetamide, dimethylsulfoxide, tetrahydronaphthalene, naphthane, indene, and/or mixtures thereof.

In some embodiments, the formulation as described herein, wherein the organic solvent is selected from aromatic, heteroaromatic, ester, aromatic ketone, aromatic ether, aliphatic ketone, aliphatic ether, cycloaliphatic, and inorganic ester compounds such as boronic ester, phosphoric ester, or mixtures of two or more of them.

Examples of aromatic or heteroaromatic solvents in accordance with the present disclosure are, but not limited to: 1-tetralone, 3-phenoxytoluene, acetophenone, 1-methoxynaphthalene, p-diisopropylbenzene, amylbenzene, tetrahydronaphthalene, cyclohexylbenzene, chloronaphthalene, 1,4-dimethylnaphthalene, 3-isopropylbiphenyl, p-methylcumene, dipentylbenzene, o-diethylbenzene, m-diethylbenzene, p-diethylbenzene, 1,2,3,4-tetramethyl benzene, 1,2,3,5-tetramethyl benzene, 1,2,4,5-tetramethyl benzene, butylbenzene, dodecyl benzene, 1-methylnaphthalene, 1,2,4-trichlorobenzene, 1,3-Dipropoxybenzene, 4,4-difluorodiphenylmethane, diphenyl ether, 1,2-dimethoxy-4-(1-propenyl) benzene, diphenylmethane, 2-phenylpyridine, 3-phenylpyridine, 2-phenoxymethyl ether, 2-phenoxytetrahydrofuran, ethyl-2-naphthyl ether, N-methyldiphenylamine, 4-Isopropylbiphenyl, α, α-dichlorodiphenylmethane, 4-(3-phenylpropyl) pyridine, benzyl benzoate, 1,1-bis (3,4-dimethylphenyl) ethane, 2-isopropylnaphthalene, dibenzyl ether, etc.

In some embodiments, the suitable and preferred solvents are aliphatics, alicyclics, aromatics, amines, thiols, amides, nitriles, esters, ethers, polyethers.

The solvent may be a cycloalkane, such as decahydronaphthalene.

In some embodiments, the formulation as described herein comprises at least 50 wt % of an alcoholic solvent; preferably at least 80 wt %; particularly preferably at least 90 wt %.

In some embodiments, the particularly suitable solvent for the present disclosure is a solvent having Hansen solubility parameters in the following ranges:

δd (dispersion force) is in the range of 17.0 to 23.2 $MPa^{1/2}$, especially in the range of 18.5 to 21.0 $MPa^{1/2}$.

δp (polarity force) is in the range of 0.2 to 12.5 $MPa^{1/2}$, especially in the range of 2.0 to 6.0 $MPa^{1/2}$.

δh (hydrogen bonding force) is in the range of 0.9 to 14.2 $MPa^{1/2}$, especially in the range of 2.0 to 6.0 $MPa^{1/2}$.

According to the formulation of the present disclosure, the boiling point parameter of the organic solvent should be taken into account when selecting the organic solvent. In the present disclosure, the boiling points of the organic solvents are ≥150° C.; preferably ≥180° C.; more preferably ≥200° C.; further more preferably ≥250° C.; and most preferably ≥275° C. or 300° C. The boiling points in these ranges are beneficial for preventing the nozzle of the inkjet printing head from clogging. The organic solvent can be evaporated from the solution system to form a functional material film.

In some embodiments, the formulation as described herein, wherein:

1) the viscosity is in the range of 1 cps to 100 cps at 25° C.; and/or
2) the surface tension is in the range of 19 dyne/cm to 50 dyne/cm at 25° C.

In the formulation as described herein, the surface tension parameter of the resin (prepolymer) or the organic solvent should be taken into account when selecting the resin or the organic solvent. The suitable surface tension parameters of the ink are suitable for the particular substrate and particular printing method. For example, for inkjet printing, in some embodiments, the surface tension of the resin (prepolymer) or the organic solvent at 25° C. is in the range of 19 dyne/cm to 50 dyne/cm, further in the range of 22 dyne/cm to 35 dyne/cm, and still further in the range of 25 dyne/cm to 33 dyne/cm.

In some embodiments, the surface tension of the ink as described herein at 25° C. in the range of about 19 dynes/cm to 50 dynes/cm; more preferably in the range of about 22 dyne/cm to 35 dyne/cm; and most preferably in the range of about 25 dyne/cm to 33 dyne/cm.

The formulation as described herein, wherein the viscosity parameters of the ink of the resin (prepolymer) or the organic solvent must be taken into account when selecting the resin or the organic solvent. The viscosity can be adjusted by different methods, such as by the selection of appropriate resin (prepolymer) or organic solvent and the concentration of functional materials in the ink. In some embodiments, the viscosity of the resin (prepolymer) or the organic solvent is less than 100 cps, further less than 50 cps, and still further from 1.5 to 20 cps. The viscosity herein refers to the viscosity during printing at the ambient temperature that is generally at 15-30° C., further 18-28° C., still further 20-25° C., especially 23-25° C. The formulation thus prepared will be particularly suitable for inkjet printing In some embodiments, the formulation as described herein has a viscosity at 25° C. in the range of from about 1 cps to 100 cps; especially in the range of 1 cps to 50 cps; and particularly in the range of 1.5 cps to 20 cps.

The inks obtained from the organic solvent satisfying the above-mentioned boiling point parameter, surface tension parameter and viscosity parameter can form a functional material film with uniform thickness and composition property.

Salts are difficult to be purified, and contains impurities, which may often influence the opto-electronic performance of the device. In some embodiments, for the purposes of the present disclosure, the said color conversion layer (CCL) does not comprise any salts, and the said color conversion layer preferably does not comprise any organic acid salts formed by organic acids and metals. In terms of cost, the present disclosure preferably excludes organic acid salts with transition metals or lanthanide elements.

In another aspect, the present disclosure also provides an organic functional material film, and the organic functional material film is prepared from the formulation as described herein.

In yet another aspect, the present disclosure further provides a method for preparing the organic functional material film, as shown in the following steps:

1) prepare a formulation as described herein;
2) the formulation is coated on a substrate by printing or coating to form a film, wherein the method of printing or coating is selected from the group consisting of inkjet printing, nozzle printing, typographic printing, screen printing, dip coating, spin coating, blade coating, roller printing, torsional roll printing, planographic printing, flexographic printing, rotary printing, spray coating, brush printing or pad printing, or slit die coating;

3) the obtained film is heated at least 50° C., optionally in combination with ultraviolet irradiation, to allow the film to undergo a crosslinking reaction and be cured.

The thickness of the organic functional material film is generally 50 nm-200 μm, preferably 100 nm-150 μm, more preferably 500 nm-100 μm, still more preferably 1 μm-50 μm, and most preferably 1 μm-20 μm.

In some embodiments, the organic functional material film has a thickness of 20 nm to 20 μm, preferably less than 15 μm, more preferably less than 10 μm, even more preferably less than 8 μm, particularly preferably less than 6 μm, further preferably less than 4 μm, and most preferably less than 2 μm.

In yet another aspect, the present disclosure further provides the application of the above organic formulation and the functional material film in optoelectronic devices.

In some embodiments, the optoelectronic device may be selected from an organic light emitting diode (OLED), an organic photovoltaic cell (OPV), an organic light emitting electrochemical cell (OLEEC), an organic light emitting field effect transistor, and an organic laser.

In yet another aspect, the present disclosure further provides an optoelectronic device, comprising an organic functional material film as described herein.

Preferably, the optoelectronic device is an electroluminescent device, such as an organic light emitting diode (OLED), an organic light emitting electrochemical cell (OLEEC), an organic light emitting field effect transistor, a perovskite light emitting diode (PeLED), and a quantum dot light emitting diode (QD-LED), wherein one of the functional layers comprises an above-mentioned organic functional material film. The functional layer may be selected from a hole injection layer, a hole transport layer, an electron injection layer, an electron transport layer, a light emitting layer, and a cathodeic passivation layer (CPL).

In some embodiments, the optoelectronic device is an electroluminescence device, comprising two electrodes, wherein the functional layer is located on the same side of the two electrodes.

In some embodiments, the optoelectronic device comprises a light emitting unit and a color conversion layer, wherein the color conversion layer comprises an organic functional material film as described herein.

In some embodiments, the light emitting unit is selected from a solid state light emitting device, and the solid state light emitting device is preferably selected from a LED, an organic light emitting diode (OLED), an organic light emitting electrochemical cell (OLEEC), an organic light emitting field effect transistor, a perovskite light emitting diode (PeLED), and a quantum dot light emitting diode (QD-LED).

In some embodiments, the light emitting unit emits blue light, and is converted into green light or red light by the color conversion layer.

In yet another aspect, the present disclosure further provides a display device, comprising at least three pixels of red, green and blue, wherein the blue pixel comprises a blue light emitting unit, and the red and green pixels comprise a blue light emitting unit and a corresponding red, green color conversion layer.

Specific Embodiment

The present disclosure will be described below in conjunction with the preferred embodiments, but the present disclosure is not limited to the following embodiments. It should be understood that the scope of the present disclosure is covered by the scope of the claims of the present disclosure, and those skilled in the art should understand that certain changes may be made to the embodiments of the present disclosure.

In the specific embodiments of the present disclosure, the compounds of the following structural formulas:

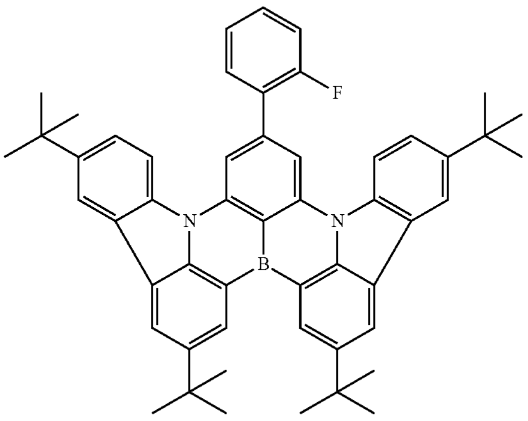

H1

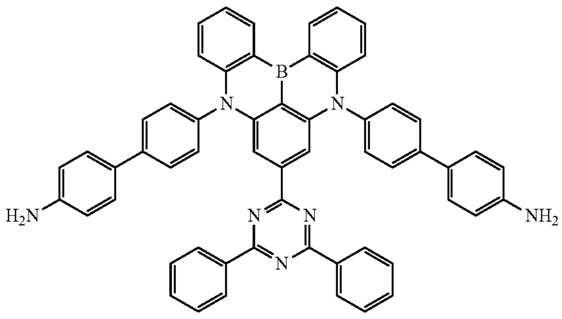

5

-continued
9
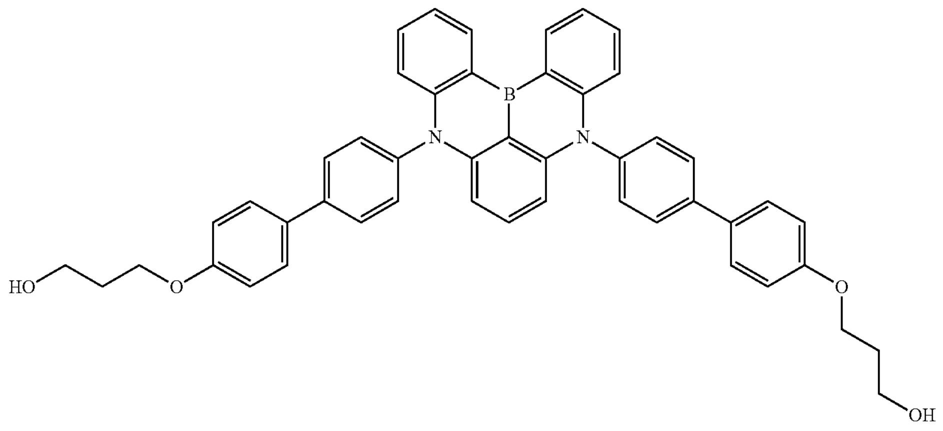
11
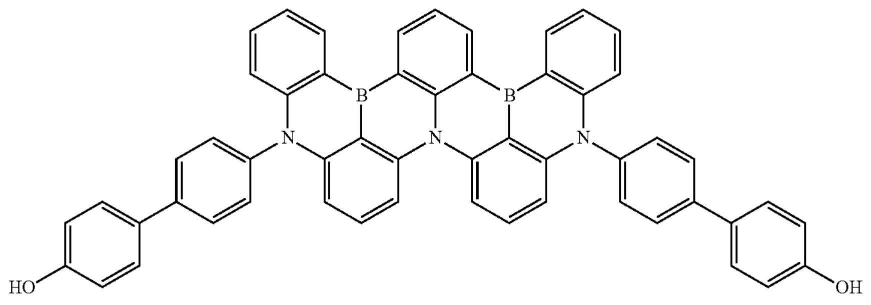
12
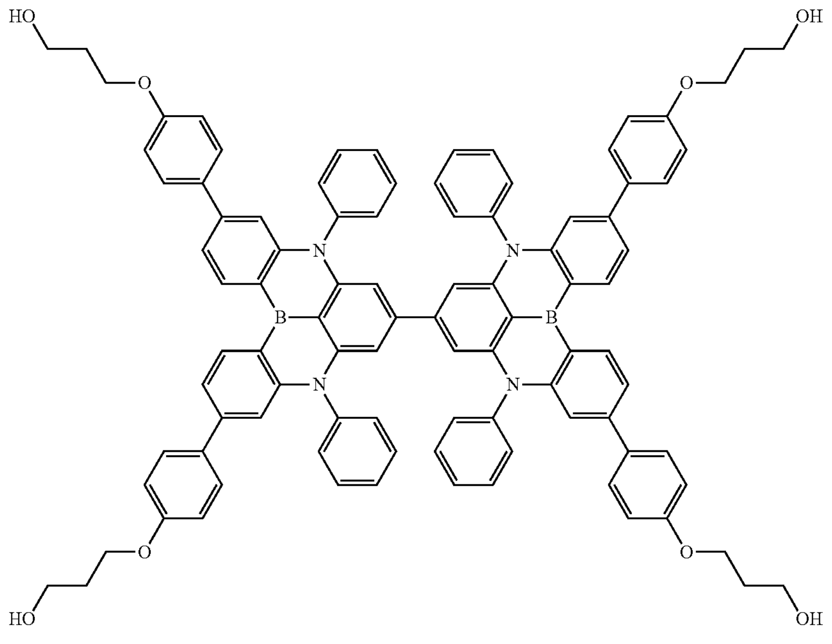

-continued
13
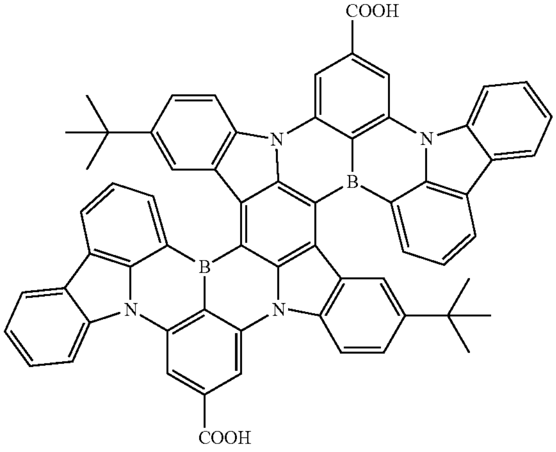
Synthesis of Compound H1
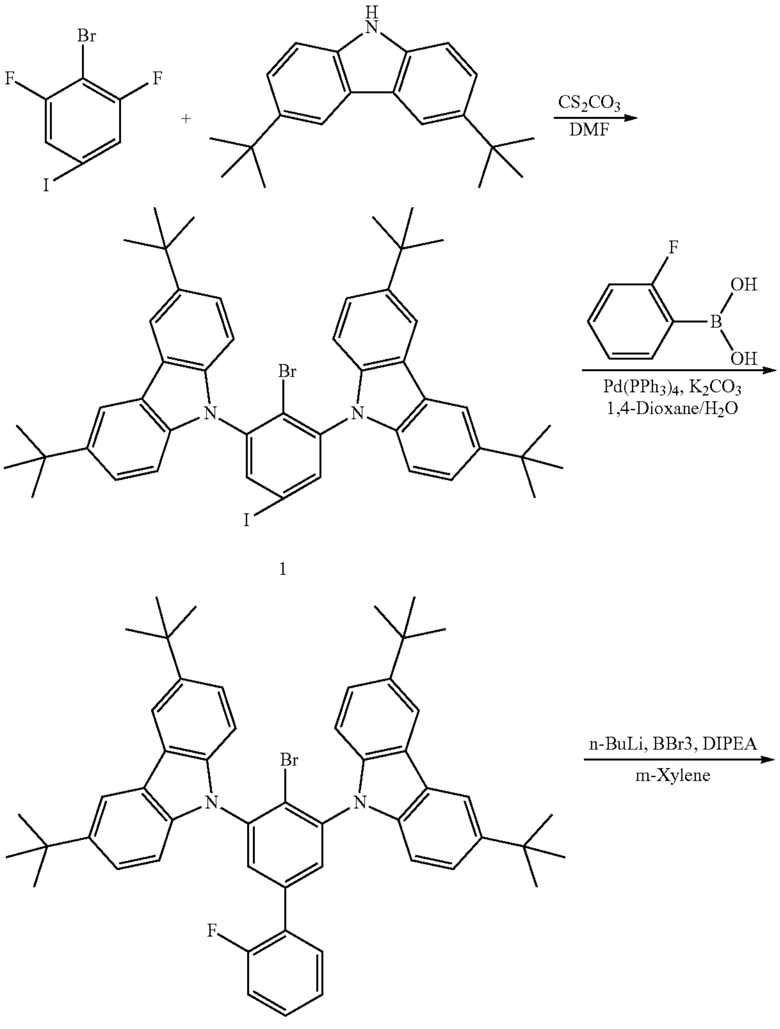
1
2

-continued

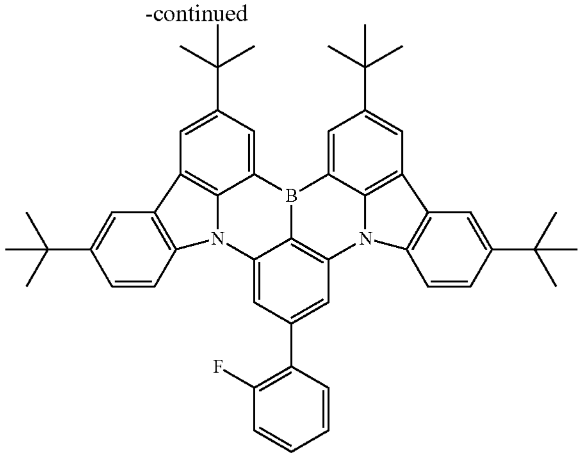

H1

Synthesis of Intermediate 1

3,6-di-tert-butylcarbazole (8.0 g, 25.1 mmol, 1.0 eq.), 2-bromo-1,3-difluoro-5-iodobenzene (14.02 g, 50.2 mmol, 2.0 eq.) and cesium carbonate (16.35 g, 50.2 mmol, 1.2 eq.) were accurately weighed in a clean three-neck bottle and added to 250 mL of DMF under nitrogen protection and reacted overnight at 85° C. After the reaction was finished, the mixture was cooled to room temperature, concentrated to remove DMF, 200 mL of water was added, 100 mL was extracted with DCM three times, dried over anhydrous magnesium sulfate, 600 mL of petroleum ether was added, decolorized over silica gel, and concentrated to obtain 117.85 g (yield 85%) of intermediate 1.

Synthesis of Intermediate 2

Intermediate 1 (16 g, 19.1 mmol, 1.0 eq), o-fluorophenylboronic acid (2.94 g, 21.0 mmol, 1.0 eq) and palladium tetrakistriphenylphosphine 0.5 g were accurately weighed in a clean three-neck bottle, and 100 mL of a 2M potassium carbonate aqueous solution, 200 mL of 1,4-dioxane was added under nitrogen protection, and reacted overnight at 85° C. After the reaction was finished, the mixture was cooled to room temperature, the aqueous layer was separated, the organic layer was concentrated, and 200 mL of dichloromethane, 600 mL of petroleum ether and decolorized with silica gel were added. Concentrated to obtain 11.5 g (yield 75%) of intermediate 2.

Synthesis of Compound H1

Intermediate 2 (8.06 g, 10 mmol, 1.0 eq) was accurately weighed in a clean three-neck bottle under nitrogen protection, 100 mL of m-xylene was injected with a syringe, cooled to −78° C., n-butyl lithium (2.5 M) (4.8 mL, 12 mmol, 1.2 eq) was slowly added dropwise and stirred at room temperature for 1 hour, cooled to −30° C., boron tribromide (7.5 g, 30 mmol, 3.0 eq) was slowly added dropwise, gradually returned to room temperature and stirred overnight, 10 mL of DIPEA was added, stirred at room temperature for 30 minutes and then heated to 80° C. for reaction. After the reaction was finished, 200 mL of methanol was added, stirred at room temperature and then filtered by suction, and the filter cake was rinsed with methanol. The filter cake was collected to obtain 1.47 g (yield 20%) of a final product.

wherein the synthesis of compound 5, 9, 11, 12 are described in the patent application with the application number CN202110370884. X.

Preparation of Color Conversion Layer:

1) The above green color conversion material and red color conversion material were dissolved in a solvent of n-butyl acetate at 100 mg/ml. At the same time, 100 mg/ml of polymethyl acrylate, 5 mg/ml of silicon dioxide nanospheres of 3-5 m in diameter were added into the solution. Through spin coating, a thin film with a thickness of about 2 m was formed on the surface of the light guide plate as a color conversion layer for red, green colors.

The green color converters, the red color converters and the transparent film layers were arranged alternately into an array to form three kinds of pixels.

A blue self-emitting unit was disposed below the above three film layers, the blue self-emitting unit emits blue light with an emission peak between 400 nm and 490 nm, with the blue light respectively emits to the green color converter, the red color converter and the transparent film layer; through the green color converter, a green emission with the emission peak between 490 nm and 550 nm is generated; through the red color converter, a red emission with the emission peak between 550 nm and 700 nm is generated; through the transparent film layer, the blue light with the emission peak between 400 nm and 490 nm remains.

2) The above blue color conversion material, green color conversion material and red color conversion material were dissolved in a n-butyl acetate solvent in the ratio of 50 mg/ml, 50 mg/ml and 50 mg/ml, respectively. The film was formed by a doctor blade or spin coating, and baked on a hot plate at 100° C. for 10 minutes to obtain a color conversion film of 200-500 nm.

The technical features of the above-described embodiments can be combined in any ways. For the sake of brevity, not all possible combinations of the technical features of the above-described embodiments have been described. However, as long as there are no contradictions in the combination of these technical features, they should be considered to be within the scope of this specification.

What described above are several embodiments of the present disclosure, and they are specific and in details, but not intended to limit the scope of the present disclosure. It will be understood and improvements can be made without departing from the concept of the present disclosure, and all these modifications and improvements are within the scope of the present disclosure. The scope of the present disclosure shall be subject to the appended claims.

What is claimed is:

1. A formulation comprising:

1) at least one organic resin;

2) at least one compound having a structural unit of formula (1) or (2), (1)

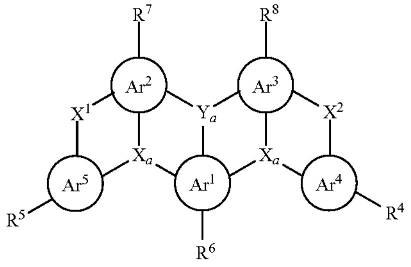

(2)

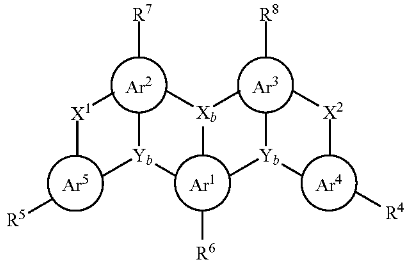

wherein:

each of $Ar^1$, $Ar^2$, and $Ar^3$ is independently an aromatic group containing 5 to 24 ring atoms, or a heteroaromatic group containing 5 to 24 ring atoms;

each of $Ar^4$ and $Ar^5$ is independently null, an aromatic group containing 5 to 24 ring atoms, or a heteroaromatic group containing 5 to 24 ring atoms;

each of $Y_a$ and $Y_b$ is independently B, P═O, $C(R^9)$, or $Si(R^9)$;

when neither $Ar^4$ nor $Ar^5$ is null, each of $X_a$ and $X_b$ is independently N, $C(R^9)$, or $Si(R^9)$;

when $Ar^4$ and/or $Ar^5$ is null, each of the corresponding $X_a$ and $Y_b$ is independently $N(R^9)$, $C(R^9R^{10})$, $Si(R^9R^{10})$, C═O, O, C═$N(R^9)$, C═$C(R^9R^{10})$, $P(R^9)$, P(═O)$R^9$, S, S═O, or $SO_2$;

each of $X^1$ and $X^2$ is independently null or a bridging group;

$R^4$ to $R^{10}$ are independently selected from the group consisting of —H, -D, —F, —Cl, —Br, —I, —CN, —$NO_2$, —$CF_3$, a $C_1$-$C_{20}$ linear alkyl group, a $C_1$-$C_{20}$ linear haloalkyl group, a $C_1$-$C_{20}$ linear alkoxy group, a $C_1$-$C_{20}$ linear thioalkoxy group, a $C_3$-$C_{20}$ branched/cyclic alkyl group, a $C_3$-$C_{20}$ branched/cyclic haloalkyl group, a $C_3$-$C_{20}$ branched/cyclic alkoxy group, a $C_3$-$C_{20}$ branched/cyclic thioalkoxy group, a $C_3$-$C_{20}$ branched/cyclic a silyl group, a $C_1$-$C_{20}$ ketone group, a $C_3$-$C_{20}$ alkoxycarbonyl group, a $C_7$-$C_{20}$ aryloxycarbonyl group, a cyano group, a carbamoyl group, a haloformyl group, a formyl group, an isocyano group, an isocyanate group, a thiocyanate group, an isothiocyanate group, a hydroxyl group, a nitro group, a $CF_3$ group, Cl, Br, F, a crosslinkable group, a substituted/unsubstituted aromatic/heteroaromatic group containing 5 to 40 ring atoms, an aryloxy/heteroaryloxy group containing 5 to 40 ring atoms, an arylamine/heteroarylamine group containing 5 to 40 ring atoms, and a disubstituted unit in any position of the above substituents or a combination thereof, wherein one or more of the substituent groups can form a monocyclic or polycyclic aliphatic or aromatic ring system with each other and/or with the ring bonded to the groups.

2. The formulation of claim 1, wherein: 1) the at least one organic resin is a thermosetting resin or a UV curable resin; and/or 2) the formulation further comprising a thermal initiator or photoinitiator.

3. The formulation of claim 1, wherein the compound comprises a structural unit of formula (1a) or (2a):

(1a)

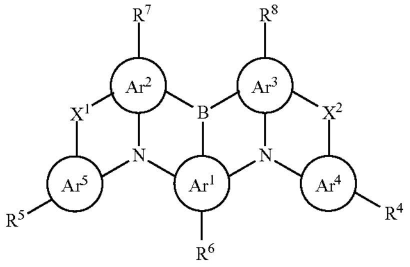

(2a)

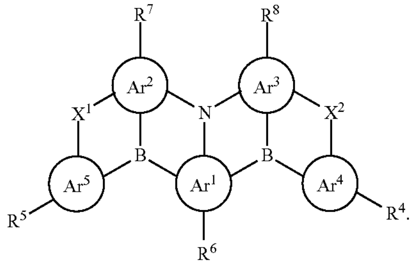

4. The formulation of claim 1, wherein the compound comprises a structural unit represented by one of the following formulas (1b)-(1e), (2b)-(2e):

(1b)

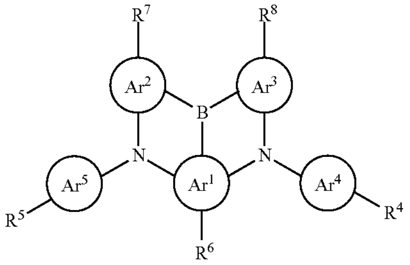

(2b)

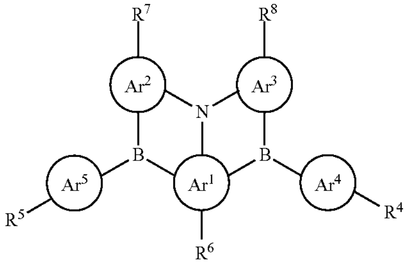

-continued (1c)

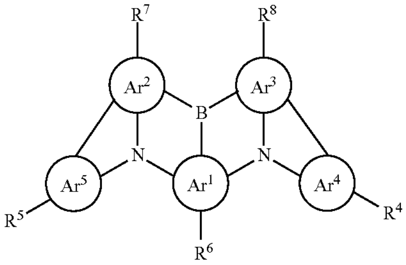

(2c)

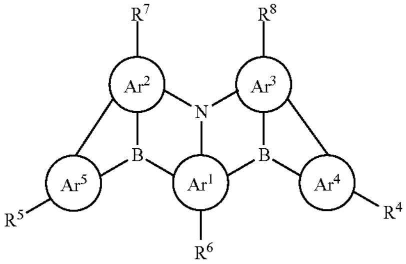

(1d)

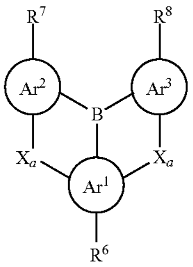

(2d)

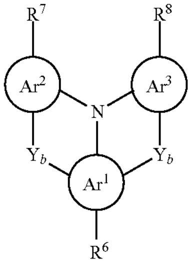

-continued (1e)

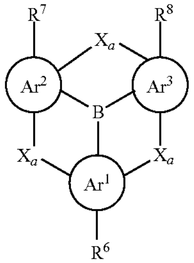

(2e)

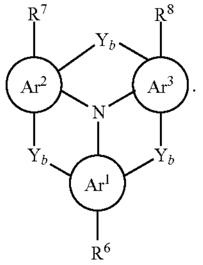

5. The formulation of claim 1, wherein the compound comprises at least one alcohol-soluble group or at least one water-soluble group.

6. The formulation of claim 5, wherein the alcohol-soluble or water-soluble group is selected from the group consisting of alcohol, aldehyde, acid, crown ether, polyether, primary amine.

7. The formulation of claim 1, comprising at least one solvent.

8. The formulation of claim 7, wherein the solvent is selected from water, alcohol, ester, aromatic ketone, aromatic ether, aliphatic ketone, aliphatic ether, inorganic ester compounds such as boronic ester or phosphoric ester, and a mixture of two or more of them.

9. An organic functional material film prepared from the formulation according to claim 1.

10. An optoelectronic device, comprising the organic functional material film according to claim 9.

* * * * *